United States Patent
Kinoshita et al.

(10) Patent No.: US 8,234,673 B2
(45) Date of Patent: Jul. 31, 2012

(54) INFORMATION SERVER APPARATUS, CLIENT TERMINAL APPARATUS, SUB-CLIENT APPARATUS, INFORMATION PROCESSING METHOD AND STORAGE MEDIUM HAVING STORED PROGRAM THEREFOR

(75) Inventors: Takuya Kinoshita, Chiba (JP); Ryota Yagi, Chiba (JP); Hiroyuki Nakaoka, Sakura (JP); Satoshi Terada, Chiba (JP); Toru Ueda, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 1154 days.

(21) Appl. No.: 10/542,290

(22) PCT Filed: Jan. 5, 2004

(86) PCT No.: PCT/JP2004/000010
§ 371 (c)(1),
(2), (4) Date: Jul. 7, 2006

(87) PCT Pub. No.: WO2004/068860
PCT Pub. Date: Aug. 12, 2004

(65) Prior Publication Data
US 2006/0259938 A1    Nov. 16, 2006

(30) Foreign Application Priority Data

Jan. 28, 2003  (JP) .................................. 2003-019439
Jul. 18, 2003  (JP) .................................. 2003-199394

(51) Int. Cl.
*H04N 5/445* (2011.01)

(52) U.S. Cl. ............. 725/51; 725/40; 725/109; 725/151

(58) Field of Classification Search .................... 725/40, 725/43, 48, 109, 110, 112, 60, 51
See application file for complete search history.

(56) References Cited

U.S. PATENT DOCUMENTS

| 5,844,552 A | * | 12/1998 | Gaughan et al. ................ 725/37 |
| 5,895,462 A | | 4/1999 | Toki |
| 6,061,719 A | * | 5/2000 | Bendinelli et al. ............ 709/218 |
| 6,326,982 B1 | * | 12/2001 | Wu et al. ....................... 715/718 |

(Continued)

FOREIGN PATENT DOCUMENTS

CN    1234685 A    11/1999

(Continued)

OTHER PUBLICATIONS

Miyaoku et al., TV Hoso to Internet no Kyocho ni Muketa Media Renkei Hoshiki-Vision Mark, NTT R&D, Oct. 10, 2002, vol. 51, No. 10, pp. 812-820.

*Primary Examiner* — Pankaj Kumar
*Assistant Examiner* — Timothy Newlin
(74) *Attorney, Agent, or Firm* — Birch, Stewart, Kolasch & Birch, LLP

(57) ABSTRACT

An information server apparatus 116 includes a communication portion 118 receiving a request for getting information including a set of information source specifying information and time specifying information from a client, a user request information analyzing portion 122 and a table reference portion 129 analyzing the request for getting information and selecting information to be transmitted to the client terminal apparatus based on the result of analysis. Further, communication portion 118 returns the selected information to the client.

19 Claims, 45 Drawing Sheets

| INFORMATION SOURCE INFORMATION | TIME ZONE OF PROVIDING INFORMATION | START TIME OF PROVISION | LOCATION OF CONTENTS DATA OF CONTENTS PROVIDER | LOCATION OF CONTENTS IN SERVER | CONDITION OF PROVISION |
|---|---|---|---|---|---|
| http://www.1channel/ | 02:06:24: 8:00-8:02 | 02:06:24: 8:03 | | D:¥1channel/CM/concert/get.exe | Counter <= 100 |
| | | | http://www.1channel/CM/concert/fail.exe | D:¥1channel/CM/concert/fail.exe | Counter > 100 |
| ⋮ | ⋮ | ⋮ | | | |
| http://www.8channel/ | 02:06:24: 8:00-8:01 | 02:06:24: 8:01 | http://www.8channel/travel.html | | Delay <= 1 [msec] |
| | | | | D:¥Trouble/confusion.html | Delay > 1 [msec] |
| ⋮ | ⋮ | ⋮ | | | |

124A

U.S. PATENT DOCUMENTS

| | | |
|---|---|---|
| 6,532,590 B1 | 3/2003 | Chimoto |
| 6,637,028 B1 * | 10/2003 | Voyticky et al. ............... 725/42 |
| 7,130,525 B1 | 10/2006 | Iwano |
| 2002/0078456 A1 * | 6/2002 | Hudson et al. ................ 725/60 |
| 2002/0116708 A1 * | 8/2002 | Morris et al. .................. 725/37 |
| 2002/0120934 A1 * | 8/2002 | Abrahams ..................... 725/60 |
| 2002/0147986 A1 * | 10/2002 | Michael et al. ............. 725/110 |
| 2002/0162118 A1 * | 10/2002 | Levy et al. .................. 725/110 |
| 2002/0167484 A1 | 11/2002 | Hatanaka et al. |
| 2002/0184646 A1 * | 12/2002 | Lord ........................... 725/109 |
| 2003/0005463 A1 * | 1/2003 | Macrae et al. .............. 725/112 |
| 2003/0048483 A1 | 3/2003 | Okabe |
| 2003/0051252 A1 | 3/2003 | Miyaoku et al. |
| 2003/0101100 A1 | 5/2003 | Sako et al. |
| 2004/0133919 A1 * | 7/2004 | Incentis ....................... 725/112 |

FOREIGN PATENT DOCUMENTS

| | | |
|---|---|---|
| CN | 1283823 A | 2/2001 |
| CN | 1361985 A | 7/2002 |
| JP | 9-160852 A | 6/1997 |
| JP | 2001-51926 A | 2/2001 |
| JP | 2001-258011 A | 9/2001 |
| JP | 2001-309349 A | 11/2001 |
| JP | 2002-73625 A | 3/2002 |
| JP | 2002-207656 A | 7/2002 |
| JP | 2002-209204 A | 7/2002 |
| JP | 2002-335518 A | 11/2002 |
| JP | 2003-51926 A | 2/2003 |
| JP | 2003-153239 A | 5/2003 |

* cited by examiner

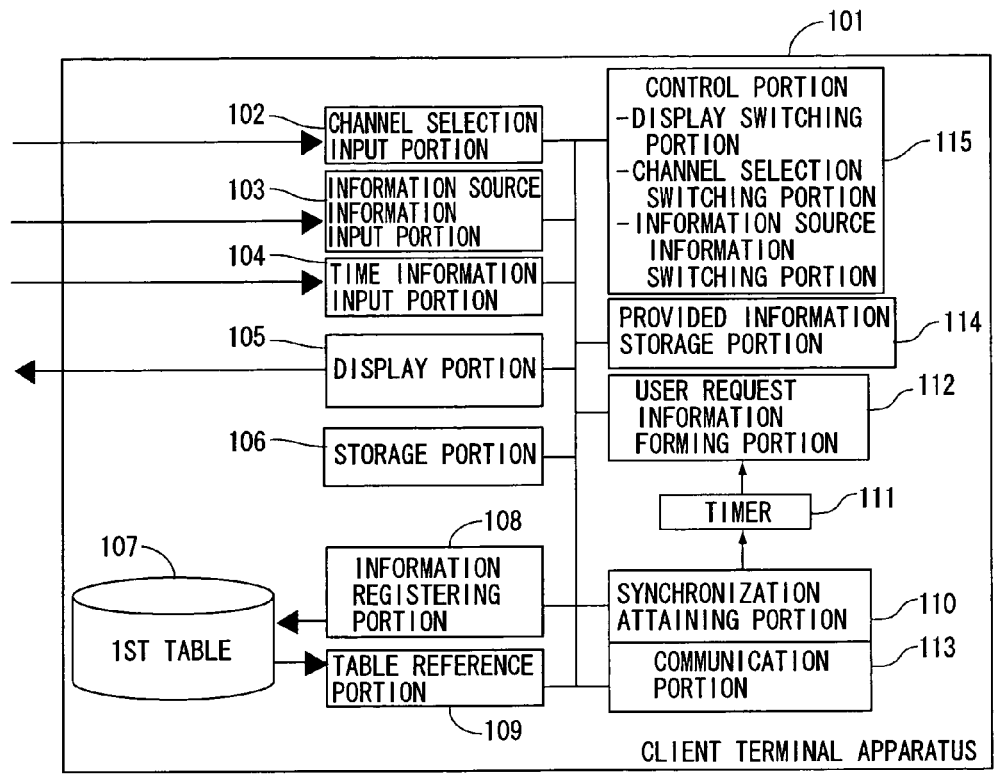

Fig. 7

| INFORMATION SOURCE SPECIFYING INFORMATION | TIME ZONE OF PROVIDING INFORMATION | LOCATION OF CONTENTS DATA OF CONTENTS PROVIDER | LOCATION OF CONTENTS IN SERVER |
|---|---|---|---|
| http://www.1channel/ | 02:11:19: 9:00 - 9:05 | http://www.1channel/CM/car.rtp | D:¥1channel/CM/car.rtp |
|  | 02:11:19: 9:05 - 9:30 | http://www.1channel/drama.html | D:¥1channel/drama.html |
| ... | ... | ... | ... |
| http://www.8channel/ | 02:11:19: 9:00 - 9:15 | http://www.8channel/travel.html | D:¥8channel/travel.html |
| ... | ... | ... | ... |

Fig. 8

| CLIENT ID (IP ADDRESS) | TIME SPECIFYING INFORMATION (TIME OF CLIENT REQUEST) |
|---|---|
| 123.44.54.231 | 02:11:19:09:00:01 |
| 230.122.4.155 | 02:11:19:09:02:35 |
| ... | ... |
| 10.23.201.5 | 02:11:19:09:04:59 |

| INFORMATION SOURCE INFORMATION | TIME ZONE OF PROVIDING INFORMATION | START TIME OF PROVISION | LOCATION OF CONTENTS DATA OF CONTENTS PROVIDER | LOCATION OF CONTENTS IN SERVER | CONDITION OF PROVISION |
|---|---|---|---|---|---|
| http://www.1channel/ | 02:06:24: 8:00-8:02 | 02:06:24: 8:03 | | D:¥1channel/CM/concert/get.exe | Counter <= 100 |
| | | | http://www.1channel/CM/concert/fail.exe | D:¥1channel/CM/concert/fail.exe | Counter > 100 |
| http://www.8channel/ | 02:06:24: 8:00-8:01 | 02:06:24: 8:01 | http://www.8channel/travel.html | | Delay <= 1 [msec] |
| | | | | D:¥Trouble/confusion.html | Delay > 1 [msec] |
| ... | ... | ... | ... | ... | |

INFORMATION SOURCE INFORMATION : http://www.1channel/

| CLIENT ID (IP ADDRESS) | TIME SPECIFYING INFORMATION (CLIENT REQUEST TIME) | TIMER TIME (REQUEST ARRIVAL TIME AT SERVER) | NETWORK DELAY TIME | COUNT INFORMATION |
|---|---|---|---|---|
| 123.44.54.231 | 02:06:24:8:00:01:23 | 02:06:24:8:00:02:19 | 0:00:00:94 | 1 |
| 230.122.4.155 | 02:06:24:8:00:23:31 | 02:06:24:8:0028:34 | 0:00:05:03 | 2 |
| ... | ... | ... | ... | ... |
| 10.23.201.5 | 02:06:24:8:01:45:12 | 02:06:24:8:01:48:98 | 0:00:03:76 | 55 |

Fig. 19

| INFORMATION SOURCE INFORMATION | TIME ZONE OF PROVIDING INFORMATION | START TIME OF PROVISION | LOCATION OF CONTENTS DATA OF CONTENTS PROVIDER | LOCATION OF CONTENTS IN SERVER |
|---|---|---|---|---|
| ... | ... | ... | ... | ... |
| http://www.8channel/ | 02:02:18: 7:30 - 7:40 | 02:02:18: 7:40 | http://www.8channel/shopping/aquos.file | D:¥8channel/shopping/aquos.file |
| | 02:02:18: 7:40 - 7:50 | 02:02:18: 7:50 | http://www.8channel/shopping/microwave.file | D:¥8channel/shopping/microwave.file |
| | 02:02:18: 7:50 - 8:00 | 02:02:18: 8:00 | http://www.8channel/shopping/zaurus.file | D:¥8channel/shopping/zaurus.file |
| ... | ... | | | ... |

| INFORMATION SOURCE INFORMATION | TIME ZONE OF PROVIDING INFORMATION | LOCATION OF CONTENTS DATA OF CONTENTS PROVIDER | LOCATION OF CONTENTS IN SERVER |
|---|---|---|---|
| .... | .... | .... | .... |
| http://www.movie_info.co.jp/123456/ | st >= 01:08:25 st < 01:09:14 | http://www.movie_info.co.jp/123456/actress/Jane | D:\movie_info.co.jp/123456/actress/Jane |
| | st >= 01:09:14 st < 01:09:35 | http://www.movie_info.co.jp/123456/acter/Roy | D:\movie_info.co.jp/123456/acter/Roy |
| | st >= 01:09:35 st < 01:10:52 | http://www.movie_info.co.jp/123456/place/LosAngels | D:\movie_info.co.jp/123456/place/LosAngels |
| .... | .... | .... | .... |

EXEMPLARY CONTENTS TIME TABLE 1203

| | START TIME | END TIME | OTHER CONDITION | CONTENTS | REMARKS |
|---|---|---|---|---|---|
| 1 | 05:00:00 | 05:55:59 | | ./news.html | EARLY MORNING NEWS |
| 2 | 07:00:00 | 08:14:59 | | ./news.html | MORNING NEWS |
| 3 | 08:15:00 | 08:29:59 | | ./drama/renzoku/021212.html | DRAMA SERIES |
| 4 | 08:30:00 | 09:59:59 | DETERMINE LOCAL CONDITION<br>If Osaka<br>./osaka_local.html | ./wideshow/ohayo/quiz021212.html | MORNING SHOW |
| 5 | 09:40:00 | 09:56:59 | | ./wideshow/ohayo/quiz021212.html | QUIZ SHOW |
| 6 | 09:52:15 | 09:52:45 | | http://www.sh-com.co.jp/spot/CM1026.html | CM |
| 7 | : | : | : | : | : |

Fig. 33

EXEMPLARY OPERATION OF ADDRESS RELATED SETTINGS IN CLIENT TERMINAL

| | EVENT | BASE ADDRESS | CURRENT TIME | TRANSMISSION ADDRESS | DISPLAY |
|---|---|---|---|---|---|
| 1 | — | DEPENDS ON PAST STATE | — | — | |
| 2 | CHANGE CHANNEL (xx ch → asa-tv) | http://www.asa-tv.co.jp | DEC. 9, 2002 19:02:35JST | — | VIDEO IMAGE |
| 3 | INTERNET ACCESS (LINKED DISPLAY) | http://www.asa-tv.co.jp | DEC. 9, 2002 20:32:45JST | http://www.asa-tv.co.jp/time?date=20021209&time=203245JST | Web |
| 4 | RETURN | http://www.asa-tv.co.jp | DEC. 9, 2002 20:38:28JST | — | VIDEO IMAGE |
| 5 | STORE PRESENT ADDRESS (VISIT LATER) | http://www.asa-tv.co.jp | DEC. 9, 2002 20:50:12JST | (http://www.asa-tv.co.jp/time?date=20021209&time=205012JST) STORAGE ONLY | VIDEO IMAGE |
| 6 | CHANGE CHANNEL (asa-tv → nn-tv) | http://www.nn-tv.com | DEC. 9, 2002 21:23:51JST | — | |
| 7 | ACCESS TO STORED ADDRESS (LATEST ADDRESS) | (http://www.nn-tv.com) NOT USED HERE | DEC. 9, 2002 21:35:11JST | http://www.asa-tv.co.jp/time?date=20021209&time=205012JST | WEB |

Fig. 36
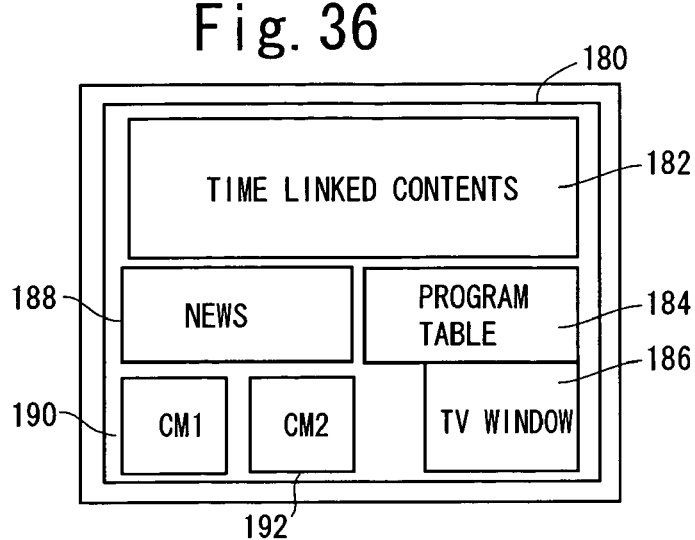
Fig. 37
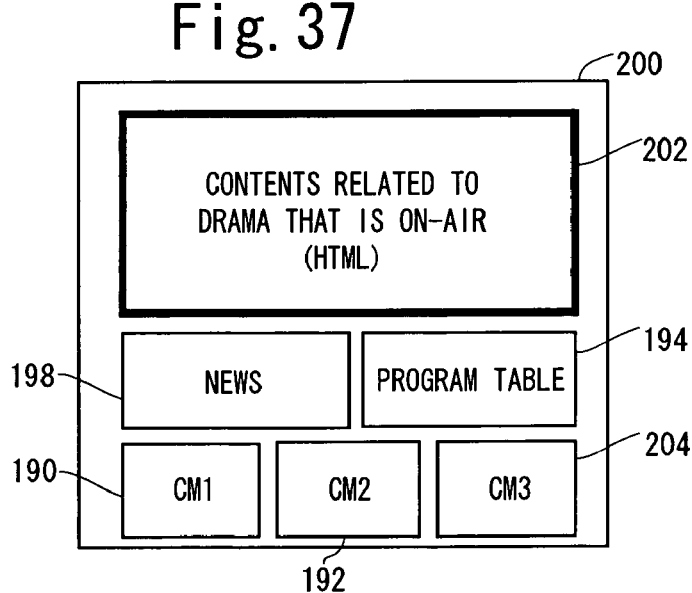
Fig. 38
| DEC. 12 | 21:05 | ANX TV | DETECTIVE FOLLY |
|---|---|---|---|
| DEC. 9 | 8:35 | NN TV | TV DRAMA SERIES "FULL" |
| DEC. 5 | 9:20 | MAI TV | GOOD MORNING MARKET |
| DEC. 3 | 19:04 | 8 ch | ANIMAL LAND |
| DEC. 1 | 21:56 | FJ TV | ION AIR PURIFIER ... |
RETURN

EXEMPLARY MENU DISPLAY

| LATEST ACCESS |
| BOOK-MARKED ACCESS |
| SETTINGS |
| RETURN |

Fig. 47

| 6 | TV | xxCONSULTING FIRM FORooo |
|---|----|--------------------------|
| 5 | TV | ENCYCLOPEDIA OF +++ |
| 4 | TV | SUNDAY **THEATER |
| 3 | TV | RULE OF ***(TV) |
| 2 | TV | *** SPECIAL(TV) |

⇩ 2003/6/5 20:45
PRESS LINKED DISPLAY KEY

| 6 | TV | xxCONSULTING FIRM FORooo |
|---|-----|--------------------------|
|   | Web | 12TH BASEBALL GAME[2003/5/23 18:05] |
| 5 | TV | ENCYCLOPEDIA OF +++ |
|   | Web | TOKYO###HP         [2003/6/4 21:10] |
| 4 | TV | SUNDAY **THEATER |
|   | Web | DETECTIVE *** HP  [2003/6/3 21:30] |
| 3 | TV | RULE OF ***(TV) |
|   | Web | RULE OF ***HP     [2003/6/5 20:45] |
| 2 | TV | *** SPECIAL(TV) |
|   | Web | +++ 18TH SESSION  [2003/6/5 20:10] |

⇧ CHANNEL UP KEY PRESSED

⇩ CHANNEL DOWN KEY PRESSED

Fig. 48
| 3 | TV | RULE OF ***(TV) |
|---|---|---|
|   | Web | o△# BEER CM HP [2003/6/5 20:40] |
| 2 | TV | *** SPECIAL(TV) |
2003/6/5 20:50
"PREVIOUS TIME PAGE" BUTTON PRESSED 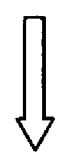 "NEXT TIME PAGE" BUTTON PRESSED
| 3 | TV | RULE OF ***(TV) |
|---|---|---|
|   | Web | RULE OF ***HP [2003/6/5 20:45] |
| 2 | TV | *** SPECIAL(TV) |
2003/6/5 20:50
"NEXT TIME PAGE" BUTTON PRESSED 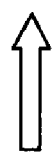 "PREVIOUS TIME PAGE" BUTTON PRESSED
| 3 | TV | RULE OF ***(TV) |
|---|---|---|
|   | Web | RULE OF *** PROGRAM PRESENT APPLICATION PAGE[2003/6/5 20:55] |
| 2 | TV | *** SPECIAL(TV) |

INFORMATION SERVER APPARATUS, CLIENT TERMINAL APPARATUS, SUB-CLIENT APPARATUS, INFORMATION PROCESSING METHOD AND STORAGE MEDIUM HAVING STORED PROGRAM THEREFOR

TECHNICAL FIELD

The present invention relates to apparatus and method for providing information from an information server apparatus to a client terminal apparatus through a network. More specifically, the present invention relates to apparatus and method for providing information to a client terminal apparatus through a network in coordination with a broadcast program or a storage medium.

BACKGROUND ART

Remarkable development of computers and network techniques in these days has enabled vigorous provision of various information from information server apparatuses to client terminal apparatuses. Typical example is the information provider service using an information server apparatus such as an FTP (File Transfer Protocol) server or a WEB server on the Internet. Information (contents) is placed in such servers, and a client terminal apparatus designates an URL (Universal Resource Locator) of the information. Thus, the information designated by the URL is provided to the client terminal apparatus.

Different from a system distributing information on schedule as in the case of television (hereinafter simply denoted by TV) broadcast, generally, distribution of such information takes place independent of time. That the information is distributed independent of time means that the contents of the information to be provided cannot be changed with time. There exists, however, a demand for changing with time the contents of information to be distributed.

Japanese Patent Laying-Open No. 2002-207656 proposes an information server apparatus as a solution to such a problem. In the information server apparatus disclosed in Japanese Patent Laying-Open No. 2002-207656, when there are requests for getting information designating one same URL made from a plurality of web browsers through the network, the URL is switched in accordance with the times of arrivals of the requests at the information server apparatus. Pieces of information reflecting the corresponding times are placed at the URLs, so that different pieces of information can be distributed to the web browsers in accordance with the time when the requests from these web browsers are received by the server.

A method of providing information that coordinates network-based services with on-schedule, broadcast-based services is disclosed in Japanese Patent Laying-Open No. 9-223084. In the client terminal apparatus in accordance with the technique disclosed in this laid-open application, URLs of the network-based service are registered channel-by-channel in the similar manner as reception frequencies of the broadcast-based service. The client terminal apparatus is provided with a remote controller having a plurality of keys. A user selects a channel through an operation of the keys on the remote controller. When the selected channel is allocated to a TV broadcast, the client terminal apparatus displays the TV broadcast using a TV tuner. When the selected channel is allocated to a URL, the client terminal apparatus accesses to the URL through the network and displays the information.

In the information server apparatus disclosed in Japanese Patent Laying-Open No. 2002-207656, the URLs to be allocated to the users are determined in accordance with time of arrival of the user requests. Therefore, when there is a delay in arrival caused by a network delay, different URLs may possibly be allocated to two users who accessed exactly at the same time. Further, assuming that the information sever apparatus allocates a specific URL to a specific time and a user transmits a request past the specific time, allocation is impossible as the URL is already a thing of the past. Therefore, the information of the specific URL is not available to the user.

Further, the information server apparatus processes requests in the order of arrival. By this approach, when a request made by a user who accessed first but experiences a larger network delay arrives later than a request made by a user who accessed later but experiences a smaller network delay, the URL is allocated with priority to the latter. In other words, it is difficult to process the access requests fairly in the order of time when the users made access requests.

In the information server apparatus described in Japanese Patent Laying-Open No. 2002-207656, allocation of URLs is determined in accordance with the time of arrival of user requests. As a result, when the time of arrival is the same, connection to the same URL is always established. In actual operation, however, there may be cases where provision of different pieces of information is desired in view of the state of accesses from clients, even when the time of arrival is the same. The technique described in Japanese Patent Laying-Open No. 2002-207656 is not flexible enough to handle such a situation.

According to the technique described in Japanese Patent Laying-Open No. 2002-207656, it is impossible to see the information that was accessible in the past. However, one might wish to see now some information that was accessible in the past, or a user might be very much interested in the information that is being accessed and displayed at present and wish to make an access again later. In order to meet such requests by the users, a technique is necessary that can change the contents of information dependent not solely on the time of arrival. Such a technique is also desired to enable one enjoying information accessed at present to tell others of the address information (by, for example, e-mail).

For a user to access to some information, he/she must know a perfect address (such as the URL) to gain access to the information. Generally, an information server apparatus combines various pieces of information to form the information provided to the user. In order to enable a user to access to contents that will be formed in the future and changed with time, it is necessary to pass, time-to-time, appropriate addresses corresponding to the time of access to the client terminal apparatus. Consider a server that provides information associated with TV broadcast. It would be easily understood that various and many pieces of information would be provided time to time in one day.

It is difficult to manage these addresses on the side of the server or to pass these addresses down to the client terminal apparatuses.

As another approach, an information server apparatus may limit the number of users that can make accesses at one time. When users larger than the limited number make access to the information server apparatus, it is desirable to provide information from a different information server apparatus to the users accessed after the limited number has been attained. Further, when a plurality of users make access to the information server apparatus almost simultaneously with the limited number almost reached, it is desired that the user who started access earlier can connect to the information server apparatus with priority.

According to the technique referenced in Japanese Patent Laying-Open No. 9-223084, a user allocates keys of a remote controller to web services related to programs broadcast on broadcast channels, so as to be able to receive web services associated with the broadcast program. The keys allocated to broadcast channels and the keys allocated to specific web sites, however, are separate and not related to each other. Therefore, when a user wishes to receive a web service related to a broadcast program, he or she must consider by himself/herself the relation between the broadcast channel and the key allocated to the web service.

Recently, terminals such as portable telephones having functions comparable to those of common client terminals but limited resources because of size have come to be used. It is preferred that the services described above are readily available using such terminals.

DISCLOSURE OF THE INVENTION

The present invention was made in view of the foregoing, and its object is to provide an information server apparatus and a client terminal apparatus that provide information in accordance with time when a user started issuing a request through a network, as well as to an information server apparatus and a client terminal apparatus that provide information services related to broadcasting services.

According to the first aspect, the present invention provides an information server apparatus, including: means for receiving a request for getting information including a set of information source specifying information and time specifying information from a client terminal apparatus; selecting means analyzing the request for getting information for selecting information to be transmitted to the client terminal apparatus based on a result of analysis; and means for returning information selected by the selecting means to the client terminal apparatus.

The information server apparatus receives the request for getting information including a set of information source specifying information and time specifying information, and returns to the client terminal apparatus the information selected in accordance with the result of analysis thereof. As the information is selected based on the time when the client terminal apparatus issued the request for getting information, appropriate information in accordance with the order of generation of the request for getting information can be provided to the client terminal apparatus.

According to the second aspect, the present invention provides an information processing method, including the steps of: causing a computer to receive a request for transmitting information including a set of information source specifying information and time specifying information from a client terminal apparatus; causing the computer to analyze the request for getting information; causing the computer to select information based on the analysis in the analyzing step; and causing the computer to return the information selected in the selecting step to the client terminal apparatus that made the request for getting information.

According to the information processing method, the request for getting information including a set of information source specifying information and time specifying information is received by a computer, and the information selected in accordance with a result of analysis thereof is returned to the client terminal apparatus. As the information is selected based on the time when the client terminal apparatus issued the request for getting information, appropriate information in accordance with the order of generation of the request for getting information can be provided to the client terminal apparatus, regardless of network delay.

According to the third aspect, the present invention provides a program that can be executed by a computer recorded on a computer readable recording medium, causing, when executed by a computer, the computer to perform the above-described method.

According to the fourth aspect, the present invention provides a client terminal apparatus transmitting information source specifying information to an information server apparatus and receiving corresponding information from the information server apparatus, including: a timer for obtaining current time; means for adding current time information as time specifying information to the information source specifying information; means for transmitting a request for getting information including a set of the information source specifying information and the time specifying information to the information server apparatus; and means for displaying information transmitted from the information server apparatus in response to the request for getting information.

The client terminal apparatus transmits to the information server apparatus the information source specifying information with the current time information added, and therefore, it becomes possible for the information server apparatus to select and return the appropriate information in accordance with the current time information. As a result, it becomes possible to receive appropriate information in accordance with the time when the request for getting information is issued.

According to the fifth aspect, the present invention provides, in a computer transmitting information source specifying information to an information server apparatus and receiving corresponding information, a method of information processing, including the steps of: causing the computer to get current time; causing the computer to add current time information as the time specifying information to the information source specifying information and to transmit as the request for getting information to the information server apparatus; and causing the computer to display information returned from the information server apparatus in response to the request for getting information.

By the information processing method, the computer is caused to operate such that the information source specifying information with the current time information added is transmitted to the information server apparatus. Therefore, it becomes possible for the information server apparatus to select and return the appropriate information in accordance with the current time information. As a result, it becomes possible to receive appropriate information in accordance with the time when the request for getting information is issued.

According to the sixth aspect, the present invention provides an information processing method causing, when executed by a computer, the computer to execute the information processing method described above.

According to the seventh aspect, the present invention provides, in an information providing system including a client terminal apparatus transmitting information source specifying information to an information server apparatus and receiving corresponding information from the information server apparatus, and the information server apparatus providing information to the client terminal apparatus, a method of providing information including the steps of: in the client terminal apparatus, specifying current time; in the client terminal, adding time specifying information specifying time to the information source specifying information, and transmitting a request for getting information including a set of the information source specifying information and the time specifying information to the information server apparatus; in the information server apparatus, receiving the request for getting information from the client terminal apparatus; in the information server apparatus, analyzing the request for getting information; in the information server apparatus, selecting information based on the result of analysis of the analyzing step; in the information server apparatus, returning the information selected in the selecting step, to the client terminal apparatus; and in the client terminal apparatus, displaying the information returned from the information server apparatus.

By the information processing method, the client terminal apparatus transmits to the information server apparatus the request for getting information including the information source specifying information with the current time information added, and therefore, it becomes possible for the information server apparatus to select and return the appropriate information in accordance with the current time information. As a result, it becomes possible to provide from the information server apparatus to the client terminal apparatus appropriate information in accordance with the time when the request for getting information is issued.

According to the eighth aspect, the present invention provides a client terminal apparatus connected to an information server apparatus, including a display apparatus; receiving means for receiving a broadcast signal; broadcast switching means for switching programs of broadcast signals received by the receiving means; video image processing means for processing a video image derived from the received broadcast signal and applying to the display apparatus; selecting means for selecting information source specifying information related to a program switched-in by the broadcast switching means in response to satisfaction of a predetermined condition; and means for accessing the information server apparatus for getting information selected by the selecting means.

In the client terminal apparatus, when the broadcast signal program is switched and a predetermined condition is satisfied, the information source specifying information related to the switched program is selected and obtained. It becomes possible to obtain appropriate information related to the program that is being broadcast, without any intentional operation by the user of the client terminal apparatus.

According to the ninth aspect, the present invention provides, in a computer connected to an information server apparatus providing information to a client terminal apparatus, a method of processing information, including: the step of causing the computer to receive a broadcast signal; a broadcast switching step of causing the computer to switch a program on the broadcast signal; a video image processing step of causing the computer to process a video image based on the received broadcast signal; and a selecting step of causing the computer to select, in response to selection of a desired program, information source specifying information of the program; whereby the information server apparatus is accessed, linked to the program.

By the information processing method, in conjunction with selection of a broadcast signal program, the information source specifying information related to the program is selected by the computer, and is accessed. It becomes possible to obtain appropriate information related to the selected program, without any intentional operation by the user of the client terminal apparatus.

According to the tenth aspect, the present invention provides a program that can be executed by a computer, recorded on a computer readable recording medium, causing, when executed by a computer, the computer to perform the information processing method described above.

According to the eleventh aspect, the present invention provides a client terminal apparatus connected to an information server apparatus, including receiving means for receiving a broadcast signal; input getting means for getting an operation input by a user designating information related to a program of the broadcast signal; broadcast switching means for switching the program of broadcast signal received by the receiving means; video image processing means for processing a video image based on the received broadcast signal; selecting means for selecting, in response to switching of a program by the broadcast switching means, information source specifying information corresponding to the information designated by the operation input; and means for accessing the information server apparatus for getting information selected by the selecting means.

In the client terminal apparatus, when the user designates beforehand information related to the broadcast signal program by an operation input, the corresponding information is obtained automatically when the program is switched, without any instruction by the user.

According to the twelfth aspect, the present invention provides a client terminal apparatus connected to an information server apparatus, including: receiving means for receiving a broadcast signal; video image processing means for processing a video image based on the received broadcast signal; program switching means for switching a program of the broadcast signal received by the receiving means; selecting means for selecting, in conjunction with selection of a program by the program switching means, information source specifying information related to the program; means for obtaining current time; and means for transmitting, to the information server apparatus, a request for getting information, requested by the client terminal apparatus for the information from the information server apparatus, including the information source specifying information linked to the program and time when the information request is issued to the information server apparatus.

In the client terminal apparatus, when a program is switched, the request for getting information including the information source specifying information related to the program and the time of switching is transmitted to the information server apparatus. Thus, information having appropriate contents in accordance with the time can be obtained in conjunction with the program switching, without any intentional operation by the user.

According to the thirteenth aspect, the present invention provides a client terminal apparatus connected to an information server apparatus, including: receiving means for receiving a broadcast signal; broadcast switching means for switching a program of the broadcast signal received by the receiving means; display means for processing and displaying a video image based on the received broadcast signal; request receiving means for receiving a request signal from another apparatus; selecting means for selecting information related to the program of the broadcast signal displayed by the display means, in response to the request signal; and returning means for returning the related information selected by the selecting means to the another apparatus.

When a request signal is received from another apparatus, the client terminal apparatus can select information related to the broadcast signal program displayed by the display means at that time and return the information to the apparatus that has transmitted the request signal. Therefore, even when the said another apparatus does not have any information related to the program, it can obtain the information through the client terminal apparatus.

According to the fourteenth aspect, the present invention provides a program that can be executed by a computer, recorded on a computer readable recording medium, causing, when executed by a computer, the computer to operate as any of the client terminal apparatuses described above.

According to the fifteenth aspect, the present invention provides a sub-client apparatus used with a client terminal receiving information provided from an information server apparatus, including: request transmitting means for transmitting a predetermined request signal to the client terminal apparatus; information source specifying information receiving means for receiving information source specifying information returned from the client terminal apparatus in response to the request signal; information getting means for getting information from the information server apparatus based on the information source specifying information; and means for displaying information obtained by the information getting means.

The sub-client apparatus transmits a request signal to the client terminal apparatus, whereby the information source specifying information can be obtained from the client terminal apparatus, and the desired information can be obtained from the information server apparatus and be displayed. Even a sub-client apparatus not holding any information specifying information can obtain and display information similar to a client terminal, utilizing the information held by the client terminal apparatus.

According to the sixteenth aspect, the present invention provides a sub-client apparatus connected to a client terminal apparatus receiving information provided from an information server apparatus, including: request transmitting means for transmitting a request signal to the client terminal apparatus; means for receiving information returned from the client terminal apparatus in response to the request signal; and means for displaying information obtained by the information getting means.

The sub-client apparatus transmits a request signal to the client terminal apparatus, whereby the information can be obtained from the information server apparatus through the client terminal apparatus and be displayed. Even a sub-client apparatus having limited usable resources can obtain and display information similar to a client terminal.

According to the sixteenth aspect, the present invention provides a program that can be executed by a computer, recorded on a computer readable recording medium, causing, when executed by a computer, the computer to operate as any of the sub-client apparatuses described above.

As described above, according to the information providing system of the present invention, the information to be provided is switched in accordance with the time designated by the user. As a result, it becomes possible for the user to receive information related to the contents displayed in a broadcast program such as TV broadcast, without any complicated operation. Further, the service provider can change the information to be provided or order of provision to a plurality of users, using the time information from the user or the time necessary for the user request until arrival (network delay time), calculated from the time information.

BRIEF DESCRIPTION OF THE DRAWINGS

FIG. 4 is a block diagram of the client terminal apparatus in accordance with the first embodiment of the present invention.

FIG. 5 shows a configuration of a broadcast channel number-information source information table (first table) of the client terminal apparatus in accordance with the first embodiment of the present invention.

FIG. 7 shows a configuration of a program related information provision table (second table) of the information server apparatus providing broadcast-program-related information, in accordance with the first embodiment of the present invention.

FIG. 8 shows a configuration of a user request information management table (third table) of the information server apparatus providing the broadcast-program-related information in accordance with the first embodiment of the present invention.

FIG. 17 shows exemplary contents of the program-related information provision table (second table) in the information server apparatus that performs user number count-up and network delay detection, in accordance with the second embodiment of the present invention.

FIG. 18 shows exemplary contents of the user request information management table (third table) of the information server apparatus providing the broadcast-program-related information in accordance with the second embodiment of the present invention.

FIG. 19 shows exemplary contents of the program-related information provision table (second table) in the information server apparatus that provides a plurality of pieces of broadcast program related information at one time, in accordance with the second embodiment of the present invention.

FIG. 20 shows exemplary contents of the program related information provision table (second table) in the information server apparatus that provides storage-media-related information in accordance with the second embodiment of the present invention.

FIG. 28 shows an example of a contents timetable of the system in accordance with the third embodiment of the present invention.

FIG. 33 shows exemplary movements of address-related settings in the client terminal apparatus of the system in accordance with the third embodiment of the present invention.

FIGS. 34 to 37 show exemplary displays on the client terminal apparatus of the system in accordance with the third embodiment of the present invention.

FIG. 38 shows an exemplary display of the addresses stored in the client terminal apparatus of the system in accordance with the third embodiment of the present invention.

FIGS. 47 and 48 show state transition of display by a key operation in the client terminal apparatus of the system in accordance with the third modification of the third embodiment of the present invention.

BEST MODES FOR CARRYING OUT THE INVENTION

Figure 1:
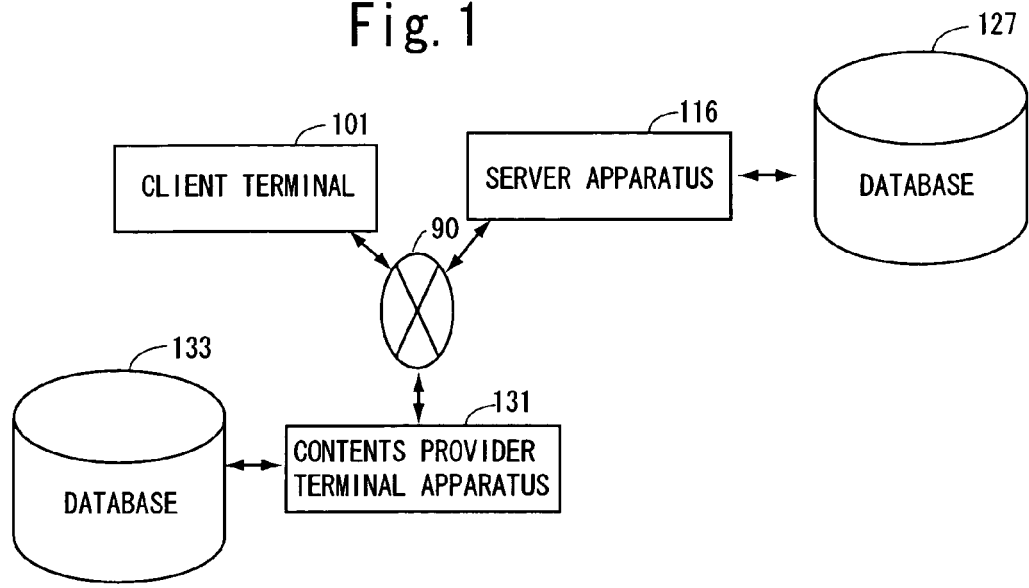
FIG. 1 is a system diagram representing an overall configuration of the information provision system in accordance with a first embodiment of the present invention.

Embodiments of the present invention will be described with reference to the figures. In the following description and in the figures, the same components are denoted by the same reference characters and same names, and detailed description thereof will not be repeated.

First Embodiment

The first embodiment described in the following is directed to an information transmission/display system including an information server apparatus and a client terminal apparatus.

—System Configuration—

FIG. 1 shows the configuration of the information provision system in accordance with the first embodiment of the present invention. Referring to FIG. 1, the information provision system includes a plurality of client terminal apparatuses 101, an information server apparatus 116 providing information to client terminal apparatuses 101 through a network 90, and a plurality of contents provider terminal apparatuses 131 providing information to information server apparatus 116. Information server apparatus 116 includes a database 127 of contents data, and contents provider terminal apparatus has a database 133 of contents data to be provided to information server apparatus 116.

Appearance of Client Terminal Apparatus 101

Figure 2:
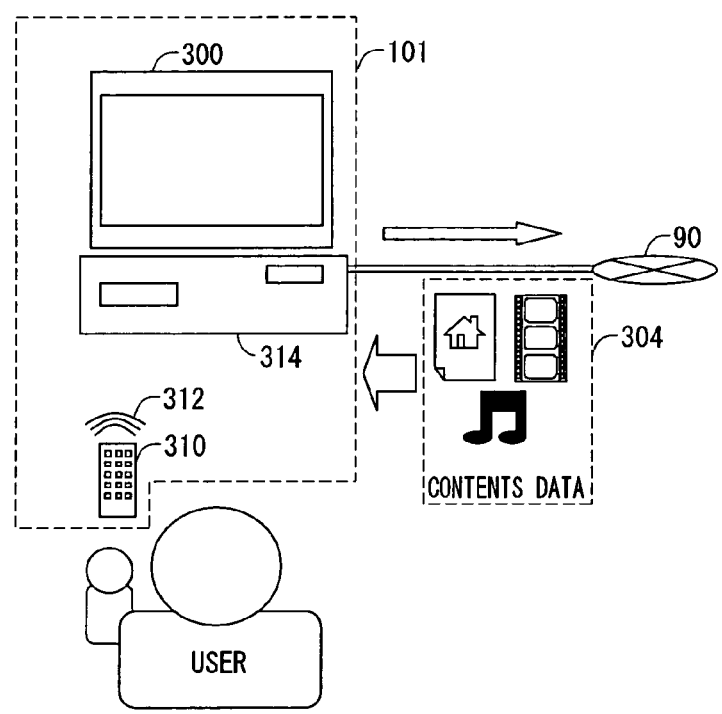
FIG. 2 is an illustration representing manner of use by a user of a client terminal in accordance with the first embodiment of the present invention.

FIG. 2 shows a general configuration of client terminal apparatus 101 and the manner of use thereof, in accordance with the present embodiment. As shown in FIG. 2, client terminal apparatus 101 includes a remote controller 310 and a client terminal 314 capable of communication with remote controller 310 by infrared ray 312 and having a function of displaying video images on a box 300 such as a TV receiver.

Client terminal 314 is connected to network 90. Client terminal 314 transmits request information 302 received from a user to network 90, and displays contents data 304 transmitted from information server apparatus 116 on the network 90 in response to the request, on the display screen of box 300. Further, client terminal apparatus 101 is capable of receiving a broadcast program from a broadcasting station, and therefore, it is possible for the user to watch a broadcast program from a broadcasting station using client terminal apparatus 101.

Figure 3:
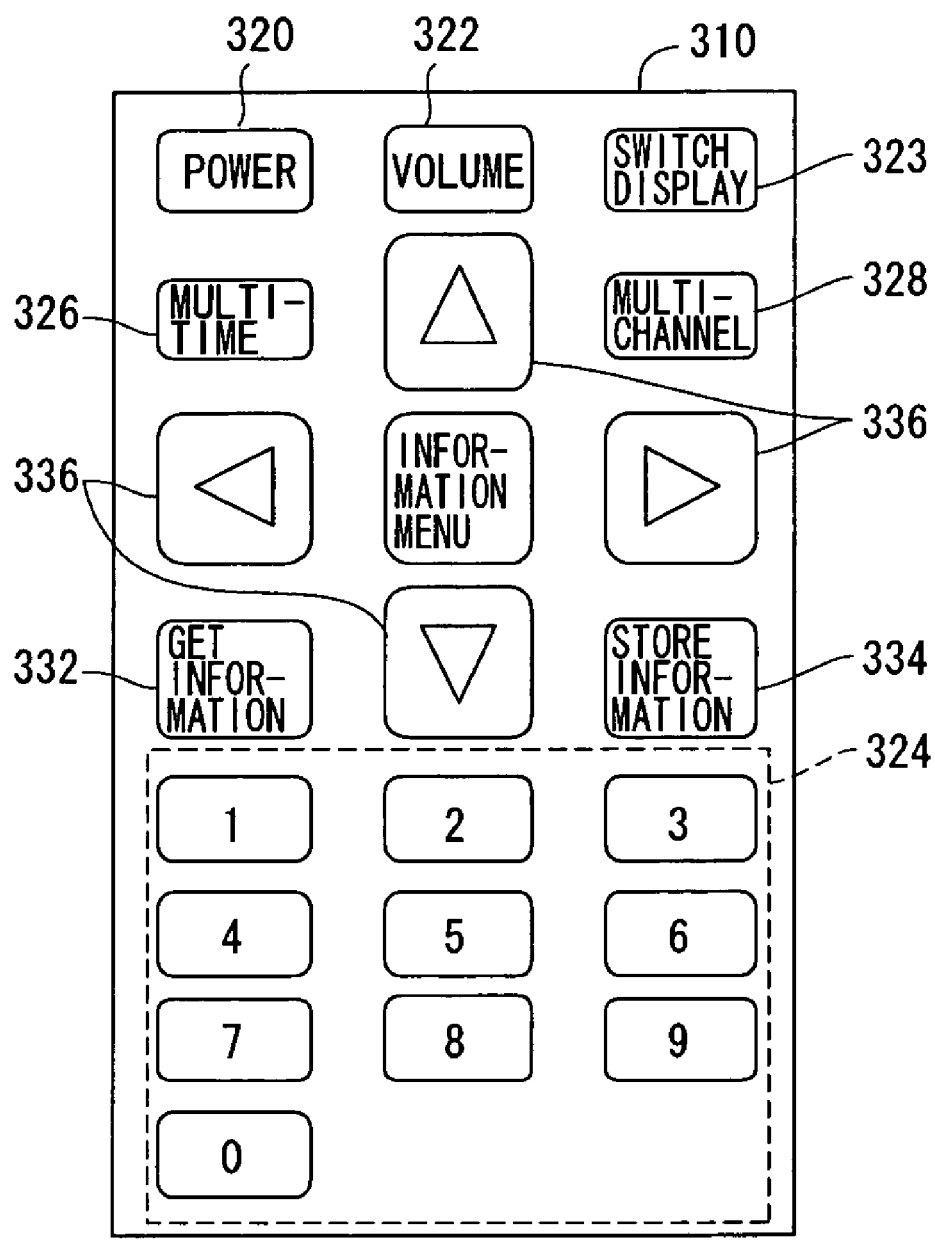
FIG. 3 is a front view of a remote controller attached to the client terminal in accordance with the first embodiment of the present invention.

FIG. 3 shows an exemplary arrangement of keys (hereinafter referred to as "buttons") of remote controller 310. As shown in FIG. 3, remote controller 310 includes, in addition to the buttons (power button 320, volume button 322, channel selection button 324) for operating a general RV receiver, a group of buttons (multi-time button 326, information menu button 330, information getting button 332, information storage button 334, arrow button 336) for realizing the operations of client terminal apparatus 101 described with reference to the present embodiment and the second embodiment later. (In the present embodiment, multi-channel button 328 is not used.)

Among these buttons, the one mainly used in the present embodiment is the information getting button 332. When something is displayed on the TV screen and the information getting button is pressed, information somehow related to the information displayed at that time is obtained from a specific URL and displayed on the TV screen.

A display switch button 323, multi-time button 326 and information storage button 332 are used in the second embodiment. Details of their functions will be described later with reference to the second embodiment.

When information menu button 330 is pressed, a menu allowing the user to perform various user inputs, such as a request of URL input, is displayed.

—Configuration of Client Terminal Apparatus 101—

FIG. 4 is a block diagram of client terminal apparatus 101. As shown in FIG. 4, client terminal apparatus 101 in accordance with the present invention includes: a channel selection input portion 102 for setting a channel of a broadcast program using an input apparatus such as remote controller 310, a mouse, a key board or the like; an information source information input portion 103 receiving information specifying the source of information (hereinafter referred to as "information source information") corresponding to each broadcast channel, input by the user through the input apparatus mentioned above; time information input portion 104 receiving time information input by the user through the input apparatus mentioned above; a display portion 105 displaying the broadcast program or provided contents data separately or simultaneously; and a storage portion 106 storing time information, information source information and the like.

Client terminal apparatus 101 further includes: a first table 107 storing broadcast channels and information source information in correspondence with each other; an information maintaining portion 108 for maintaining first table 107; a table reference portion 109 for looking up, when information specifying a broadcast channel is applied, information source information corresponding to the broadcast channel from the first table 107; a synchronization attaining portion 110 for attaining time synchronization with information server apparatus 116; a timer 111 for holding time information always synchronized with information server apparatus 116 by synchronization attaining portion 110; a user request information forming portion 112 forming a user request information requesting the information server apparatus 116 to provide information, by adding the time information to the information source information; a communication portion 113 transmitting/receiving information such as the user request information and provided contents data on network 90; and a storage portion 114 storing the contents data provided by information provision server apparatus 116.

Client terminal apparatus 101 further includes a control portion 115 controlling all the functional portions described above. Control portion 115 includes a display switching portion switching display, a channel selection switching portion switching the broadcast program to be displayed, and an information source information switching portion selecting the information source information corresponding to the selected channel, in conjunction with the switching of the selected station.

FIG. 5 shows a configuration of the first table 107. As shown in FIG. 5, the first table 107 stores the broadcast channel numbers and information source information of the information related to broadcast programs of respective channels, in correspondence with each other.

—Configuration of Information Server Apparatus 116—

Figure 6:
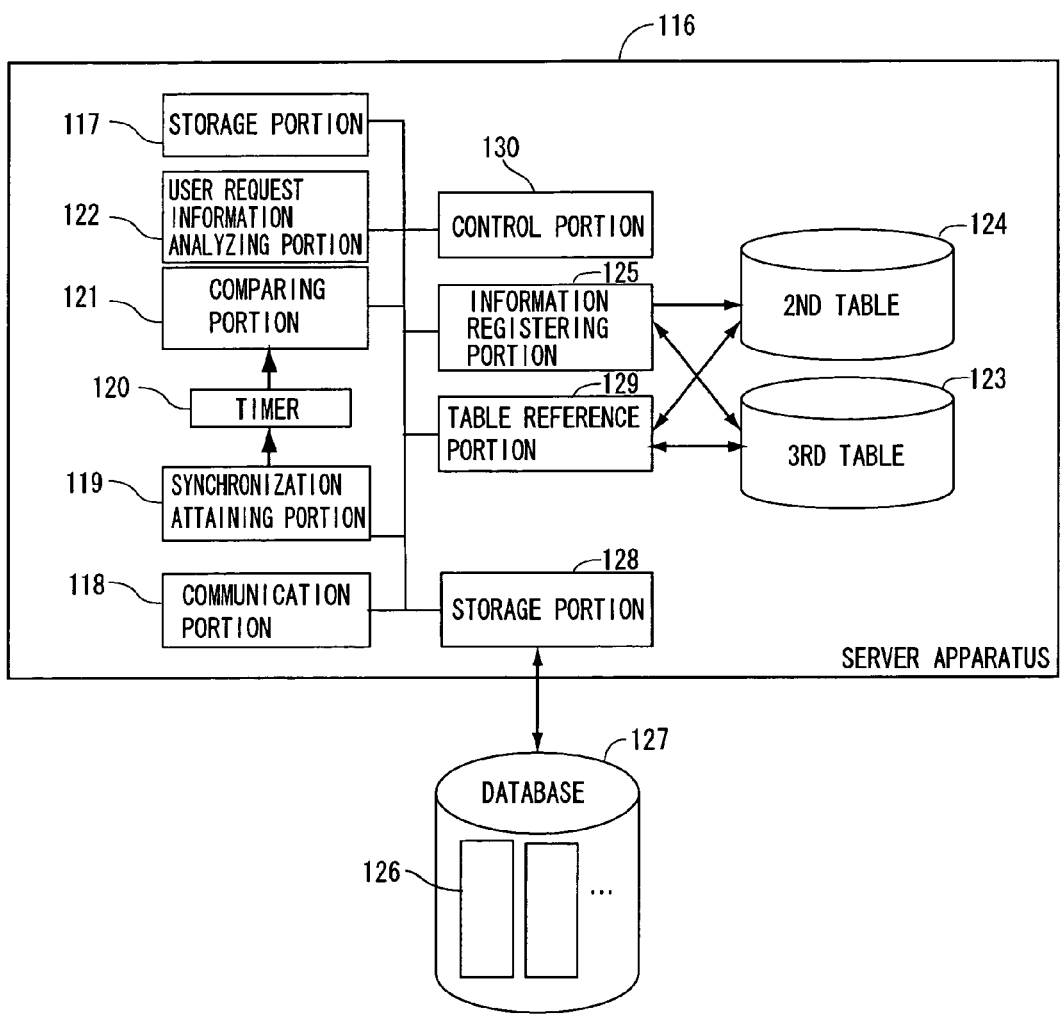
FIG. 6 is a block diagram of the information server apparatus in accordance with the first embodiment of the present invention.

FIG. 6 is a block diagram of information server apparatus 116. As shown in FIG. 6, information server apparatus 116 of the present embodiment includes: a storage portion 117 for storing location of contents data to be distributed and addresses of a plurality of client terminal apparatuses 101; a communication portion 118 for receiving user request information from client terminal apparatus 101 or registration information from contents provider terminal apparatus 131, or for transmitting provided contents data or the like to client terminal apparatus 101; a synchronization attaining portion 119 for attaining time-synchronization between client terminal apparatus 101 and contents provider terminal apparatus 131; and a timer 120 holding the time information synchronized by synchronization attaining portion 119.

Information server apparatus 116 further includes: a comparing portion 121 for comparing the time of timer 120 with the time for starting provision of contents to client terminal apparatus 101; a user information analyzing portion 122 analyzing the user request information received from client terminal apparatus 101 and extracting a user ID, information source information, time specifying information and the like;

an information registering portion 125 for registering such analysis information as above to a third table 123 storing the user request information, or for registering the information source information from the contents provider terminal apparatus to a fourth table 124; a storing portion 128 storing the contents data obtained from the contents provider in a database 127; a table reference portion 129 for selecting contents data corresponding to the user request information, by making a reference to tables 123 and 124; and a control portion 130 for controlling all these functional blocks.

As shown in FIG. 7, the second table 124 of information server apparatus 116 stores the information source information from the contents provider terminal apparatus, the information specifying the time of provision, information specifying the location of storage of the contents provider, and the location of storing contents in the database 127. Further, as shown in FIG. 8, the third table 123 in information server apparatus 116 stores the client IDs taken out from the user request information from the plurality of client terminal apparatuses, and the time information of client requests.

—Configuration of Contents Provider Terminal Apparatus 131—

Figure 9:
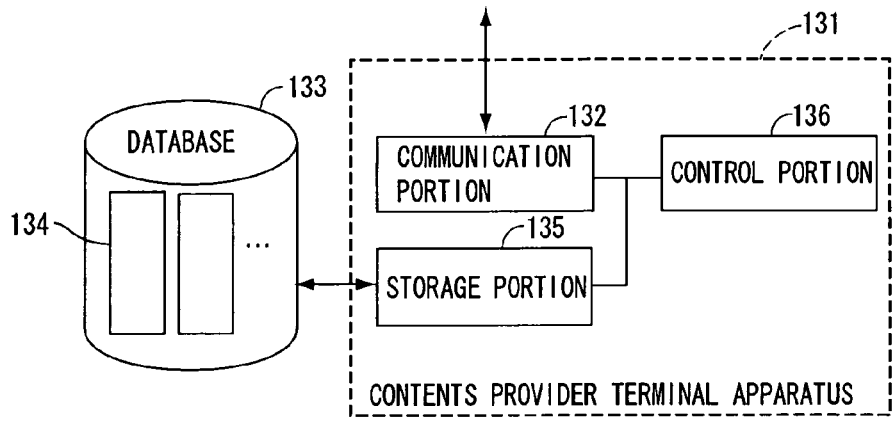
FIG. 9 is a block diagram of a contents provider terminal apparatus 131 in accordance with the first embodiment of the present invention.

Referring to FIG. 9, contents provider terminal apparatus 131 includes: a communication portion 132 transmitting information such as the information source information, time zone of provision, and condition for provision, as well as requested contents data to information server apparatus, and for receiving a request for getting contents data, from information server apparatus 116; a storage portion 135 for storing the contents data to be provided to information server apparatus 116 in a database 134; and a control portion 136 controlling all these functional blocks.

—Computer Implementation: Hardware Configuration—

The client terminal apparatus 101 shown in FIGS. 1 to 4 is substantially formed by a computer. In the present embodiment, however, the client terminal apparatus 101 is capable of receiving a displaying the TV broadcast, and therefore, it is different from a common computer in that it includes a TV tuner.

Figure 10:
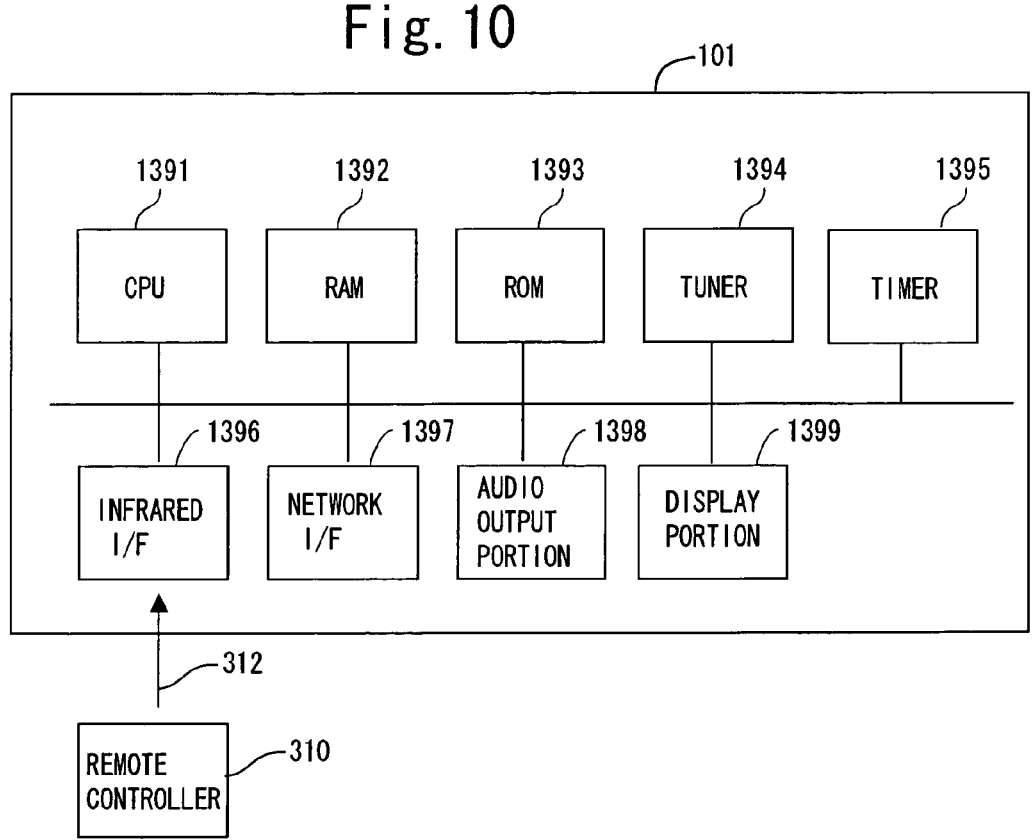
FIG. 10 is a block diagram showing a hardware configuration of the client terminal apparatus in accordance with the first embodiment of the present invention.

Referring to FIG. 10, client terminal apparatus 101 includes: a central processing unit (CPU) 1391 executing software having such a control structure as will be described later; a random access memory (RAM) 1392 used as a work area when a program is executed; a read only memory (ROM) for storing static information including a program and various tables; a tuner (or reproducing portion selecting and reproducing video images from a storage medium) 1394 for receiving a broadcast; a timer 1395 counting time (corresponding to a timer 111 of FIG. 4); and a remote controller 310.

Client terminal apparatus 101 further includes: an infrared interface (I/F) 1396 for receiving a command by infrared ray 312 from remote controller 310 performing infrared communication; a bi-directional network I/F 1397 for communication with an external network; an audio output portion 1398 for providing an audio output; and a display portion 1399 for providing a web page display and various other displays.

It is preferred that a non-volatile memory (for instance, a flash memory) that allows rewriting to be ready for program update, is used as ROM 1393.

Information server apparatus 116 and contents provider terminal apparatus 131 and the like are also substantially formed by computers, and have approximately the same hardware configuration as client terminal apparatus 101. It is noted, however, that the portions particular to the client terminal apparatus such as tuner 1394, infrared I/F 1396, remote controller 310 or audio output portion 1398 are not included, while a large scale storage apparatus such as a hard disk for operating database is included.

—Control Program of Client Terminal Apparatus 101—

The control structure of the control program in control portion 115 of client terminal apparatus 101 in accordance with the first embodiment of the present invention shown in FIGS. 1 to 4 will be described with reference to the flowcharts of FIGS. 11 and 12.

Figure 11:
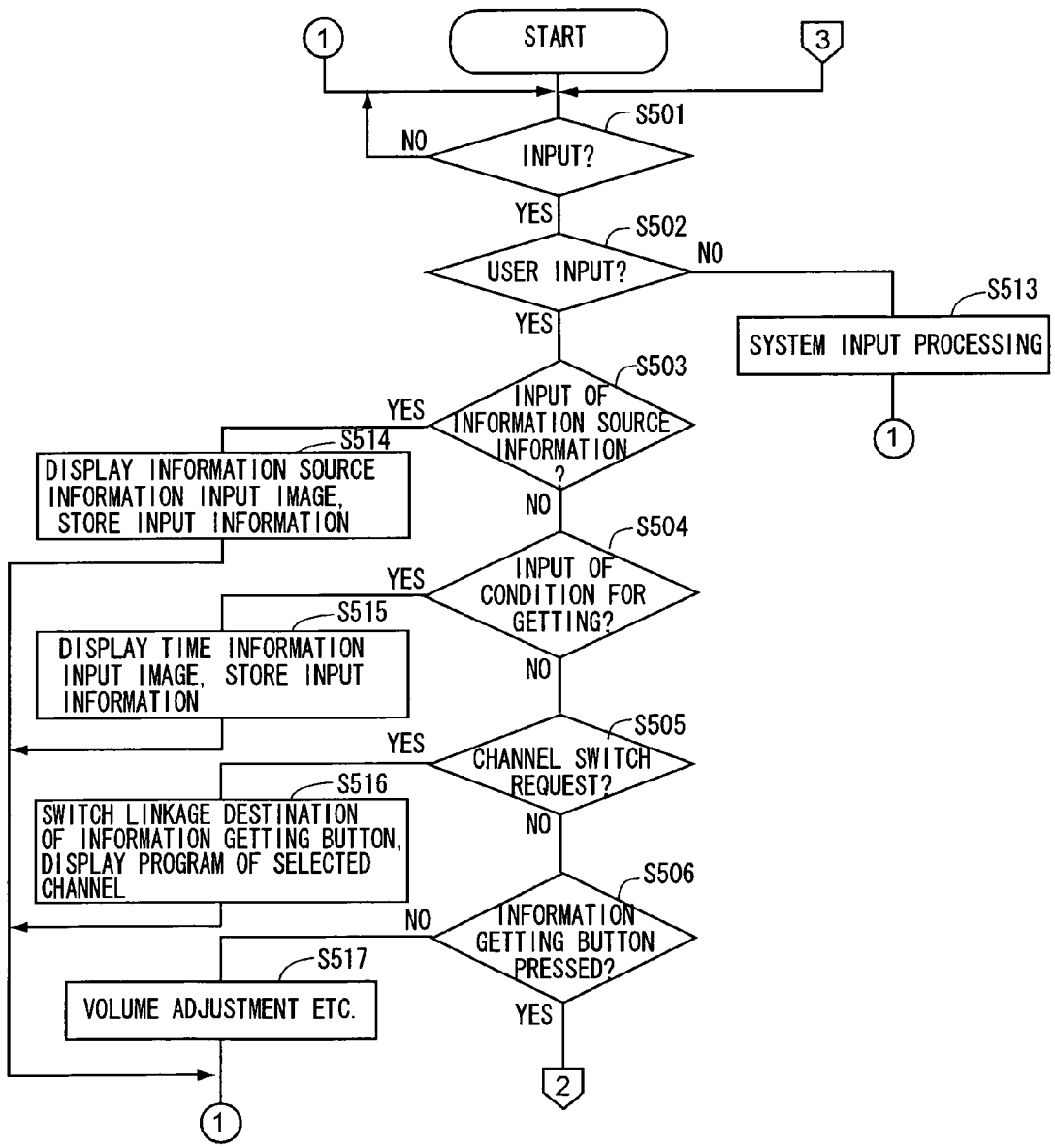
FIGS. 11 and 12 are flowcharts representing a control structure of the program executed by a control portion of the client terminal apparatus in accordance with the first embodiment of the present invention.

Referring to FIG. 11, when a program for the control portion of client terminal apparatus 101 is activated, in step 501, the control waits for an input, while a broadcast program is displayed on the TV or display. When there is an input, the control proceeds to step S502. By way of example, when a user clicks an information getting button 332 (see FIG. 3) of remote controller 310 and thereby issues a request for getting information to client terminal apparatus 101, determination in step S501 will be YES, and the control proceeds to step S502.

In step S502, whether the input is a user input or not is determined. If it is a user input, the control proceeds to step S503. If it is not a user input, the input is a system input, and therefore the control proceeds to step S513, in which a process corresponding to the system input is performed. When the process for the system input is completed, the control returns to step S501.

In step S503, whether the user input requests an input of information source information or not is determined. The information source information is for specifying the source that provides the contents data corresponding to each broadcast channel. Typically, the information source information is the URL of the corresponding contents data. When the user input requests an input of the information source information, the control proceeds to step S514, and otherwise, the control proceeds to step S504.

In step S514, an image allowing the user to input the URL is displayed. Via information source information input portion 103, the input of information source information by the user of each broadcast channel is received. The input information is registered by information maintaining portion 108 from the first table 107. Thereafter, display of the broadcast program is resumed. The control returns to step S501.

In step S504, whether the user requested an input of a designated time in the past or in the future is determined. The time is necessary when the contents data related to a program broadcast in the past or contents related to a program to be broadcast in the future are to be obtained. When the user requests input of such a designated time, the control proceeds to step S515, and otherwise, the control proceeds to step S505.

In step S515, an image allowing input of time information is displayed. Via time information input portion 104, the time specifying information input by the user is received and the input information is stored in storage portion 106. A time information flag is rewritten to "designated time" and the broadcast program is displayed again. Thereafter, the control returns to step S501.

In step S505, whether the user requests channel switching of the broadcast program or not is determined. If the user requests channel switching, the control proceeds to step S516, and otherwise, the control proceeds to step S506.

In step S516, client terminal apparatus 101 refers to the first table 107 using table reference portion 109, reads the information source information corresponding to the selected broadcast channel, and stores the read information in storage portion 106. Client terminal apparatus 101 further displays the program of the selected broadcast channel, and then the control returns to step S501.

In step S506, whether the user requests information related to the contents of the broadcast program that the user watches at presents or not is determined. When the user requests getting information, the control proceeds to step S507 shown in FIG. 12, and otherwise, it is determined that the user makes other request such as change in audio volume, and the control proceeds to step S517.

In step S517, control portion 115 processes the request from the user such as the change in volume, and thereafter, returns the control to step S501.

Figure 12:
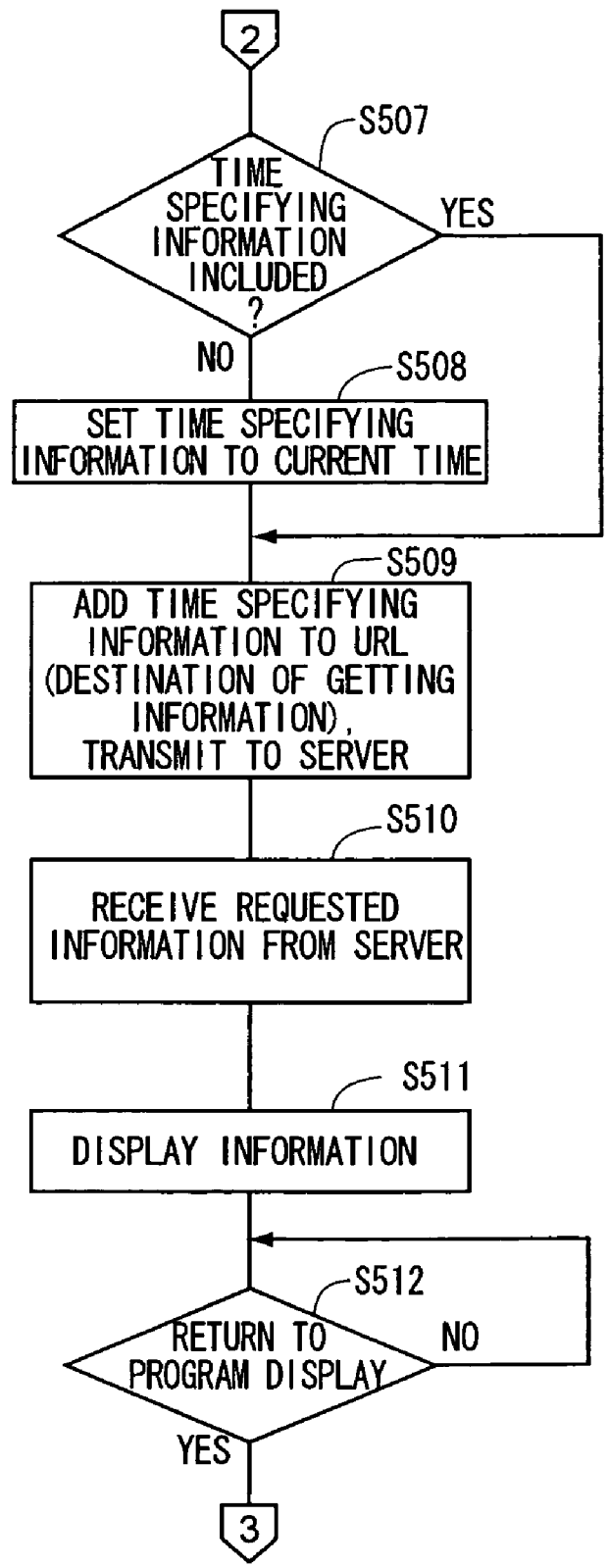

In step S507 of FIG. 12, whether the user input has time specifying information attached or not is determined. As will be described later, a value of the time information flag of storage portion 106 is referred to for this purpose. When the time information flag represents the "current time" and it is determined that the user requests getting contents data of the current time, the control proceeds to step S508. Otherwise, that is, when the time information flag of storage portion 106 represents "designated time," it means that the user input has time specifying information attached, and therefore, the control proceeds to step S509.

In step S508, control portion 115 obtains the time when the user pressed the button as time information from timer 111, and stores the same in storage portion 106. The control proceeds to step S509.

In step S509, the URL="http://www.1channel.co.jp" corresponding to the selected channel (channel 1) stored in storage portion 106 is read as the information source information. Further, the time specifying information is added to the information source information to form user request information, which information is transmitted to information server apparatus 116 that serves to provide information. At this time, client terminal apparatus 101 waits for the arrival of requested contents data from the server, while displaying a message "transferring data . . . " on the screen.

In step S510, the requested information is received from information server apparatus 116, and the information is stored by provided information storage portion 114. The control proceeds to step S511, in which the stored information is displayed on the display apparatus, by display portion 105. Consequently, the user can watch the requested information.

In step S512, whether there is an input that requests returning to the original program display or not is determined, and the control waits until the input that requests returning to the original program is received. When there is an input that requests returning to the original program, the control returns to step S501, and the program of the broadcast channel that was displayed before the display of related contents data is displayed.

The control structure of the program executed by control portion 115 of client terminal apparatus 101 is as described above.

—Information Server Apparatus 116—

Next, the control structure of the program executed by control portion 130 of information server apparatus 116 shown in FIG. 6 will be described with reference to FIG. 13.

Figure 13:
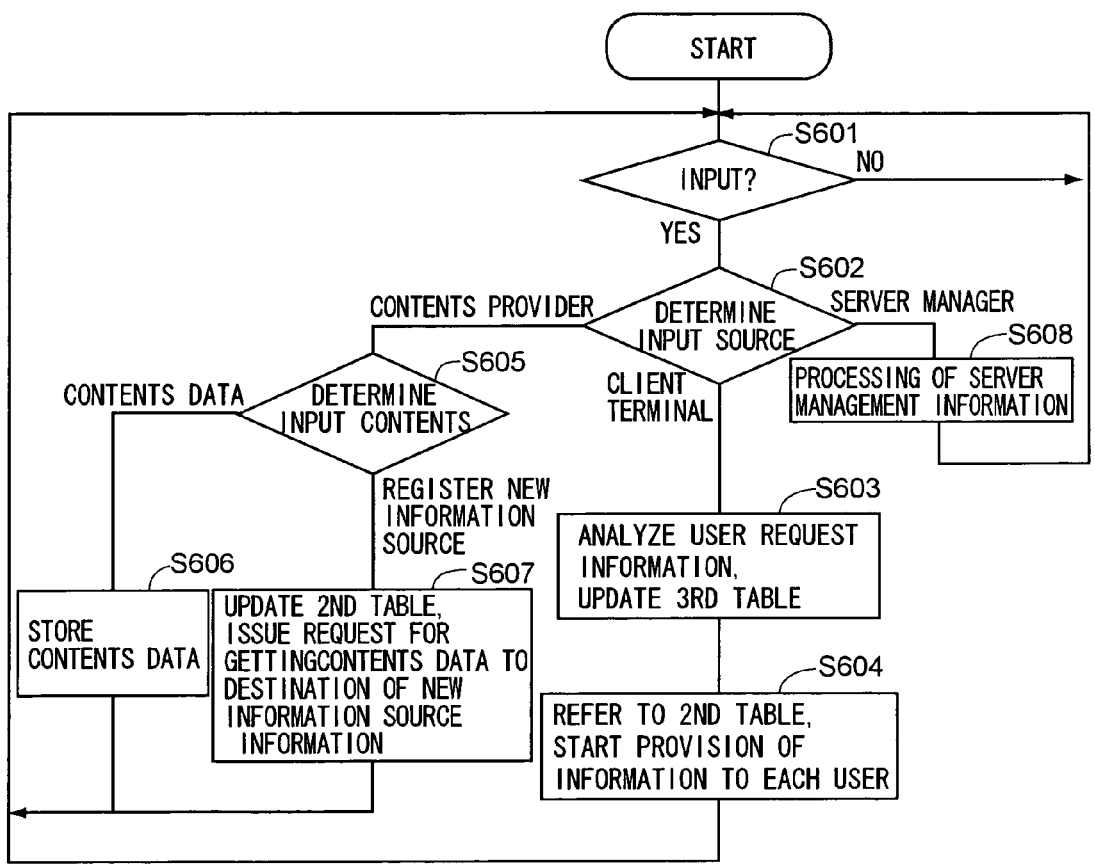
FIG. 13 is a flowchart showing a control structure of a program executed by a control portion of the information server apparatus in accordance with the first embodiment of the present invention.

Referring to FIG. 13, control portion 13 of information server apparatus 116 waits for any input in step S601. When there is an input, the control proceeds to step S602.

In step S602, whether the source of the input is a client terminal, a server manager, or a contents provider (data registration request from contents provider terminal apparatus 131 providing the related information shown in FIG. 1) is determined. If the source of input is a client terminal, the control proceeds to step S603, if it is a server manager, the control proceeds to step S608, and if it is a contents provider, the control proceeds to step S605.

In step S605, a process that is to be executed when the input source is a contents provider starts. First, in step S605, whether the input from contents provider terminal apparatus 131 of FIG. 1 is the contents data as requested or information for newly registering the information source information is determined. If the input is contents data, the control proceeds to step S606, and otherwise, the control proceeds to step S607.

In step S606, control portion 130 stores the contents data through storage portion 128 to database 127. Thereafter, the control returns to step S601.

In step S607, the input information for new registration is registered in the second table 124 through information registering portion 125. Further, in accordance with the newly registered information source information, a request for getting contents data is issued to contents provider terminal apparatus 131. Thereafter, the control returns to step S601.

When contents provider terminal apparatus transmits the contents data to information server apparatus 116 in response to the request, information server apparatus 116 stores the contents data received from the contents provider terminal apparatus, in step S606.

In step S602, when the input is determined to be an input from a manager of the information server apparatus, the following process is performed. In step S608, a process for the input for managing the information server apparatus or a process for other input is performed. Thereafter, the control returns to step S601.

Finally, if it is determined in step S602 that the input is from the client terminal apparatus 101, the following process is performed. In step S603, the user request information is analyzed by user information analyzing portion 122. Further, for every piece of information source information, the user ID and the time specifying information are registered by information registering portion 125 to the third table 123. Thereafter, the control proceeds to step S604.

In step S604, table reference portion 129 refers to the second table 124 and the third table 123, to read the location of contents data in database 127 and the user ID (identifying information) as the destination of provision, and distribution of the corresponding contents data is started through communication portion 118. Then, the control returns to step S601.

The operation of the system in accordance with the first embodiment will be described with reference to a specific example in the following. As shown in the manner of use of FIG. 2, it is assumed that the user is enjoying a broadcast program from a broadcasting station, on a TV screen of client terminal apparatus 101. Control portion 501 of client terminal apparatus 101 is waiting for any input in step S501 shown in FIG. 11, while the broadcast program is being displayed on the TV or on the display screen.

By way of example, assume that on Nov. 19, 2002, at 09:02:35, while the user is watching channel 8, a commercial message of a car (hereinafter simply referred to as a "CM") is displayed. Assume that the user wishes to get detailed information of the car. Then, the user clicks information getting button 332 on remote controller 310. By this operation, a request for getting information is issued to client terminal apparatus 101. The time information flag of storage portion 106 shown in FIG. 4 is set to a value indicating "present time."

At control portion 115 of client terminal apparatus 101, it is determined in step S502 of FIG. 11 that the input is a user input. The control proceeds to step S503.

At this time, the user does not request input of the URL (information source information) of the source that provides the contents data corresponding to each broadcast channel.

Therefore, the answer of determination in step S503 is "NO", and the control proceeds to step S504.

Further, what is requested by the user is not the input of designated time in the past or in the future that is necessary when the contents data related to a program broadcast in the past or the contents of data related to a program that will be broadcast in the future are to be obtained. Therefore, the result of determination in step S504 is "NO". Thus, the control proceeds to step S505.

Here, the user does not request channel switching from the broadcast program, either. Therefore, the result of determination in step S505 is "NO", and the control proceeds to step S506.

In step S506, whether the user requests getting information related to the contents of the program that the user watches or not is determined. Here, the result of determination is "YES". Therefore, the control proceeds to step S507.

In step S507, the time information flag of storage portion 106 indicates the "present time," and therefore, it is determined that the user requests getting the contents data corresponding to the present time. The control proceeds to step S508. In step S508, the time when the user pressed the button is obtained as the time information from timer 111, and stored in storage portion 106. Then, the control proceeds to step S509.

In step S509, control portion 115 reads a URL corresponding to the selected channel (channel 1) stored in storage portion 106, by way of example, URL="http://www.1channel.co.jp" as the information source information. Control portion 115 further adds time specifying information indicating the time when the user pressed the button (in a form such as "t=02_11_19_09_02_35"). As a result, user request information "http://www.1channel.co.jp/t=02_11_19_09_02_35" is formed. Control portion transmits the user request information as a request for getting information, to the information server apparatus that performs an information providing service. At this time, in client terminal apparatus 101 of the present embodiment, the displayed image is switched to one indicating that the data is being transferred when information getting button 332 is pressed, and the control waits for the arrival of the requested contents data from the server.

It is assumed that information server apparatus 116 is in a state of waiting for an input in step S601 of FIG. 13. When there is an input as described above from client terminal apparatus 101, control proceeds to step S602. In step S602, it is determined that the input is the user request information received from the client terminal apparatus. Then, control proceeds to step S603.

In step S603, control portion 130 analyzes the user request information "http://www.1channel.co.jp/t=02_11_19_09_02_35", using user information analyzing portion 122. Further, control portion 130 registers, for each information source information "http://www.1channel.co.jp", the user ID "230.122.4.155" and time specifying information "t=02_11_19_09_02_35" with the third table 123, using information registering portion 125. Then, control proceeds to step S604.

In step S604, control portion 130 refers to the second and third tables 124 and 123 using table reference portion 129, reads the location "D:1channwl/CM/car.rtp" of the contents data in database 127 and the user ID "230.122.4.155" as the destination of service, and distributes contents data "car.rtp" using communication portion 118.

In client terminal apparatus 101, the requested information is received from information server apparatus 116 in step S510, which information is stored by provided information storage portion 114. Then, control proceeds to step S511, and control portion 115 displays the stored information on display portion 105. As a result, the user can check the requested information related to the CM of the car that he/she is viewing. Thereafter, control proceeds to step S512, and waits for an input from the user to return the display image to the program display. When there is a request, control portion 130 returns the display image to the display of broadcast channel program that was displayed before the display of related contents data, and the control returns to step S501.

In the flowchart for information server apparatus 116 shown in FIG. 13, if it is determined in step S602 that the request is a data registration request from contents provider terminal apparatus 131 providing the related information shown in FIG. 1, control proceeds to step S605. In step S605, whether the input from contents provider terminal apparatus 131 of FIG. 1 is the requested contents data or new registration information of the information source information is determined. If it is determined to be the contents data, control proceeds to step S606. In step S606, storage portion 128 stores the contents data in database 127.

If it is determined in step S605 that the input is the new registration information, control proceeds to step S607. In step S607, the input new registration information is registered with the second table 124 by information registering portion 125. Further, in accordance with the newly registered information source information, a request for getting contents data is issued to contents provider terminal apparatus 131. By way of example, when the contents data of a commercial message of a car (hereinafter referred to as "CM") is to be provided, the contents provider registers in step S607 the data location (for example, "http://www.1channel/CM/car.rtp") and the time of provision (for example, "02:11:19:09:00-9:05") in advance. Thereafter, the server terminal apparatus issues a request for getting the contents data to the contents provider terminal apparatus, and in step S606, the contents data received from the contents provider terminal apparatus are stored.

When the condition is different from above, the details of operations of client terminal apparatus 101 and information server apparatus 116 naturally differ from those described above. The control structure of the program for realizing such operations is as described above. The operations when the condition differs would be readily understood by a person skilled in the art, and therefore, detailed description thereof will not be repeated here.

As described above, in the system of the first embodiment, when the user presses the "information getting" button 332 on remote controller 310, the time specifying information at that time is transmitted together with the request for getting information to information server apparatus 116. Based on the request with the time specifying information, information server apparatus 116 can read appropriate information related to the channel viewed by the user of client terminal apparatus 101 from the database, and can distribute the information to client terminal apparatus 101. It becomes possible for the user to see the appropriate information related to the information he/she is viewing, by a single pressing of the button.

Second Embodiment

In the information server apparatus in accordance with the second embodiment described in the following, network delay is calculated and the number of client accesses is counted up, and the delay information and the count information are passed to the client terminal apparatus. Further, the information server apparatus arranges time schedule of providing information to the client and switches information to be provided, in accordance with the delay information and the count information. Further, updating of the information to be provided, summary of the updated information, and an instruction for automatically getting the updated information are transmitted to the client terminal apparatus. Further, the information server apparatus returns the information requested by the client terminal apparatus as well as information provided preceding and succeeding in time the requested information, to the client terminal apparatus.

In the client terminal apparatus in accordance with the second embodiment, display appears after the related information returned from the information server apparatus is fully obtained. At this time, even after the display image is switched to the related information, voice/sound of the broadcast program or storage medium viewed before the switching is kept continuously output. Further, when allocating the broadcast program to a button, the destination for getting information is registered, and whether the time specifying information is to be added or not at the time of getting information is set. Further, by the operation of information getting button 332 or information storage button 334 by the user, instead of getting information immediately as the button is pressed, some time after the pressing of the button, it is possible to get information related to the program of the channel that had been viewed when the button was pressed, by obtaining information indicating the time when the button was pressed. As will be described later, in the client apparatus in accordance with the second embodiment, keyword registration is allowed as a means for allowing the function of automatically getting program information desired by the user.

In the client apparatus, a keyword is stored in a storage portion. From the information server apparatus, summary information briefly indicating the contents of the information provided from a certain information source is transmitted to the client apparatus. Accordingly, it is possible for the client apparatus to see whether there is a match between the summary information and a keyword stored beforehand. When there is any summary information that matches the stored keyword, the information can be automatically obtained without any user operation. Similarly, when some important information is transmitted from the information server apparatus to the user, the information can be displayed and a notification that the information is important can be given.

The client terminal apparatus in accordance with the second embodiment receives notification related to the network access delay time or state of accessing to the information source to which request is issued, from the information server apparatus, and displays accordingly. Finally, when the client terminal receives an instruction to stop getting information from the information server apparatus, the client terminal apparatus stops getting information following the instruction, and notifies the user to that effect.

Figure 14:
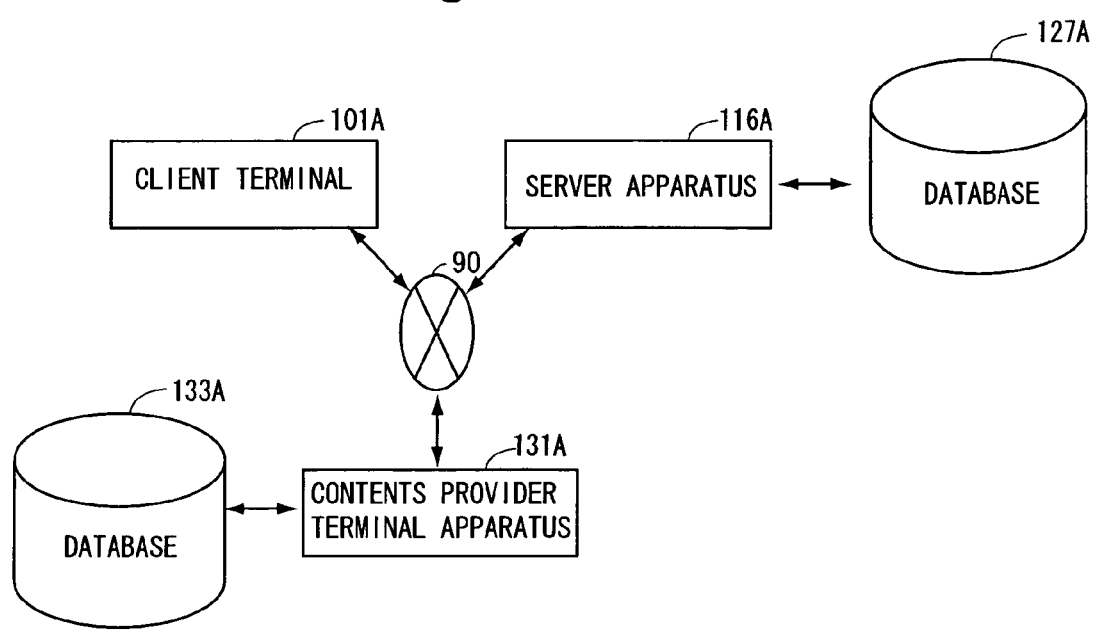
FIG. 14 is a system diagram representing an overall configuration of the information provision system in accordance with a second embodiment of the present invention.

FIG. 14 is an overall block diagram of the system in accordance with the second embodiment. The system configuration is similar to that shown in FIG. 1, except that client terminal apparatus 101, information server apparatus 116, database 127, contents provider terminal apparatus 131 and database 133 are replaced by client terminal apparatus 101A, information server apparatus 116A, database 127A, contents provider terminal apparatus 131A and database 133A, respectively having functions modified in a prescribed manner.

—Configuration of Client Terminal Apparatus 101A—

Figure 15:
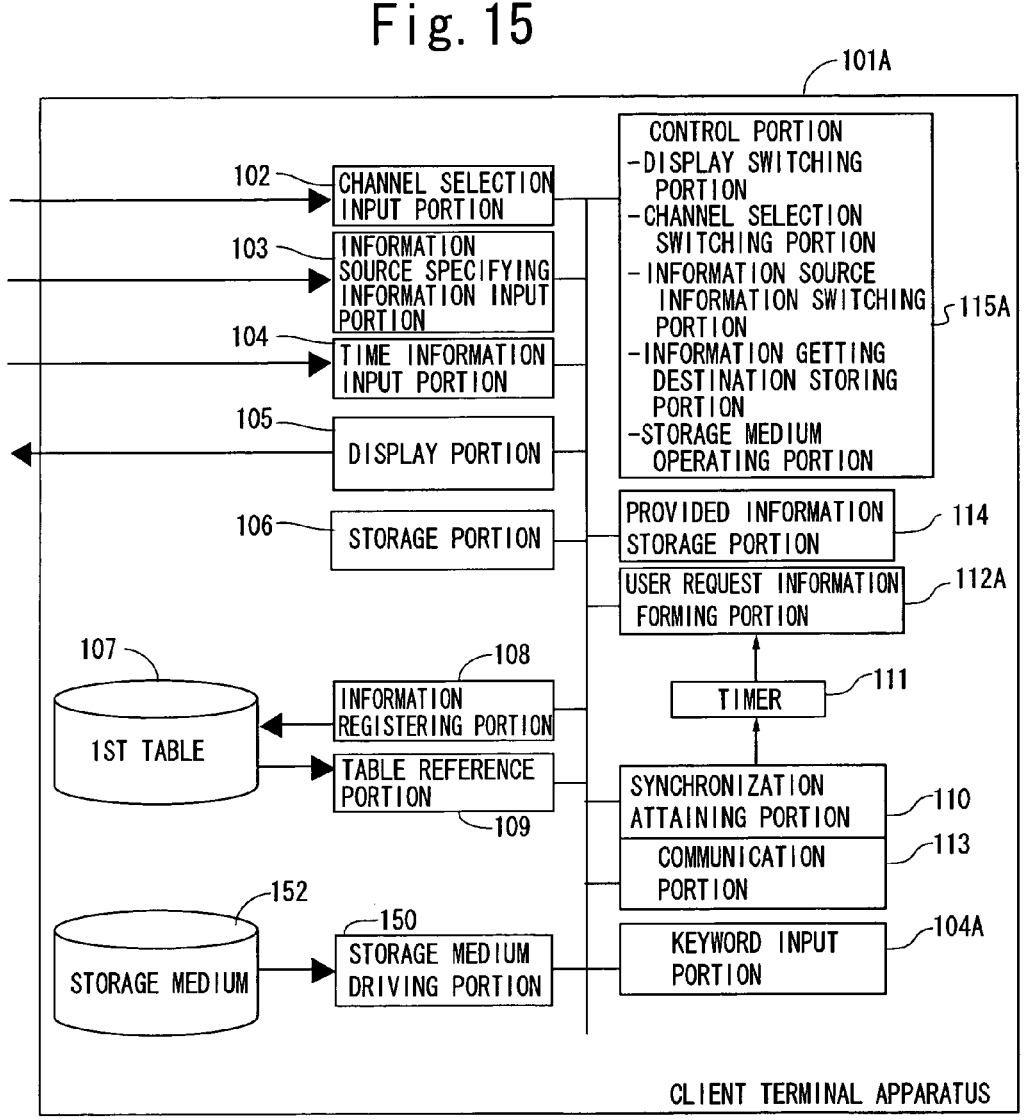
FIG. 15 is a block diagram of the client terminal apparatus in accordance with the second embodiment of the present invention.

FIG. 15 is a block diagram of client terminal apparatus 101A. Client terminal apparatus 101A differs from client terminal apparatus 101 shown in FIG. 4 in the following points: it includes a storage medium driving portion 150 driving a storage medium 152 such as a DVD (Digital Versatile Disc) for reproducing contents and a keyword input portion 104A; in place of control portion 115 shown in FIG. 4, it includes a control portion 115A additionally including an information destination storage processing portion performing a process for storing information destination and a storage medium operating portion controlling the storage medium driving portion 150; and in place of user request information forming portion 112 shown in FIG. 4, it includes a user request forming portion 112A including, in addition to the function of user request information forming portion 112, a function of forming the user request information based on the stored information destination information.

In FIG. 15, portions corresponding to those of FIG. 14 are denoted by the same reference characters. They have the same names and functions. Therefore, detailed description thereof will not be repeated here.

—Configuration of Information Server Apparatus 116A—

Figure 16:
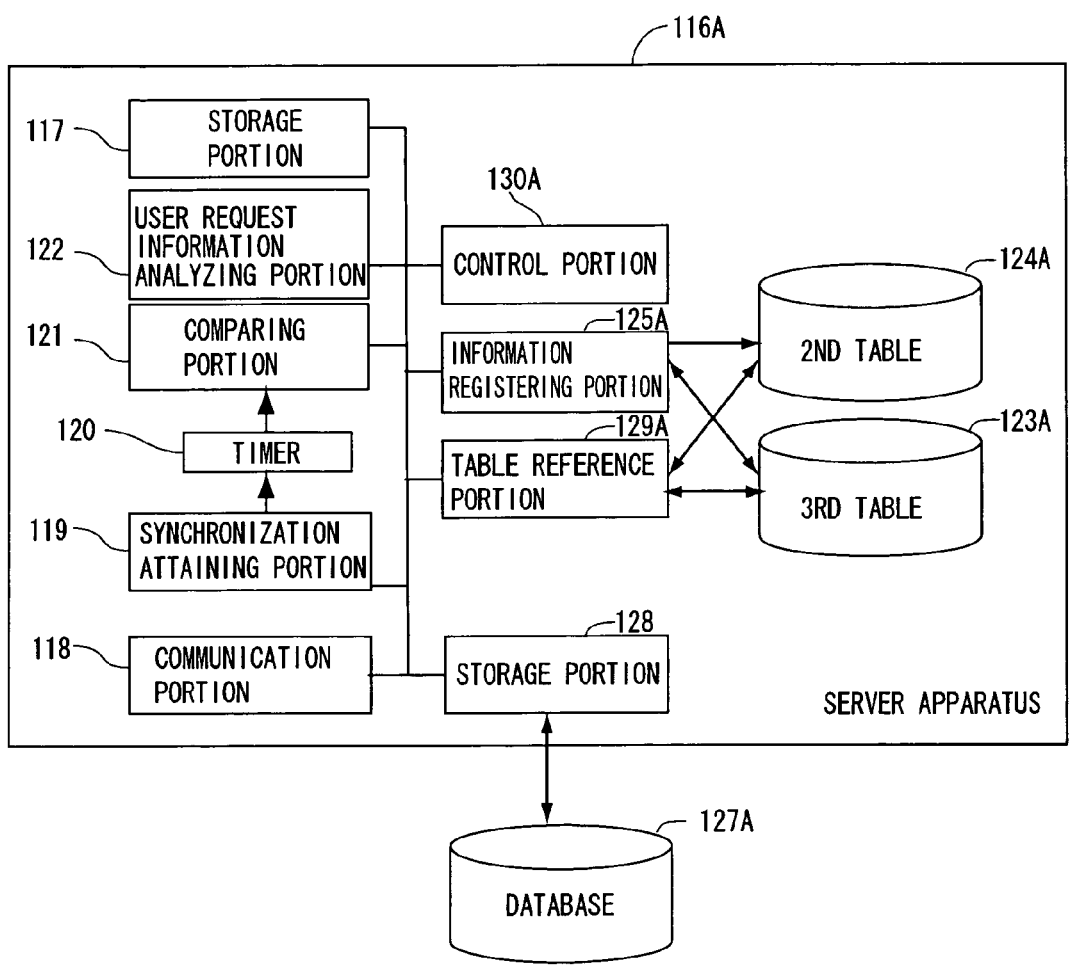
FIG. 16 is a block diagram of the information sever apparatus in accordance with the second embodiment of the present invention.

FIG. 16 is a block diagram of information sever apparatus 116A. Information server apparatus 116A has a configuration similar to that of information server apparatus 116 shown in FIG. 6. In formation server apparatus 116A differs from information server apparatus 116 in that it includes, in place of the second table 124, a second table 124A having such a form as shown in FIG. 17, 19 or 20; in place of the third table 123, a third table 123A having such a form as shown in FIG. 18; and reflecting the change in table forms, information registering portion 125A and table reference portion 129A having functions modified from those of information registering portion 125 and table reference portion 129 of the first embodiment.

In FIG. 16, portions corresponding to those of FIG. 14 are denoted by the same reference characters. They have the same names and functions. Therefore, detailed description thereof will not be repeated here.

Referring to FIGS. 17, 19 and 20, the second table 124A includes, for every content, information source information (specifically, URL), time zone in which the corresponding content is provided, start time of providing the corresponding content, location of the contents data on the side of the contents provider, location of the contents data in the server, and conditions for provision that must be satisfied when the contents are to be provided. FIGS. 17, 19 and 20 are shown to include different information, in order to describe various different operations in accordance with the present embodiment, as will be discussed later. For simplicity, the figures show only the portions related to the description.

In the following, the control structure of the program executed by control portion 115A of client terminal apparatus 101A in accordance with the second embodiment shown in FIGS. 21 to 23 and the control structure of the program executed by control portion 140A of information server apparatus 116A in accordance with the second embodiment shown in FIGS. 24 and 25 will be described, so as to describe the functions added to the client terminal apparatus 101A and information server apparatus 116A, together with other functions.

—Information Server Apparatus 116A Arranging Schedule of Providing Information—

The function of information server apparatus 116A will be described. Information server apparatus 116A calculates network delay and counts-up the number of accesses by the clients, and notifies the client about the delay information and the count information. Further, information server apparatus 116A arranges time schedule of providing information to the client and switches information to be provided, in accordance with the information. Examples of the function will be described with reference to the second table 124A, which is the program related information providing table of information server apparatus 116A in accordance with the second embodiment, shown in FIGS. 17, 19 and 20.

In the present embodiment, in order to perform the above-described operation, information source switching information related to switching of information to be provided to the user in the client terminal, and count information indicating the number of accesses by the clients, are transmitted, in addition to the related information transmitted in the first embodiment, from information server apparatus 116A to the client terminal apparatus.

The information source switching information may include summary information briefly indicating the contents of the related information corresponding to the information, and an important information display instruction indicating that the information from the information source includes important information that requires some display to that effect.

—Control Program of Client Terminal Apparatus 101A—

Figure 21:
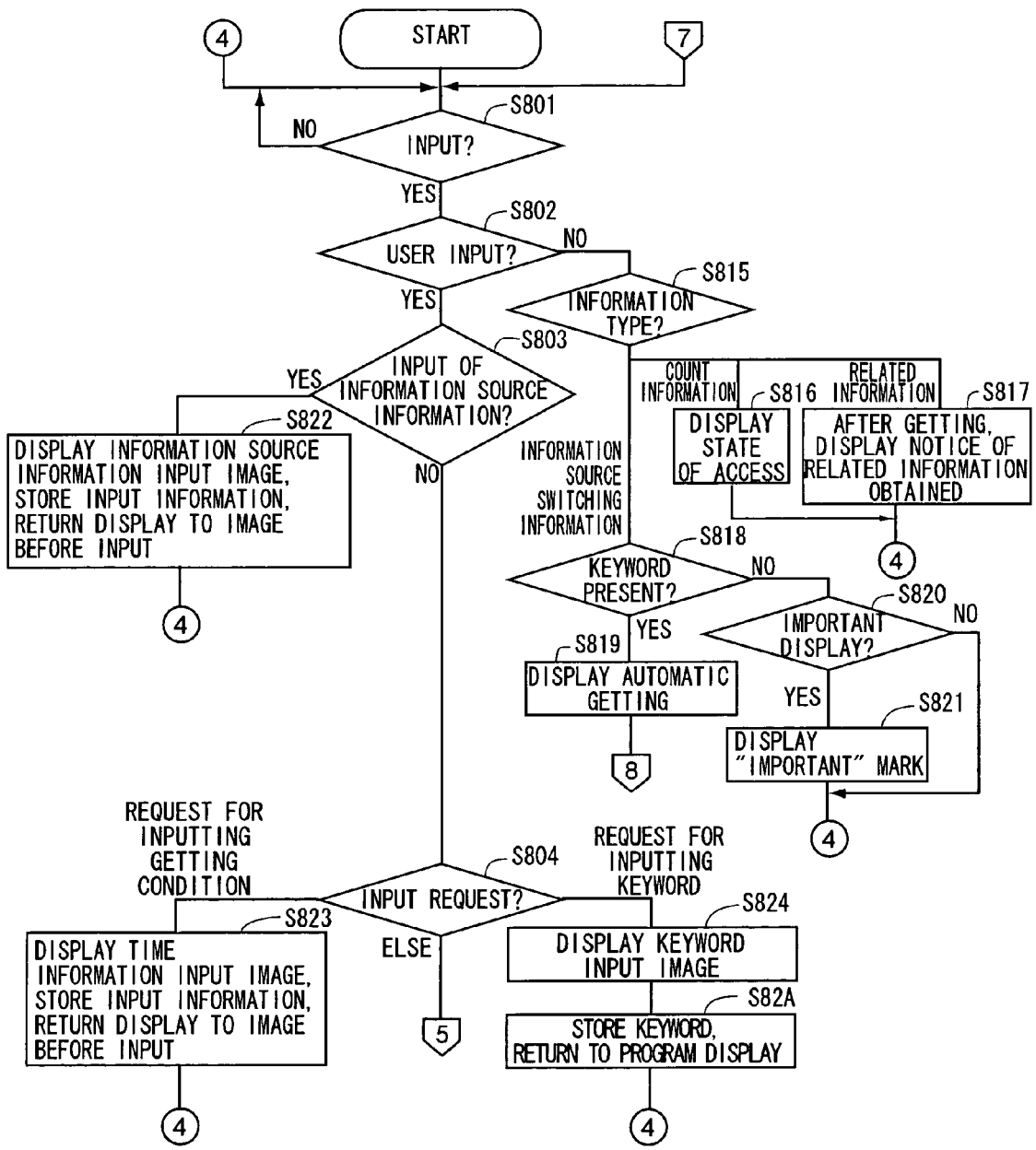
FIGS. 21 to 23 are flowcharts showing a control structure of the program executed by the control portion of the client terminal apparatus in accordance with the second embodiment of the present invention.
Figure 22:
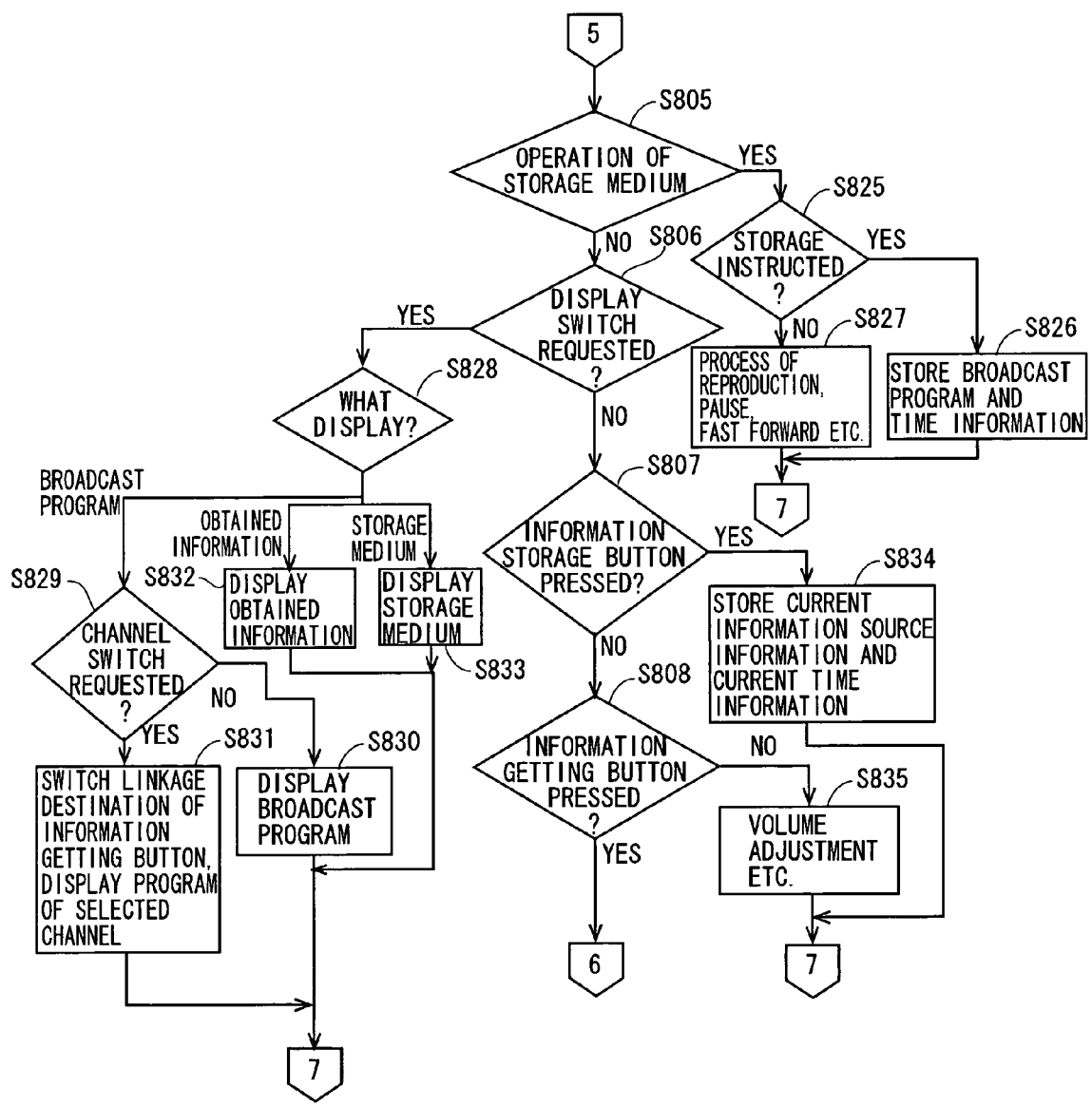
Figure 23:
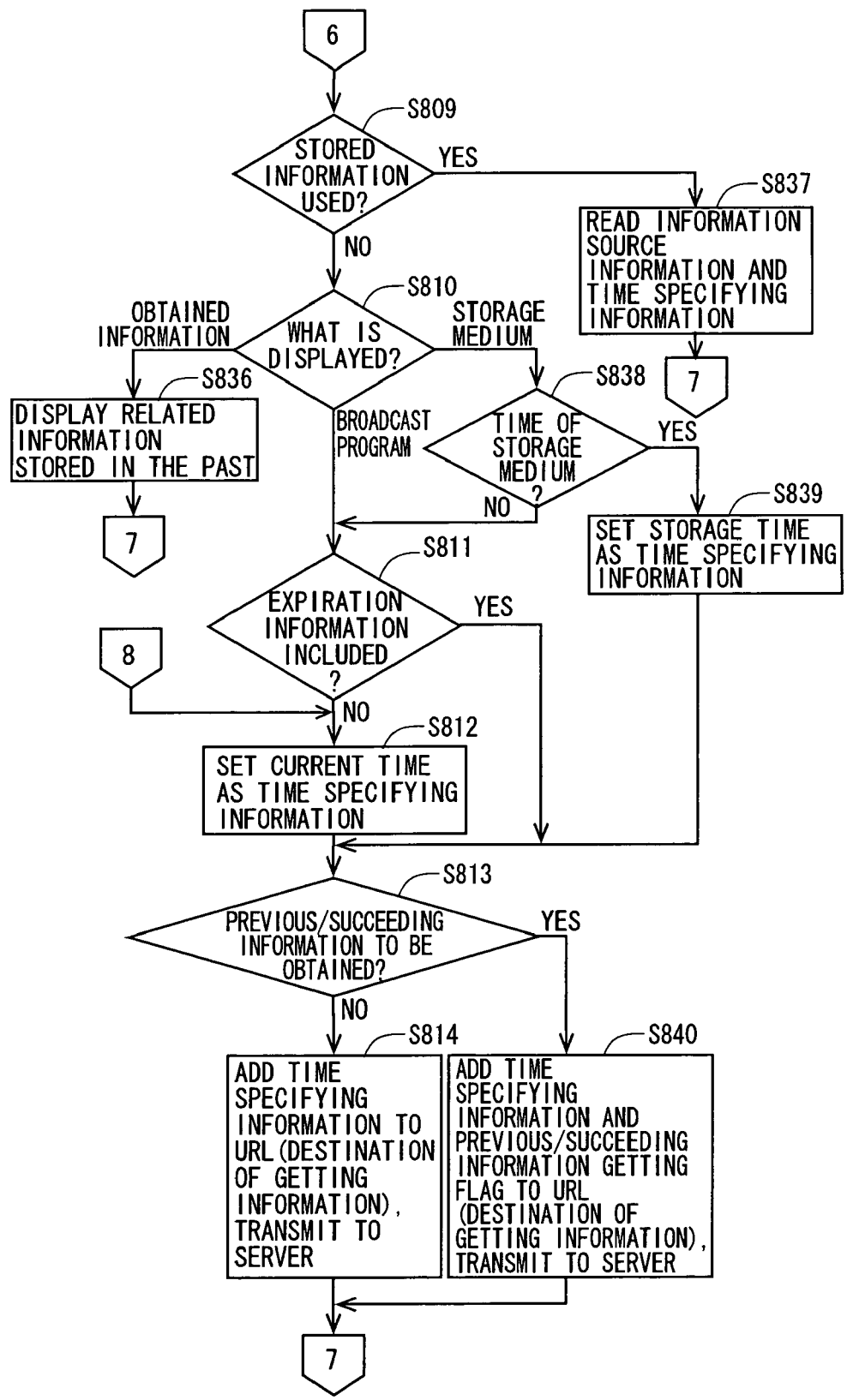

FIGS. 21 to 23 are flowcharts representing a control structure of a program executed by a control portion of client terminal apparatus 101A. The processes performed in steps S801 to S803 shown in FIGS. 21 to 23 are the same as the processes of steps S501 to S503 of FIG. 11. Therefore, detailed description thereof will not be repeated here. It is noted, however, that if the result of determination in step S802 is NO, the control proceeds to step S815, and the process performed in steps following step S815 is different from that performed in step S513 of FIG. 11.

Specifically, in step S815, whether the received information is the information source switching information, the count information or the related information is determined. In accordance with the result of determination, control proceeds to step S818, S816 or S817.

In step S818, keywords stored in advance in storage portion 106 is read, compared with the summary information in the information source switching information, and determination is made as to whether a word matching any of the keywords is detected from the summary information or not. When a word matching any of the keywords is detected, control proceeds to step S819, and otherwise, control proceeds to step S820.

In step S819, automatic transfer indication is displayed on the screen, notifying the user that the related information is automatically obtained (transferred) as a result of keyword matching. Thereafter, control proceeds to step S812 and the following steps shown in FIG. 23, so that the user request information on the related information retrieved by keyword search is transmitted to information server apparatus 116A. These processes will be described later.

In step S820, whether the important information display instruction is included in the information source switching information or not is determined. When it is determined that the important information display instruction exists, control proceeds to step S821, in which the important information display is given, and then, the control returns to step S801. Otherwise, control directly returns to step S801.

If it is determined in step S815 that the information is the count information, the state of access is displayed based on the count information in step S816, and control returns to step S801.

If it is determined that the information is the related information, control proceeds to step S817, and after the information is obtained, end of getting information is notified to the user, and control returns to step S801.

If it is determined in step S803 that the user input is the information source information, control proceeds to step S822. Otherwise, control proceeds to step S804.

In step S822, an image for inputting the information source information (typically a URL) is displayed to the user. Information source information input portion 103 receives the input information of the information source information with respect to each broadcast channel from the user. The input information is registered in the first table 107 by information maintaining portion 108, and the broadcast program is displayed again. Thereafter, control returns to step S801.

In step S804, whether the user input requires input of a specified time in the past or in the future, requires a keyword input for registering a keyword, or else is determined. The specified time in the past or in the future is necessary in order to get the contents data related to contents of a program broadcast in the past or contents data related to contents of a program to be broadcast in the future. If input of a specified time is required, control proceeds to step S823, if a keyword input is required, control proceeds to step S824, and otherwise, control proceeds to step S805 of FIG. 22.

In step S823, a dialog for inputting time information is displayed to the user. Time information input portion 104 receives the time specifying information input by the user, and the input information is stored by storage portion 106. The time information flag is replaced by "designated time," and the broadcast program is displayed again. Thereafter, control returns to step S801.

In step S824, the display image is switched to the image for inputting a keyword, and through keyword input portion 104A, input information is received from the user. Thereafter, in step S82A, the keyword is stored by storage portion 106, and the display image is returned to the original image that has been displayed before the input. Thereafter, control returns to step S801.

In step S805 of FIG. 22, whether the user input is an operation of the storage medium or not is determined. If the result of determination is YES, control proceeds to step S825, and otherwise, control proceeds to step S806.

In step S825, whether the user input instructs storage of the program that is being viewed or not is determined. If the user input instructs storage, control proceeds to step S826, and otherwise, control proceeds to step S827.

In step S826, in accordance with the broadcast channel number and the time zone designated by the user input, the contents of image display, contents of voice display, information source switching information and time for starting storage are stored. Thereafter, control returns to step S801.

In step S827, in accordance with the user input, the process for reproduction/pause/fast-forward and the like of the storage medium is performed. Thereafter, control returns to step s801.

If it is determined as a result of step S805 that the user input is unrelated to an operation of the storage medium, the following process is performed in steps S806 and after. Specifically, in step S806, whether the user input requests switching of the display or not is determined. If the switching of display is required, control proceeds to step S828, and otherwise to step S807.

In step S828, destination of display switching is determined. If it is a broadcast program, control proceeds to step S829, if it is the obtained information, control proceeds to step S832, and if it is the storage medium, control proceeds to step S833, respectively.

When switching to a broadcast program is instructed, in step S829, whether the user input is a channel selection request or not is determined. If it is a channel selection request, control proceeds to step S831, and otherwise, control proceeds to step S830, respectively.

In step S831, in accordance with the change of the channel to be displayed, link destination of the information getting button is changed, so that it becomes possible to get information related to that station. A program of the selected channel is displayed, and then control returns to step S801.

In step S830, a broadcast program is displayed without switching stations, as the user input is not a channel switching request. Thereafter, control returns to step S801.

In step S832, the display image is switched to the obtained information display image, and displays the obtained information. If the obtained information does not include any audio output, the audio output before switching the displays is continuously output. Thereafter, control returns to step S801.

In step S833, in accordance with the display switching request, a process for displaying the storage medium is executed. Then, control returns to step S801.

If it is determined in step S806 that the user input is not a display switching request, control proceeds to step S807, as already described. In step S807, whether the information destination storage (information storage) button (see FIG. 3) has been pressed by the user or not is determined. If the information destination storage button has been pressed, control proceeds to step S834, and otherwise, control proceeds to step S808.

In step S834, present information source information when the information destination button was pressed, and the present time information are stored. Thereafter, control returns to step S801.

In step S808, whether the information getting button has been pressed by the user or not is determined. If the information getting button has been pressed, control proceeds to step S809 (FIG. 23), and otherwise, control proceeds to step S835. In step S835, volume or the like is adjusted. Thereafter, control returns to step S801.

In step S809 of FIG. 23, whether information source information stored in the past is to be used or not for getting information is determined. If the stored information is to be used, control proceeds to step S837, and otherwise, control proceeds to step S810.

In step S837, the stored information source information and the time specifying information are read. Thereafter, control returns to step S801.

In step S810, what is displayed at present is determined. If the obtained information, broadcast program or storage medium is displayed, control proceeds to step S836, S811 or S838, respectively.

In step S836, related information obtained in the past is displayed. Thereafter, control returns to step S801.

In step S838, whether the time specifying information is the time of the storage medium or the current time is determined. If it is the time of the storage medium, control proceeds to steps S839. If it is not the time of the storage medium but the current time, control proceeds to step S811. Here, the time of the storage medium represents relative time from the start of reproduction of a package medium, and in an apparatus that can record, the time represents the time calculated from the absolute time point at which recording started and the relative time therefrom.

In step S839, the storage time of the storage medium is set as the time specifying information. Then, control proceeds to step S813.

In step S811, whether the input information getting request includes an expiration specifying information or not is determined. If it does not include the expiration specifying information, control proceeds to step S812, in which the present time is set as the time specifying information, and then control proceeds to step S813. Otherwise, control directly proceeds to step S813.

In step S813, whether the input information getting information requires, in addition to the related information of the program at that time point, related information of programs next to the said program in time, that is, programs of time zones preceding and succeeding the said program or not is determined. Such a request is issued when the "multi-time" button 326 shown in FIG. 3 is pressed. If the preceding and succeeding information is also requested, control proceeds to step S840, and otherwise control proceeds to step S814.

In step S840, the time specifying information and the preceding/succeeding information getting flag are added to the URL of the information getting destination, and transmitted as user multi-time request information to information server apparatus 116A. The preceding/succeeding information getting flag is to notify the information server apparatus 116A about the fact that the related information of the programs not only at the current time but also at the preceding and succeeding time is to be obtained. After step S840, control returns to step S801.

In step S814, the time specifying information is added to the URL of the information getting destination, and the result is transmitted as user request information, to information server apparatus 116A. Then, control returns to step S801.

—Control Program of Information Server Apparatus 116A—

The control structure of the program executed by control portion 130A of information server apparatus 116A is as follows. FIGS. 24 and 25 show flowcharts of the program.

Figure 24:
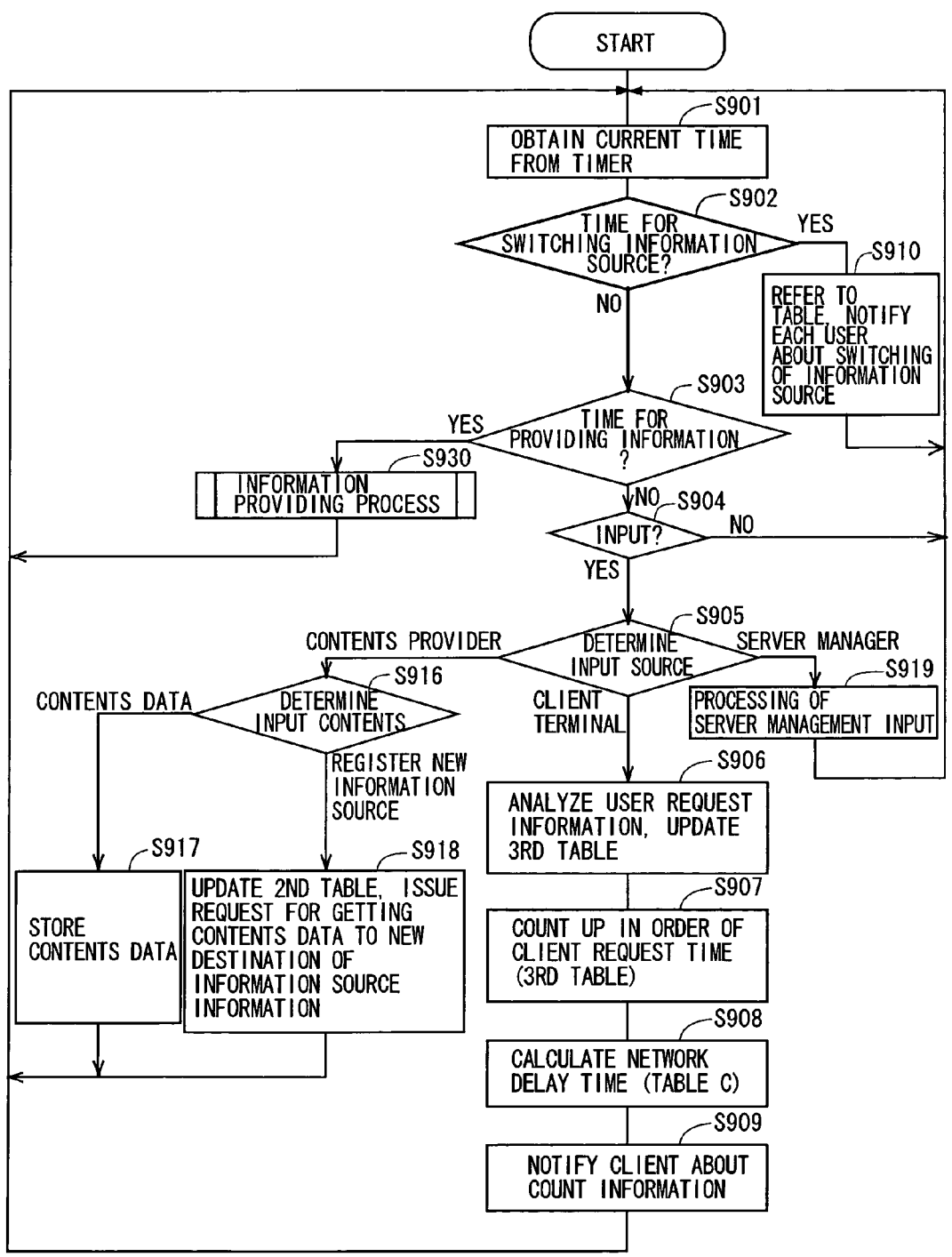
FIGS. 24 and 25 are flowcharts showing a control structure of the program executed by the control portion of the information server apparatus in accordance with the second embodiment of the present invention.
Figure 25:
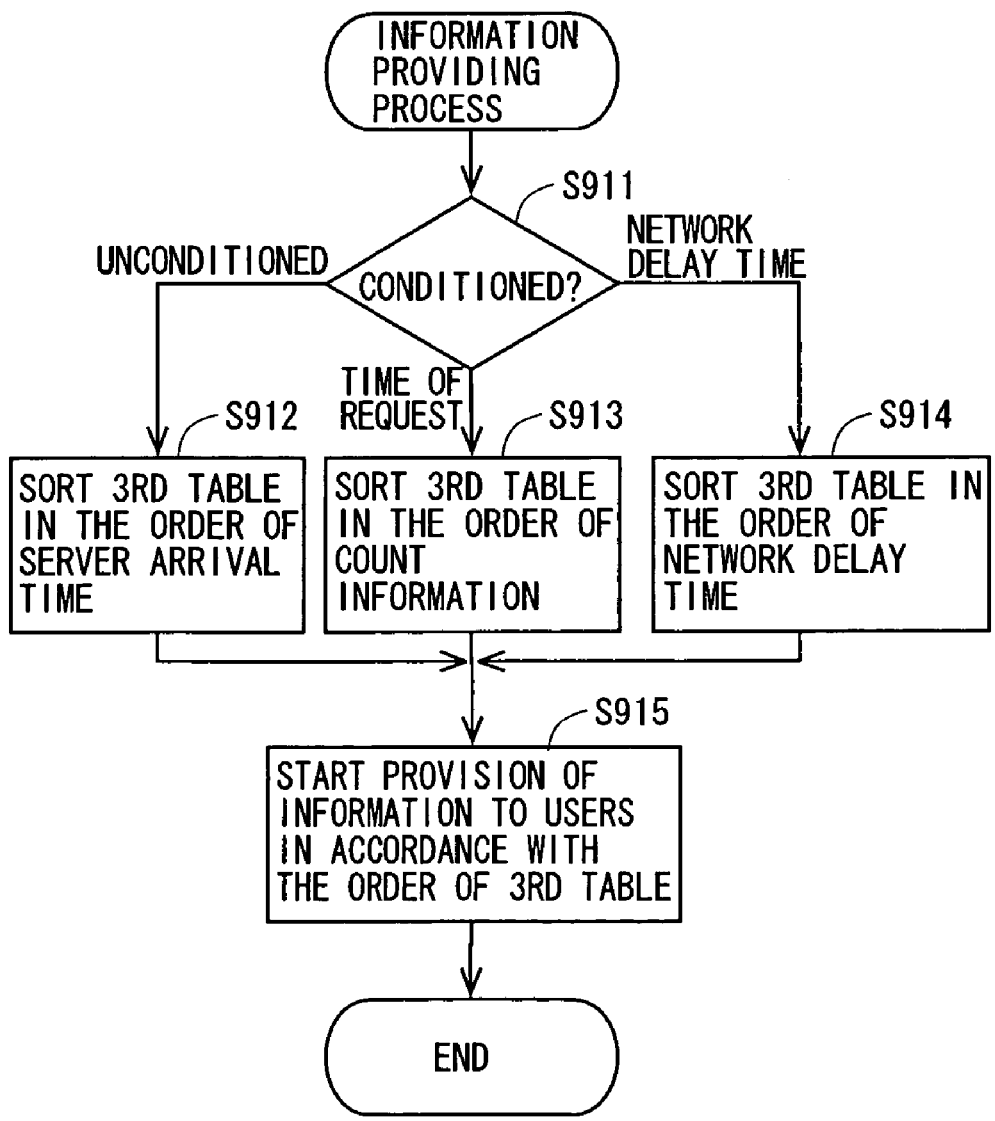

Referring to FIG. 24, in step S901, a time is obtained from timer 120 and stored in storage portion 117. Thereafter, in step S902, based on the obtained time, whether it is the time to switch the information source (information source switching time) or not is determined. If it is the information source switching time, control proceeds to step S910, and otherwise, control proceeds to step S903.

In step S910, information source switching information including the summary information briefly describing the contents of the program is transmitted to each client terminal apparatus. The summary information is prepared by the contents provider and stored in the information server apparatus. Then, control returns to step S901.

In step S903, the second table 124A of the program-related information providing table is referred to by the table reference portion 129A, and the time of providing information of each information source information is compared with the timer time stored in storage portion 117, by comparing portion 121. If the present time matches the starting time for providing the information source information requested by the user, control proceeds to step S930. Otherwise, control proceeds to step S904.

In step S904, the process for providing information is performed. Details are shown in FIG. 25. Referring to FIG. 25, first, in step S911, table reference portion 129A refers to the third table 123A, and determines whether the source of information to be provided includes the providing condition related to counter information in the client request information or not. If there is providing condition related to the time of request, control proceeds to step S913, if there is providing condition related to the network delay time, control proceeds to step S914, and if there is no condition, control proceeds to step S912, respectively.

In step S912, table reference portion 129A refers to the third table 123A, and sorts the client request information in the order of arrival at the server. Then, control proceeds to step S915. In step S913, table reference portion 129A refers to the third table 123A, and sorts client request information in the order of count information. Then, control proceeds to step S915. In step S914, table reference portion 129A refers to the third table 123A, and sorts the client request information in the order of network delay time. Then, control proceeds to step S915.

In step S915, in accordance with the order of client request information in the third table 123A, transmission of contents data starts. The process for providing information is thus completed, and the control returns to step S901 of FIG. 24.

Again referring to FIG. 24, in step S904, whether there is an input or not is determined. If there is an input, control proceeds to step S905. Otherwise, control returns to step S901.

In step S905, whether the input is from the contents provider, from a client terminal or from a server manager is determined. If it is from the contents provider, control proceeds to step S930. If it is from a client terminal, control proceeds to step S906. If it is from a server manager, control proceeds to step S919.

In step S916, whether the contents of the input from contents provider are the contents data or request for newly registering an information source is determined. If the input is the contents data, control proceeds to step S917, and if it is the request for newly registering an information source, control proceeds to step S918.

In step S917, the contents data transmitted from the contents provider is registered in database 127, using storage portion 128 shown in FIG. 16. Then, control returns to step S901.

In step S918, the input information to be newly registered is registered with the second table 124A by information registering portion 125A. Further, in accordance with the newly registered information source registering information, a request for getting contents data is issued to a contents provider terminal apparatus. Then, control returns to step S901.

If it is determined as a result of step S905 that the input is from a server manager, a process for the server management input is performed in step S919. Then, control returns to step S901.

If it is determined as a result of step S905 that the input is from a client terminal, the process starting from step S906 is performed. First, in step S906, user information analyzing portion 122 analyzes the user request information, and extracts a user ID and client request time. Further, for each information source information, information registering portion 125A registers the user ID and the client request time in the user-request information as well as the timer time stored in storage portion 117 as client request information with the third table 123A of the user-request information management table. Then, control proceeds to step S907.

In step S907, table reference portion 129A refers to the third table 123A, and in response to each client request information, counts up the information in the order of client request time, and prepares count information. Further, information registering portion 125A updates the count information of the third table 123A. Then, control returns to step S908.

In step S908, table reference portion 129A refers to the third table 123A, and calculates network delay time as a difference between the client request time in each client request information and the timer time stored in storage portion 117. Further, information registering portion 125A updates the network delay time in the third table 123A. Then, control proceeds to step S909.

In step S909, table reference portion 129A refers to the third table 123A, and transmits the count information and the network delay information registered in the third table 123A to client terminal apparatus 101A for each user. Thereafter, control returns to step S901. The control structure of the program executed by information server apparatus 116A is as described above.

—System Operation—

In the following, specific examples of the operations of client terminal apparatus 101A and information server apparatus 116A will be described.

—Scheduling of Providing Information in Information Server Apparatus 116A—

It is assumed that a user is watching a broadcast program from a broadcast station, on a TV screen. At this time, control portion 115A of client terminal apparatus 101A is in a standby state of step S801, while the broadcast program is being displayed on the TV or on a display.

Assume that a CM for ticket sales of a concert is displayed while the user is watching a program of channel 1, on Jun. 24, 2002, at 08:01:45. Assume that the user clicks the information getting button of a remote controller, to get more detailed information. In control portion 115A of client terminal apparatus 101A, in steps S802 to S811, it is determined that the input is a request from the user, of which contents is that the information related to the program being broadcast on channel 1 at 02:06:24:08:01:45 is to be obtained. As a result, control proceeds to step S812.

In step S812, user request information "http://www.1channel.co.jp/t=02_06_24_0801_45" is prepared, and in step S813, the user request information is transmitted to information server apparatus 116A that offers the information provider service. At this time, on the image viewed by the user, a massage "transferring data" is displayed for a prescribed time period, superposed on the program display.

Control portion 130A of information server apparatus 116A obtains a time from timer 120 in step S901, and stores the same in storage portion 117. In steps S902 to S905, it is determined that the user request information "http://www.1channel.co.jp/t=02_06_24_0801_45" is input from the client terminal apparatus, and control proceeds to step S906.

In step S906, information server apparatus 116A analyzes the user request information "http://www.1channel.co.jp/t=02_06_24_0801_45" using user information analyzing portion 122, and for each information source information "http://www.1channel.co.jp", extracts the user ID "10.23.201.5" and client request time "02:06:24:08:01:45". Further, information server apparatus 116A obtains the timer time "02:06:24:8:01/48" stored in storage portion 117, and registers these as client request information in the third table 123A of user-request information management table, using information registering portion 125A. Then, control proceeds to step S907.

In step S907, information server apparatus 116A refers to the third table 123A using table reference portion 129A, counts up each client request information in the order of client request time, and prepares the count information. Further, the count information of the third table 123A is updated by information registering portion 125A, and then control proceeds to step S908.

In step S908, table reference portion 129A refers to the third table 123A, and calculates the network delay time as the difference between the client request time in each client request information and the timer time stored in storage portion 117. Further, information server apparatus 116A updates the network delay time of the third table 123A, using information registering portion 125A. Then, control proceeds to step S909.

In step S909, table reference portion 129A refers to the third table 123A, and the count information and the network delay information registered with the third table 123A are transmitted to the client terminal apparatus for each user.

Receiving the information, control portion 115A of client terminal apparatus 101A determines in steps S801, S802 and S815 that the count information and the network delay information are received, and in step S816, displays these pieces of information, so as to notify the user about the state of access.

Thereafter, in step S903, control portion 115A of server terminal apparatus 116A refers to the second table as the table providing program related information using table reference portion 129A, and compares the time of providing information of each information source information with the timer time stored in storage portion 117, using comparing portion 121. When time comes to Jun. 24, 2002, 08:03, it is determined that the present time is the starting time, 02:06:24:08:03, for providing the information source information, http://www.channel/, requested by the user. Thus, control proceeds to step S911.

In step S911, table reference portion 129A refers to the third table 123A, and it is determined that the information source for provision, "D:/1channel/CM/concert/" includes the provision condition {if (counter<=100) get.exe; else fail.html;}, related to the counter information in the client request information. Then, control proceeds to step S913.

In step S913, table reference portion 129A refers to the third table 123A, and the client request information is sorted in the order of count information. Next, in step S915, in accordance with the provision condition {if (counter<=100) get.exe; else fail.html;}, transmission of contents data starts. By way of example, assume that the client terminal apparatus having the user ID 10.223.201.5, is the 55th receiver of the contents data "D:/1channel/CM/concert/get.exe". Then, control returns to step S901.

Client terminal apparatus 101A receives the contents data "D:/1channel/CM/concert/get.exe" from information server apparatus 116A. In response, control portion 115A determines that the input is the requested contents data "D:/1channel/CM/concert/get.exe", through steps S801, S802 and S815.

As a result, in step S817, control waits until the data is fully obtained, and thereafter, notifies the user that the information has been obtained.

Receiving the notification, the user presses display switching button 323, requesting display of the obtained information. At this time, the control portion of the client terminal apparatus determines that the input is a request from the user for displaying the obtained information through steps S801 to 806 and S828. Further, in step S832, the display image is switched to the image of the obtained information display, whereby the obtained information "get.exe" is displayed. When the obtained information does not include any audio output, the audio output before switching the display is continuously output.

—Method of Providing Information in which Information is Automatically Obtained Using a Keyword—

In the present system, it is possible to automatically obtain related information desired by the user, through keyword registration in client terminal apparatus 101A, as the provided information updating information is passed from information server apparatus 116A to client terminal apparatus 101A. Specific operation of this system in this case will be described.

It is assumed that a user is watching a broadcast program from a broadcast station, on a TV screen. At this time, control portion 115A of client terminal apparatus 101A is in a standby state of step S801, while the broadcast program is being displayed on the TV or on a display. For automatically getting preferred information, the user presses information menu button 330 (see FIG. 3), and selects the item for keyword input, displayed on the information menu.

In response, control portion 115A of client terminal apparatus 101A determines, through the process of steps S801 to S804, that the input is a keyword input from the user. In step S824, the display image is switched to an image for inputting a keyword, and the information input by the user through keyword input portion 104A is stored by storage portion 106. Thereafter, the display image is returned to the image before the input. Thus, keyword registration by the user is completed.

Control portion 130A of information server apparatus 116A detects a time at which the information source is switched, in steps S901 and S902 of FIG. 23. As a result, in step S910, the information source switching information containing the summary information prepared by the contents provider and stored in information server apparatus 116A is transmitted to each client terminal apparatus.

Receiving the information, control portion 115A of client terminal apparatus 101A determines that the input is the information source switching information received from information server apparatus 116A, in steps S801, S802 and S815. As a result, in step S818, the keywords are read from storage portion 106, and compared with the summary information in the information source switching information. If a word matching any of the keywords is detected from the summary information, control proceeds to step S819.

In step S819, automatic transfer indication is displayed on the screen, notifying the user that the related information is automatically obtained (transferred) as a result of keyword matching. Thereafter, control proceeds to steps S812, S813 and S814, so that the user request information on the related information searched by keyword search is transmitted to the information server apparatus.

If it is determined that the information switching information does not match the keyword search in step S818, control proceeds to step S820. In step S820, if it is determined that the important information display instruction is included in the information source switching information, control proceeds to step S821. In step S821, the important information display is given to notify the user that the switched information is important.

The requested contents data is obtained by the client terminal apparatus in the similar manner as the example described above. Specifically, the user presses the display switching button 323 of remote controller 310, to switch the display to the image of the obtained information, and views the preferred information that has been stored automatically.

—Method of Providing Information Simultaneously Obtaining a Plurality of Pieces of Related Information—

In this system, it is possible to provide, in addition to the related information of the program for which the user made a request, the related information of the channels next to the broadcasting channel and the related information to be provided preceding and succeeding in time the user request for the information. In the following, the operation of the system when such a method of providing information is executed will be described. Here, description will be given using the program-related information providing table (third table 123A) of information server apparatus 116A, which simultaneously provides pieces of information related to broadcast programs in accordance with the second embodiment shown in FIG. 19.

It is assumed that a user is watching a broadcast program from a broadcast station, on a TV screen. At this time, control portion of client terminal apparatus 101A is in a standby state of step S801, while the broadcast program is being displayed on the TV or on a display.

Assume that on Feb. 18, 2002, at 07:45:26, a shopping program is broadcast on channel 8, and the user presses a multi-time button 326 (FIG. 3) of remote controller 310, to get, at one time, detailed information of an item that is on air at present, an item introduced previously and an item that will be introduced later. Control portion 115A of client terminal apparatus 101A determines that the input is the request from the user for getting a plurality of pieces of information at one time, through steps S801 to S811. As a result, in step S812, user multi-time request information "http://www.8channel.co.jp/t=02_02_18_07_45_26=multi=time" is prepared.

Further, in step S840, the user multi-time request information is transmitted to information server apparatus 116A that offers the information providing service. At this time, a message "transferring multi-time data" is displayed superposed on the program display, for a prescribed time period on the screen viewed by the user.

Further, as shown in FIG. 19, before the time of broadcasting the program, contents provider terminal apparatus 131 providing the information related to the shopping program stores the URL indicating the location of the information file related to the shopping program and the time zone of providing the information, in the second table 124A as the related information providing table.

At this time, control portion 130A of information server apparatus 116A determines that the user input is a request for new registration from contents provider terminal apparatus 131A, in steps S901 to S905 and S916 shown in FIG. 24. Therefore, control proceeds to step S918, and the input new registration information is stored in the second table 124A by information registering portion 125A. Further, in accordance with the newly registered information source registering information, a request for getting contents data is issued to contents provider terminal apparatus 131A.

From contents provider terminal apparatus 131A, contents data is transmitted in response to the request. Information server apparatus 116A receives the file of the information related to the shopping program from contents provider terminal apparatus 131A, and stores the file in a directory determined by the URL of the data, in database 127. By way of example, if the URL is http://www.8channel/shopping/microwave.file, then the data is stored in a directory "D:¥8channel/shopping/", by the name "microwave.file".

At this time, control portion 130A of server apparatus 116A executes steps S901 to S905 and S916 of FIG. 24, and determines that the input is the contents data transmitted from contents provider terminal apparatus 131A. Further, in step S917, the input contents data is stored in storage portion 128 in database 127.

Control portion 130A of information server apparatus 116A determines, through steps S901 to S905 of FIG. 24 that the input is the user request information from the client terminal (for example, "http://www.8channel.co.jp/t=02_02_18_07_45_26=multi=time"). Then, control proceeds to step S906, in which it is read that the user request information includes the URL of the web site designated by the user (in the example above, "http://www.8channel.co.jp"), designated time of request (in the example above, "02:8:07:45:26") and that the request is for getting the multi-time information.

Control portion 130A further refers to the second table 124A as the related information providing table, for the URL and the time specifying information, to determine where the information requested by the user exists (in the example above, "D:/8channel/shopping/microwave.file"). In order to meet the request for getting multi-time information by the user, control portion 130A determines information provided preceding and succeeding the object of interest (in the example shown in FIG. 19, "D:/8channel/shopping/aquos-.file" and "D:/8channel/shopping/zaurus.file") with reference to the second table 124A, and provides these pieces of information to the user.

The requested contents data is received by client terminal apparatus 101A in the similar manner as the above-described example. Specifically, the user presses the display switching button 323 of remote controller 310, to switch the display to the image of the obtained information, and views the preferred information that has been stored automatically.

—Method of Providing Information Using Storage Medium—

In the present system, the information related to the displayed image can be provided to the user even when the user is watching a recorded broadcast program or the like. An exemplary operation of the system in accordance with the present embodiment in that case will be described, using the third table 123A as the related-information-providing table shown in FIG. 20.

When information at the time of storage is to be obtained Assume that the user video-recorded a drama program broadcast on channel 4 from 10:00:00 to 11:00:00 on Dec. 13, 2002. Here, control portion 115A of client terminal apparatus 101A determines that the input from the user is a request for storing a broadcast program, in steps S801 to S805 and in S825 shown in FIG. 25. As a result, in step S826, the contents of video display, contents of audio, information source switching information and the time of starting storage are stored, in accordance with the designated broadcast channel number 4 and the designated time zone "02:12:13:10:00:00-02:12:13:11:00:00".

Assume that the user started reproduction of the recorded video later (for example, from 8:30:00 on Dec. 14, 2002), on client terminal apparatus 101A, and views the program on a TV screen. Here, control portion 115A of client terminal apparatus 101A is in a standby state of step S801 shown in FIG. 22, waiting for an input, while the storage medium is being reproduced and displayed.

Assume that the user clicks information getting button 332 of remote controller 310 to get information of a restaurant displayed on 7:25 of the reproduction time. Thus, a request of getting information is issued to client terminal apparatus 101A. Control portion 115A determines that the input is a request for getting information related to the storage medium from the user, from steps S801 to S810 shown in FIGS. 21 and 22. Control proceeds to step S838 of FIG. 23. In step S838, the time specifying information included in the request is determined to be the storage time of the storage medium that is being reproduced.

In step S839 of FIG. 23, from the reproduction time 7:25 at which the user made the request for getting information and from the recording start time of 10:00:00 of Dec. 13, 2002, the actual time when the restaurant was displayed in the original broadcast, that is, 10:07:25 of Dec. 13, 2002 was calculated. Then, the time specifying information "t=02_12_13_10_07_25" is stored in storage portion 106. Then, the storage time of the storage medium that is being reproduced is stored in storage medium 106.

Next, in step S813 (FIG. 23), it is determined that the user request is not for getting a plurality of pieces of information at one time. In step S814 (FIG. 23), a URL "http://www.4channel.co.jp" corresponding to the channel (channel 4) that displayed the contents of the storage medium that is being reproduced, and the time specifying information "t=02_12_13_10_07_25" are read to form user request information "http://www.4channel.co.jp/t=02_12_13_10_07_25". Further, the user request information is transmitted to information server apparatus 116A that offers the information providing service.

In response to the user request information, information server apparatus 116A provides the related information to client terminal apparatus 101A, and client terminal apparatus 101A displays the information.

When information at the time of reproduction is to be obtained

Assume that the user is reproducing a DVD of a movie on client terminal apparatus 101A and enjoying the movie on a TV screen. At this time, control portion 130A of client terminal apparatus 101A is in a standby state of step S801 shown in FIG. 21, waiting for an input while the storage medium is reproduced and displayed.

Assume that the user wishes to obtain information related to the contents displayed at 01:09:52 of reproduction time. The user clicks information getting button 332 of remote controller 310. Consequently, a request is issued to client terminal apparatus 101A.

In response to the request, control portion 115A of client terminal apparatus 101A determines that the input is a request from the user for getting information related to the storage medium, in steps S801 to S8108 (FIGS. 21 to 23). Thus, control proceeds to step S838. Here, in step S838, the time specifying information is determined to be the reproduction time of the storage medium. Therefore, in step S839, the storage medium time "01:09:52" is stored in storage portion 106. Control proceeds to step S813 of FIG. 23.

In step S813, it is determined that the user request is not for getting a plurality of pieces of information at one time. Accordingly, control proceeds to step S814. In step S814, the URL (http://www.movie_info.co.jp/123456/" stored in the medium that is being displayed, and the storage medium time specifying information "st=01:09:52" are read to from user request information "http://www.movie_info.co.jp/123456/st=01:09:52", and the user request information is transmitted to information server apparatus 116A offering the information providing service.

In response to the user request information, information server apparatus 116A provides related information to the client, in accordance with the related information providing table shown in FIG. 20. The operation of information server apparatus 116A is the same as that described above.

Third Embodiment

Figure 26:
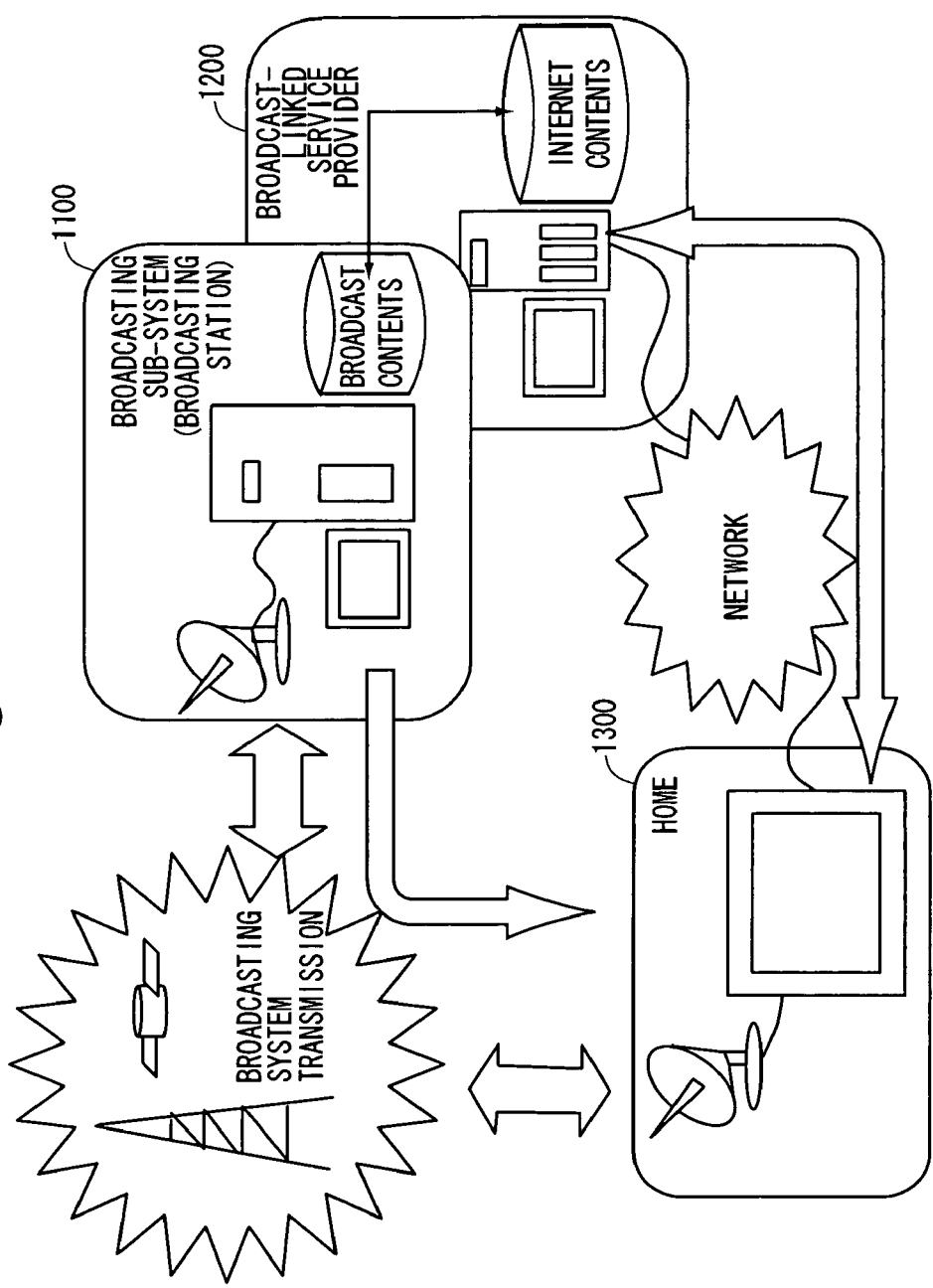
FIG. 26 shows an overall configuration of the system in accordance with a third embodiment of the present invention.

A system in accordance with the third embodiment of the present invention will be described in the following. FIG. 26 shows an overall configuration of the present system. Referring to FIG. 26, the system includes a broadcasting sub-system 1100 for holding and distributing video data, a networking sub-system 1200 for providing contents in synchronization with broadcasting data, and a client terminal sub-system 1300 used by a user at home or at an office.

Generally, terrestrial broadcast, satellite broadcast or broadcast on cable is used for distribution. Broadcast through the Internet or through packaged media such as DVDs may be used for distribution. For stream distribution using the Internet, real time protocol such as RTP (Real Time Protocol) is often used. When a packaged medium is used, the time as a reference to obtain information is not the absolute time but a relative time from the start point of the medium is used.

Though the data distributed from broadcasting sub-system 1100 to client terminal sub-system 1300 shown in FIG. 26 is video images in the present embodiment, it may be any data that has time flow, such as music, radio, text information or image information.

As the network to the networking sub-system 1200, the Internet is considered in the present embodiment. The network, however, is not limited to the Internet. For instance, a private network not connected to the Internet may be used.

In the present embodiment, a path for client terminal sub-system 1300 for receiving video images (mainly, broadcast) and a path for exchanging information through the network (mainly, the Internet) use different physical layers for transmission. The present invention, however, is not limited to such a configuration. It is noted, however, that a bi-directional communication path is necessary between client terminal sub-system 1300 and networking sub-system 1200. Further, the information transmitted from broadcasting sub-system 1100 is mainly information of video or music information having time-sequence.

—Configuration of Broadcasting Sub-System 1100 and Networking Sub-System 1200—

Figure 27:
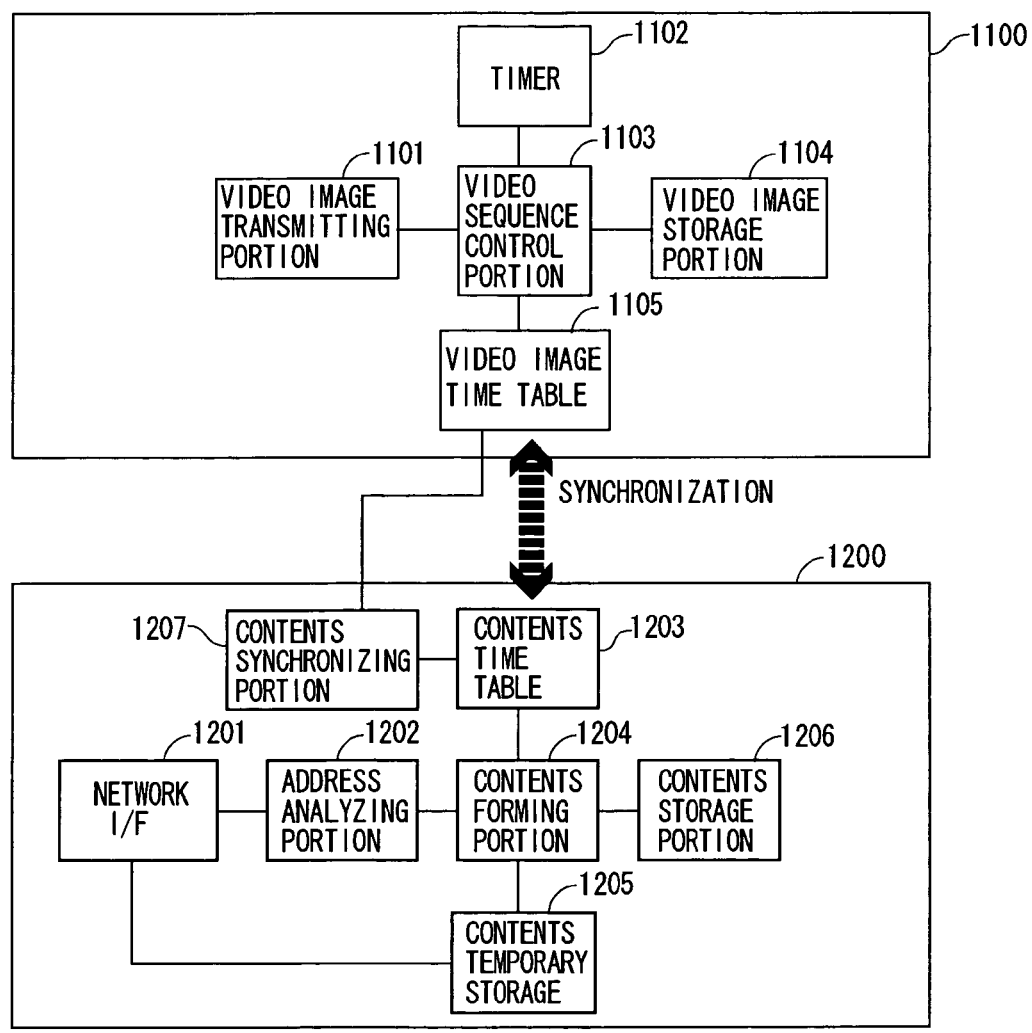
FIG. 27 is a block diagram of a broadcasting sub-system and a network sub-system of the system in accordance with the third embodiment of the present invention.

FIG. 27 is a block diagram showing the broadcasting sub-system 1100 and the networking sub-system 1200 used in the present embodiment. Referring to FIG. 27, broadcasting sub-system 1100 includes: a video image transmitting portion 1101 having a modulator, an antenna and the like for transmitting video images through means such as broadcast; a timer 1102 precisely ticking time; a video image time table 1105 indicating a schedule as to which video image is to be distributed at what time; a video sequence control portion 1103 selecting a video image in accordance with the time indicated by timer 1102 and controlling the sequence for transmission; and a video image recording portion 1104 for storing the video image to be transmitted by video sequence control portion 1103.

Video image recording portion 1104 of the system in accordance with the present embodiment stores video images including CMs. In actual broadcast, real time news coverage and the like are included, and therefore, it is unnecessary that all the video images are recorded in advance. It is a common practice, however, that the video images are switched even in real time broadcast, to recorded images such as CMs.

Video image time table 1105 stores which video image is to be transmitted, in correspondence to the time. In the real time broadcast, the schedule, such as the time for inserting a CM, may be switched in response to an external instruction at the site, not in accordance with the timetable recorded beforehand. Therefore, though information is usually stored in advance in video image time table 1105, the information may be changed on real-time basis. Further, the video image to be transmitted may be changed forcefully, regardless of the schedule stored in video image time table 1105.

Networking sub-system 1200 includes: a network interface 1201 communicating with an external client terminal; an address analyzing portion 1202 for analyzing information such as time transmitted with the address information from the client terminal; a contents time table 1203 storing description of which contents should be transmitted at what time; and a contents forming portion 1204 for forming contents in consideration of information obtained as a result of analysis by address analyzing portion 1202, contents held at present and information of CMs and the like to be inserted by the contents provider.

Networking sub-system 1200 further includes: a contents temporary storage 1205 for temporarily storing the contents formed by contents forming portion 1204; a contents storage portion 1206 for storing the contents in a form that can be supported by contents time table 1203; and a contents synchronizing portion 1207 for establishing synchronization between the video image stored in video image storage portion 1104 and transmitted for broadcast and the contents stored in contents storage portion 1206 and transmitted over the network.

The contents temporarily stored in contents temporary storage 1205 are transmitted from network interface 1201 to client terminal sub-system 1300. Contents temporary storage 1205 is also used for improving speed of operation, as it eliminates the necessity of forming the same contents again and again when a plurality of same requests are received.

FIG. 28 shows exemplary contents stored in contents time table 1203. The items listed in each row are contents No., start time, end time, other condition, contents name, and remarks, from the left. When time information in access information such as the address of a client terminal is within the start time and end time of certain content, the content is applied.

By way of example, in FIG. 28, the row of contents No. 1 represents that when time information in the access information is between 05:00 to 05:55:59, "./news.html" is accessed.

Here, the term "contents" is not limited to a simple contents item (or the address of the corresponding contents item), and it may refer to information for forming a page by combining a plurality of contents items. The row of contents No. 2 is also set to access the same "./news.html".

It is noted that the same description "./news.html" (representing a news program) appears both on the rows of contents No. 1 and No. 2. This is because the contents are both news, and it is assumed that the latest news page will be accessed. It is naturally possible to designate different pages for a news program from 5:00 and a news program from 7:00.

In this example, the row of contents No. 3 represents a drama series broadcast everyday. Here, the information described in the box "contents" designates the information corresponding to the contents broadcast on that day.

The row of contents No. 4 includes "local condition determination: If Osaka, transmit information of different address (./Osaka_local.html)" as other condition. By setting such a condition, it becomes possible to broadcast contents different from the one specified by "contents", if the condition is satisfied. For instance, it is often the case that a CM inserted in a program is made different region by region. If the local condition (local information) is described in "other condition" of the table as described above, it becomes possible to provide a page having some part adapted locally, considering the local condition of the access information when a web page is accessed.

The local condition in this example is preferably set simultaneously with the setting of the TV channel. Further, it is desired that setting of the local condition allows setting of correspondence between TV channels and broadcast waves (general channel setting), setting of base addresses corresponding to respective channels, setting of local information (for Osaka, Nara, Calif. and so on), and setting of whether time information or local information should be added to a web access using the base address corresponding to each channel, at one time. These can be realized by holding a user interface allowing input of a region and a table holding information of channels, base addresses, local information and the like for respective regions in a read only memory, and by setting one of these in accordance with a selection made by the user.

The start time and end time specified in the rows of contents Nos. 5 and 6 are both set in a time zone overlapping that of the row of contents No. 4. Typically, each program is divided into a plurality of parts including a main program part and corners (such as quiz application) and commercials. In this example, as the description allows overlapping in time, the main program can be represented not as a plurality of divided time pieces. In the example shown in FIG. 28, one program "corning Show" is stored in the row of contents No. 4, and parts of the program are stored in different rows, that is, the rows of contents No. 5 (quiz) and No. 6 (commercial in the quiz corner).

Though contents information is stored in correspondence to the quiz and the CM in the quiz corner of the morning show, the manner of storage of information in the contents time table is not limited thereto. By way of example, these pieces of information may be stored as different pages for different time, or three contents may be stored embedded in one page, and any form of storage may be adopted dependent on environment and necessity.

In practice, though the time 09:56:59 is set as the end time of a certain program in the table, the user might access sometime later. Therefore, it is desired that a page adjacent in time in the timetable, such as the preceding or succeeding page, has a scheme that readily allows jumping. Specifically, the web page corresponding to "Morning Show" of contents No. 4 may be linked to "Drama Series" of contents No. 3 and to a program that is broadcast after "Morning Show."

Typically, a time table of broadcasting stored in video image time table 1105 is determined and thereafter, contents time table 1203 is modified accordingly. The modification may be made automatically without any human intervention, or it may be modified/added manually. It is not necessary that contents time table 1203 is connected on-line to broadcasting sub-system 1100. Considering extra time of ball game broadcast and the like, it is desired that contents time table 1203 allows immediate modification to meet the extension of broadcast time.

For one broadcasting sub-system 1100, a plurality of networking sub-systems 1200 may be provided. It is desired that the client terminal can be set to allow selection of any of the networking sub-systems 1200 at user's choice.

For network connection through network interface 1201, the Internet is used in the present embodiment. The network, however, is not limited to the Internet. Further, the results of analysis by address analyzing portion 1202 is used for selecting appropriate contents, as will be described later.

—Configuration of Client Terminal Sub-System 1300—

Figure 29:
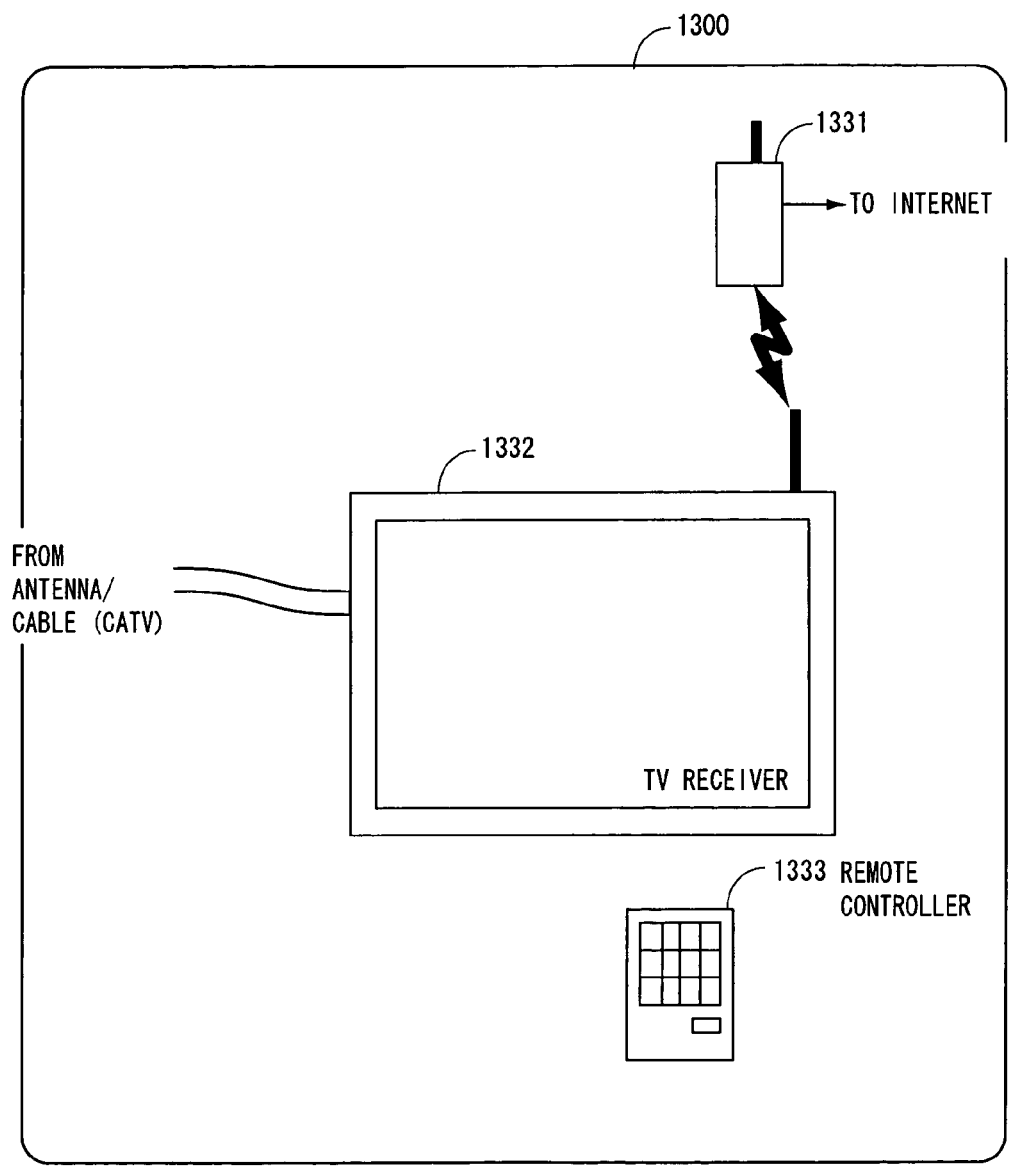
FIG. 29 shows a configuration of the client terminal apparatus of the system in accordance with the third embodiment of the present invention.

FIG. 29 shows a configuration of client terminal sub-system 1300 in accordance with the present embodiment. Referring to FIG. 29, client terminal sub-system 1300 includes an internet modem 1331, a TV receiver 1332, and a remote controller 1333 for operating TV receiver 1332.

It is assumed that TV receiver 1332 is connected to cable TV (CATV). In this example, internet modem 1331 and TV receiver 1332 are wireless-connected to each other.

By way of example, the internet modem may be an ADSL (Asynchronous Digital Subscriber Line) modem. Preferably, TV receiver 1332 is connected to the Internet in full time. By way of example, wireless mechanics of IEEE802.11b standard defined by IEEE (the Institute of Electrical and Electronics Engineers, Inc) may be used. It is needless to say that a modem may be provided in the body of TV receiver 1332. When wireless LAN (Local Area Network) in accordance with IEEE802.11b is used for connection, ESSID (Extended Service Set-Identifier) or an encryption key must be set. These techniques are not directly related to the present invention, and therefore, details thereof will not be described here.

For an access to the Internet, setting of an IP (Internet Protocol) address and the like is necessary. Assuming that the client sub-system is used at home, it is desired that the IP address is automatically set by existing method such as DHCP (Dynamic Host Configuration Protocol), so as to alleviate burden on the user.

In place of remote controller 1333, a mouse or a keyboard may be used. To enable operation of TV receiver 1332 of client terminal sub-system 1300 in the similar manner as an operation of a conventional TV, a device allowing input by one hand is preferred.

Figure 30:
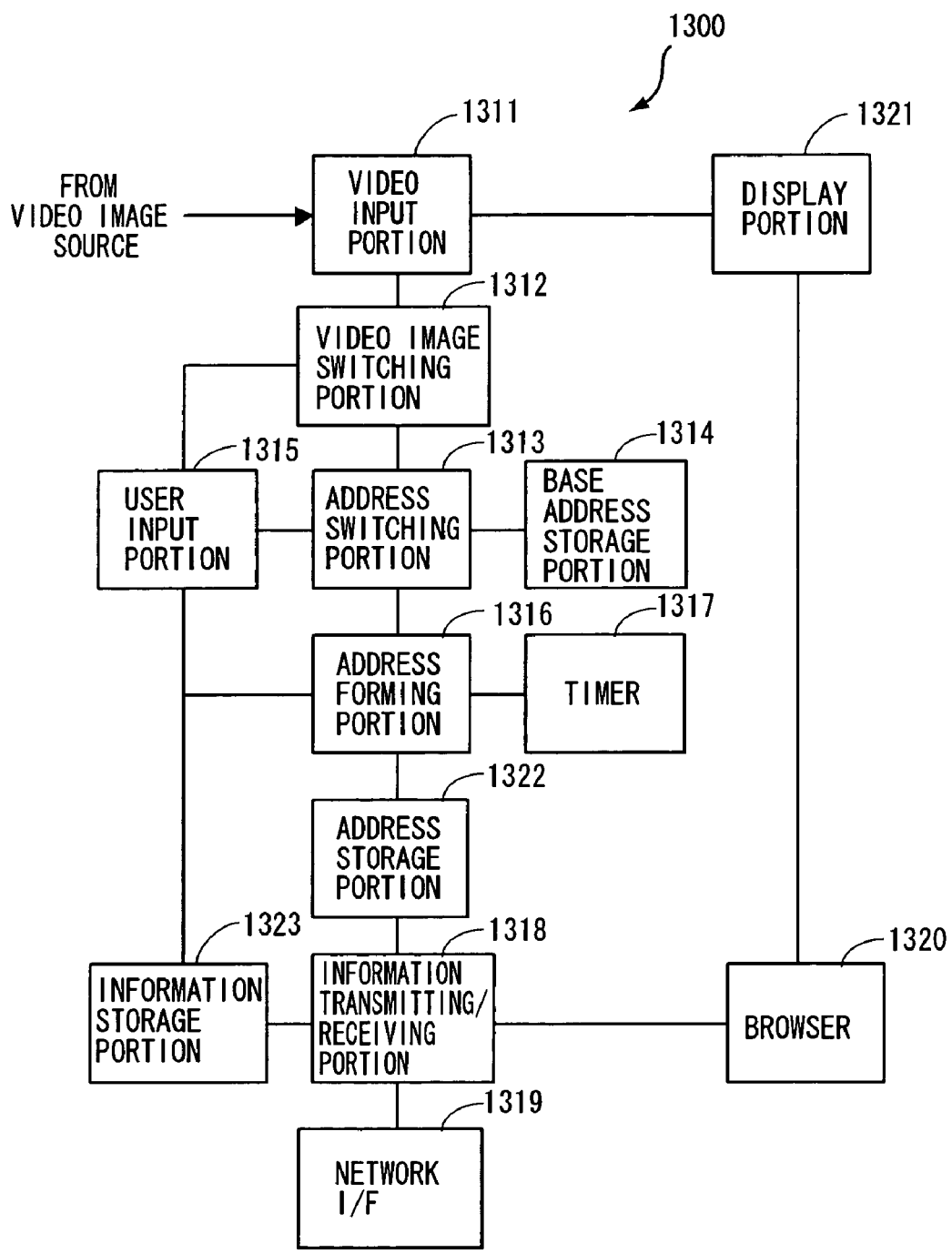
FIG. 30 is a block diagram of the client terminal apparatus of the system in accordance with the third embodiment of the present invention.

FIG. 30 is a block diagram of a representative configuration of client terminal sub-system 1300. Referring to FIG. 30, client terminal sub-system 1300 includes: a video input portion 1311 receiving a video signal transmitted from a video image source such as broadcasting sub-system 1100; a video image switching portion 1312 switching the input video image; an address switching portion 1313 switching a networking base addresses (information source information) simultaneously with and in response to a switching of video images; a base address storage portion 1314 storing the base address corresponding to the video image channel or to the storage medium; and a user input portion 1315 having a user interface allowing the user to instruct a video image switching (simultaneously causing base address switching) or a network access (by which an address is formed and a request is transmitted from the network).

Video image input portion 1311 is typically in the form of a tuner. It may, however, be a video tape recorder, a hard disk, a DVD or the like having video images recorded thereon. Video image switching portion 1312 realizes switching among broadcast channels, and it may be adapted to realize switching among storage media, or between broadcast and storage media. Typically, a remote controller and its display are used as user input portion 1315, as will be described later.

Client terminal sub-system 1300 further includes: a timer 1317 counting time; an address forming portion 1316 forming an address including time information from the base address held in base address storage portion 1314 and from the current time of timer 1317; an address storage portion 1322 storing the address formed by address forming portion 1316; an information transmitting/receiving portion 1318 transmitting the address stored in address storage portion 1322 to the server and receiving the information corresponding to the address; a network interface 1319 transmitting signals to and from an actual network; a browser 1320 for configuring the information received by information transmitting/receiving portion 1318 to a form that can be displayed (presented to the user); and a display portion 1321 for displaying the video image input through video image input portion 1311 and the information configured by browser 1320 to the user. Client terminal sub-system further includes an information storage portion 1323 storing the information displayed by browser 1320.

In some places, a plurality of different time zones are used, as in the United States. Therefore, the time used in the present embodiment is preferably indicated based on global standard time (in Japan, time in Japan+information indicating Japan time, such as JST: Japan Standard Time).

When an access synchronized with the video image channel only is made, timer 1317 is unnecessary, and the address is formed without adding any time information. Timer 1317 is preferably synchronized with the timer on the server side. It is highly likely that the server side has very accurate clock linked to the broadcasting system. Therefore, if the client terminal sub-system 1300 is synchronized with accurate time, synchronization between the server and the client terminal sub-system 1300 can be established when both are timed accurately, independent from each other.

The timer of client terminal sub-system 1300 should preferably be adjusted once a day to the accurate time. There are many methods of automatically adjusting the timer, including a method receiving a standard radio wave, a method of adjusting using broadcast time tone, or a method using NTP (Network Time Protocol) or SNTP (Simple Network Time Protocol). Any of these methods may be used. When the time is to be adjusted using NTP or SNTP, it is preferred that client terminals make inquiries at random time, so as to prevent a large number of client terminal sub-systems 1300 from accessing to the time server all at once. Further, setting of the NTP server may be made different region by region when the channels are set. This can prevent access concentration on one server.

In the example shown in FIG. 30, it is possible to store the address formed by address forming portion 1316 in address storage portion 1322. Therefore, when contents in synchronization with the broadcast are to be obtained from the network, the user may access to the server not at the time of broadcast but later. Address storage portion 1322 stores, in response to an instruction from user input portion 1315, the address including time information formed by address forming portion 1316. When an instruction is received later from the user interface of user input portion 1315, information transmitting/receiving portion 1318 transmits the address information stored in address storage portion 1322 through network interface 1319, and receives the contents designated by the address information. The received contents are displayed by browser 1320 and display portion 1321. Further, when the display on display portion 1321 is switched from the display by the browser 1320 to the display of the broadcast video image, information storage portion 1323 stores the information that has been displayed by browser 1320 for every broadcast channel as the source of display.

—Control Structure of Networking Sub-System 1200—

Figure 31:
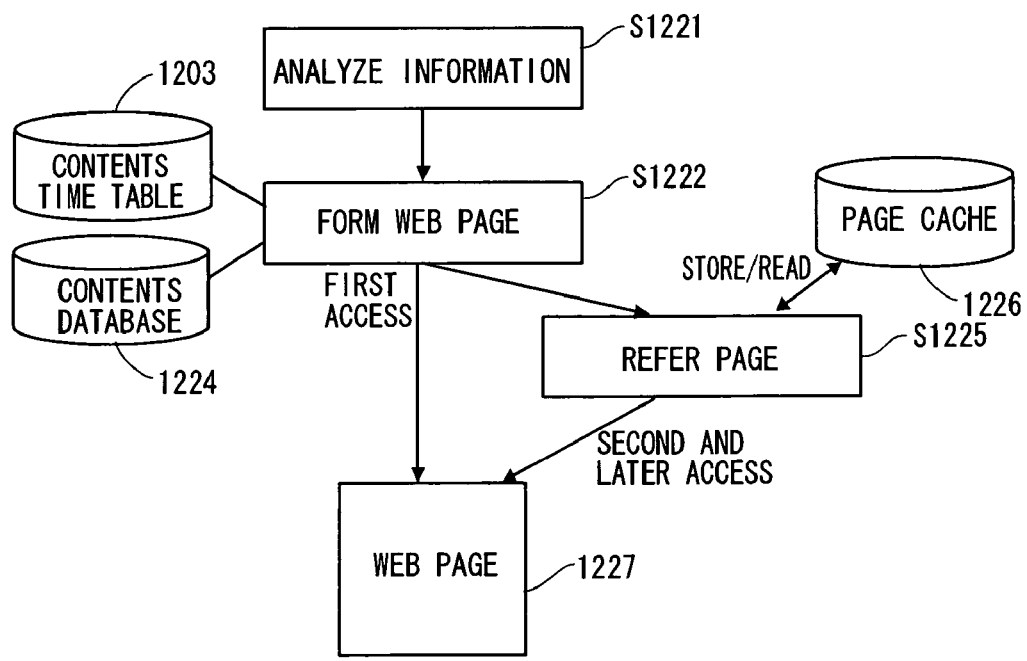
FIG. 31 is a flowchart showing a control structure of the program executed by the information server apparatus of the system in accordance with the third embodiment of the present invention.

FIG. 31 is a flowchart on the side of the server in networking sub-system 1200. It is assumed that information represented by the URL=http://www.asa-tv.co.jp/time?date=20021209&time=203245&location=Osaka is transmitted from the client to the server. In step S1221, this sentence is analyzed to obtain time and information (in this example, local information) representing attribute of the information transmitted by the server. When a URL is applied as the information, software generally called "URL parser" may be used here.

Thereafter, in step S1222, based on the information obtained in step S1221, the period of provision, expiration, location of contents and the like are compared with the contents of the stored contents time table 1203, and based on the result, database 1224 is accessed to form information (such as a web page 1227) by combining necessary pieces of information. For this purpose, software generally called "page composer" may be used.

Here, it is desired to store information (time and local information) of pages formed in the past, to allow determination as to whether there is a page formed in the past. If a page is formed for the first time, the page is transmitted and at the same time stored in a page cache 1226. If the page had been formed in the past, an instruction is issued to refer to a page formed in the past in page cache 1226, in step 1225. Then, the read data is transmitted to client terminal sub-system 1300 through the network.

Generally, when information is provided in conjunction with a broadcast, it is likely that flood of same requests are received at one time by the server, causing delay in response or increasing load on the server. To solve such problems, the data formed once before is saved and reused as described above, whereby the process steps can be simplified, load on the server can be alleviated and the response speed can be increased.

In the present embodiment, time and other information are integrated with the address information and represented as a URL. The embodiment of the present invention is not limited to such a method. What is necessary is that the information is transmitted to the server, irrespective of the manner of transmission. If analysis of time information should fail, it is desired to transmit default information set in advance (such as the URL of a main page prepared by the corresponding TV station).

The information representing attribute of information transmitted from the server accompanying the time information may be a broadcast station code, a type code, a keyword or information related to information outputting device. By way of example, when information indicating that the information outputting device is a portable telephone terminal, as the information of attribute, is added to the time information, it is possible for the server apparatus to return information suitable for a display on the portable telephone terminal. Alternatively, when the information outputting device is a portable telephone terminal or a PC (Personal Computer) terminal capable of transmitting/receiving an electronic mail, mail address of the information outputting device can be added to the time information. Thus, the server apparatus can return the URL to the mail address. Such pieces of information may be added simultaneously to the time information and transmitted to the server apparatus.

—Control Structure of Client Terminal Sub-System 1300—

Figure 32:
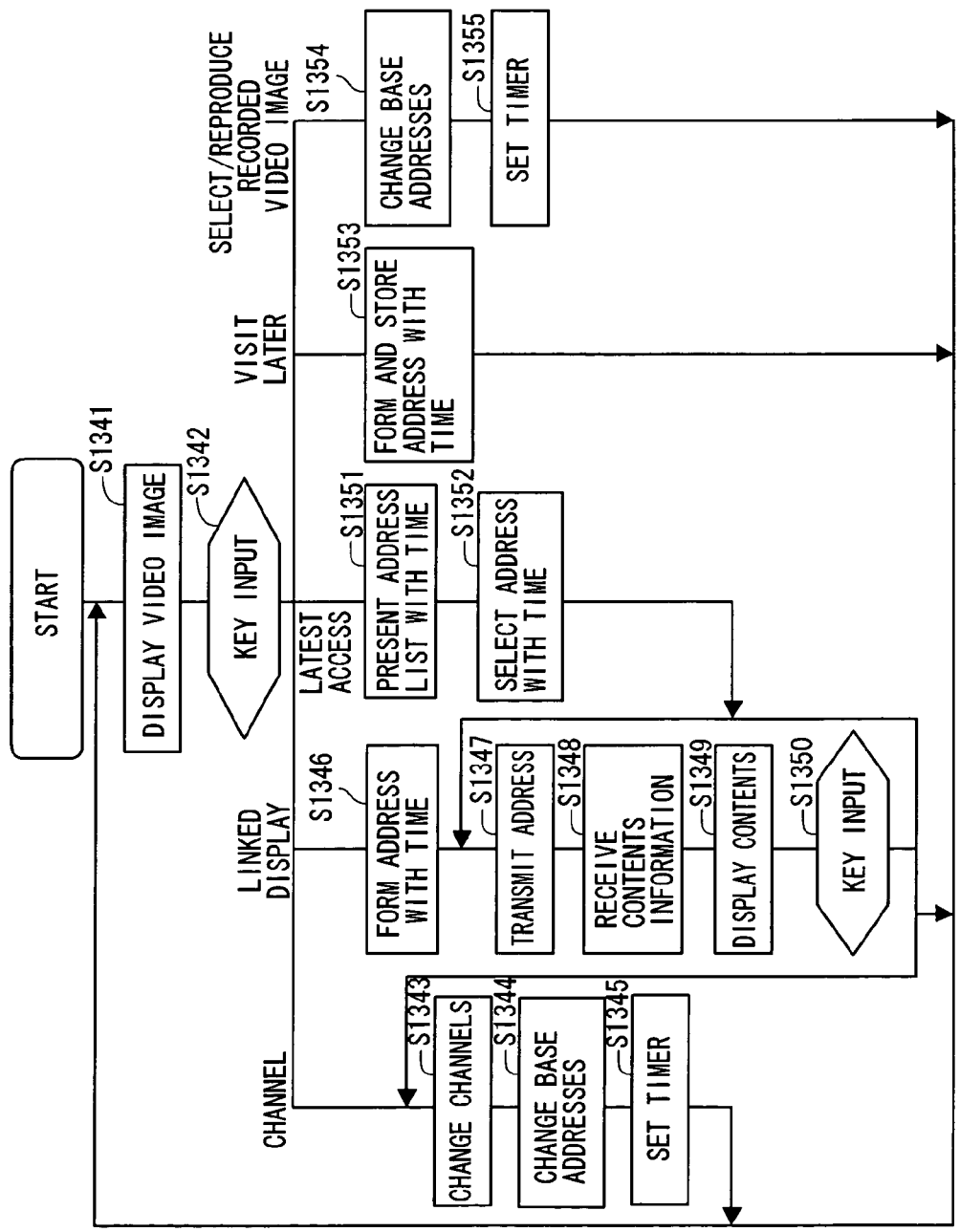
FIG. 32 is a flowchart showing a control structure of the program executed by the client terminal apparatus of the system in accordance with the third embodiment of the present invention.

FIG. 32 is a flowchart representing the control structure of the program executed by the client terminal in client terminal sub-system 1300. Referring to FIG. 32, in step S1341, broadcast video image or the like is displayed. Here, "display" means not only a display of video images on a monitor such as TV receiver 1332 but also an output of video images to an external device such as a VTR (Video Tape Recorder) in analogue or digital manner.

Thereafter, in step S1342, determination is made as to what button input has been made. Here, an input from remote controller 1333 is assumed. Therefore, which button of remote controller 1333 has been pressed is determined. The input, however, is not limited to the one through the button of remote controller 1333. By way of example, when a computer is used as the client terminal, a mouse may be used for input. Specifically, for button input determined here, any hardware may be used. Further, selection by software with a menu displayed on a monitor screen may be made.

Dependent on the result of determination of step S1342, the control flow branches as described in the following. Specifically, when the pressed button is a channel selection button 324 (in the example shown in FIG. 3, numeral buttons 0 to 9; number buttons corresponding to channels, such as #1 or #12 are also commonly used), "linked display" button, "latest access" button, "visit later" button or button related to selection/reproduction of recorded video images, control proceeds to step S1343, S1346, S1351, S1353 or S1354. The appearance of the remote controller used in the present embodiment is as shown in FIG. 38.

The process that starts from step S1343 is for channel switching. In step S1343, typically, a switch signal is passed to the tuner, to switch the video images to be received.

Thereafter, in step S1344, the base address stored in base address storage portion 1314 is changed. By way of example, for a video image already recorded in a hard disk VTR or the like, the recorded video image is selected, rather than switching of video image to the tuner.

In step S1345, a timer is selected that indicates the actual time when a broadcast wave channel is selected. If the choice is limited from among real time broadcast, the timer always indicates the current time, and therefore, this step is unnecessary. For an apparatus that can switch reproduction of a recorded media and real-time broadcast display, when reception of real-time broadcast wave is selected, the real time timer is set, and when reproduction from a recorded medium is selected, a timer of the medium is set to the initial value, in this step. After step S1345, control returns to step S1341.

The process from step S1346 starts when "linked display" button is pressed. The "inked display" button is prepared for enabling display at one touch of the contents that are related to the broadcast. First, in step S1346, an address with time is formed. It is noted, however, that address with time may not be formed in same settings, and in that case, only a base address is prepared here. The address with time is formed from the base address and the time read from the timer. Additional information such as local information stored in advance may be added.

Further, the address may be formed after determining whether the time information is to be added, channel by channel. This is effective when a server not having a mechanism for determining time is accessed. For instance, it is effective in accessing to a station operating a relatively small server, such as a local station, a CS (Communications Satellite) broadcast station, or a station providing Internet streaming service. The information for determining whether the time is to be added or not may desirably be held until the next change of settings, together with the base address.

Thereafter, in step S1347, the formed address information is transmitted to the side of the server. For the web service, the address information is transmitted to the server indicated by the URL. Here, typically, a protocol such as TCP/IP (Transmission Control Protocol/Internet Protocol) or HTTP (Hypertext Transfer Protocol) is used. Here, any protocol may be used for any layer provided that communication between the server and the client is possible, irrespective of the types of protocols.

In step S1348, content data that corresponds to the address formed in step S1346 is transmitted from the server, and thus, the content data is received.

In step 1349, the content data received in step S1348 is analyzed, and the contents are displayed. A web page as common contents is often described in a language called HTML (HyperText Markup Language). However, the contents may be described in any program language that can be executed by a web browser. In a portable telephone, a language called Compact HTML is often used for describing contents.

In step S1350, determination is made as to what button input has been made by the user. If the pressed button is a "channel" button for switching the broadcast program, control proceeds to step S1343. Thus, the channel is switched and the display is changed to video images.

If the pressed button is the "return" button, display is returned to the video image of the channel that had been selected. When there is a button input corresponding to an instruction to switch from the contents being displayed at present to other contents, control proceeds to step S1347, and the base address is updated to the base address of the switched destination. In a typical web page, when an address is indicated in the form of a link, the new address is transmitted by an operation such as selecting the address by an arrow button and pressing a "determination" button, and the corresponding contents are received and displayed.

While the process from step S1346 to S1348 is performed, the contents that had been obtained and stored may be displayed on the client terminal. By such an approach, the user can enjoy the contents after pressing the "linked display" button until the requested information is displayed.

Further, an address with time may be formed periodically to obtain contents related to the displayed broadcast periodically in advance, and the thus obtained contents may be displayed while an access to the server is made. In that case, the user can enjoy the contents that are related to the broadcast displayed at present and close in time. Naturally, if the contents that had been obtained at the time the "linked display" button was pressed are the contents requested by the user, the user can enjoy the desired contents immediately.

When the "latest access" button is selected, control proceeds to step S1351. In step S1351, addresses accessed recently are displayed. When the recently accessed addresses include addresses with time, these are also displayed.

In step S1352, any of the addresses displayed in the list is selected by the user. Generally, this operation is realized by a display in the form of a menu and an input using an arrow and a determination button. Thereafter, control proceeds to step S1347, and the same process as when "inked display" button is pressed is performed.

In step S1353, when the "visit later" button is pressed, only the address is stored, while the present video image is kept continuously displayed. The address stored here is adapted to appear on the list provided when the "latest address" button is pressed, together with the title of the address accessed recently. Alternatively, only the addresses stored by the "visit later" function may be displayed in a list. By such a process, it becomes possible to store the address linked to the present broadcast together with time information, and to make a web-access to the page linked to the broadcast later.

In step S1354, the process when the "recorded image selection/reproduction" button is pressed is performed. The process is performed only on an apparatus that can handle video images stored in the past. This part is unnecessary for an apparatus that only has a common TV tuner and can handle only the video images distributed on real-time basis. By way of example, a hard disk VTR can store date and time of recording and the corresponding channel, and hence, this process is effective.

In step S1354, the base address is changed using the channel information stored in association with the recorded video image. For a medium such as a DVD that does not have any channel information or base address information, the base address may be set manually.

In step S1355, from the time when recording was started and the time position of reproduction at present, the time when the program was broadcast (recorded) is obtained and set in the timer. Specifically, the timer is set such that the actual time when the recorded data was broadcast can be reproduced. Naturally, the base address may be stored directly, rather than changing the base address from the channel information. For a DVD or the like, the address may be input by the user, and the relative time from the start of reproduction, with the start time being 0, may be transmitted as information to the server.

Such an approach may be used for various purposes. For instance, a DVD may be distributed as a catalogue for online shopping. In that case, the items introduced as related information may be changed corresponding to the time of reproduction of the DVD. This is because what item is displayed at what reproduction time is known when the DVD is formed.

By notifying the server about the relative time from the initial value, it becomes possible by the server to form an appropriate online shopping page. In a DVD, hard disk VTR or the like, time axis of contents can be operated by reproduction, pause, fast-forward or other operations. In such apparatuses, the timer that generates the address with time changes the time following such operations.

The process represented by the flowchart relates to a user interface, and serves to display contents downloaded from a server while analyzing the same, and therefore, the process is commonly handled by a browser. Main functions thereof include management of channel switching, access to the server, generation and management of addresses, and user interface.

—Examples of Address Related Settings on the Client Terminal—

FIG. 33 shows exemplary transition of address related setting on the client terminal. The row of row No. 1 represents the current status. The contents reflect which channel is selected at present. The row of row No. 2 shows an example in which the channel is switched to "asa-tv" (for example, specifically corresponds to pressing of channel 7). At this time, the base address is switched to the base address (for example, "http://www.asa-tv.co.jp") stored in correspondence to the channel of asa-tv.

In the actual process, this can be realized simply by temporarily storing the channel number corresponding to the base address as an index.

Next, the row of row No. 3 shows the state when the "linked display" button of FIG. 32 is pressed. At this time, the address is generated together with the current time information, and the address is transmitted. Desirably, if the base address is not set because of user setting failure or other cause, a default address is generated.

The row of row No. 4 shows the state when the "return" button is pressed. Here, the display is switched from web display to video image display.

The row of row No. 5 shows a state when the "visit later" button is pressed. The address is generated from the base address and the current time, but it is stored only and not transmitted. The contents data, however, may be received by transmitting the address, as will be described later with reference to FIG. 42. In that case, however, the video image displayed at present must be kept displayed continuously.

The row indicated by row No. 6 represents a state when the broadcast channel is changed. In response to the change, the base address is changed to http://www.nn-tv.com. The row of row No. 7 shows a state when "latest access" is selected in FIG. 32. Here, the transmission address stored in the state indicated by row No. 5 is selected and transmitted, and the corresponding contents information is received.

In FIG. 33, the column of "display" shows what type of display is given to the user, by way of example. Here, "video" represents broadcast video image, and "web" represents contents received through network mainly represented by the Internet. These may be displayed together, as will be described later. For the display of "video" and "web", resolution or mode of display may be switched for better view.

Figure 34:
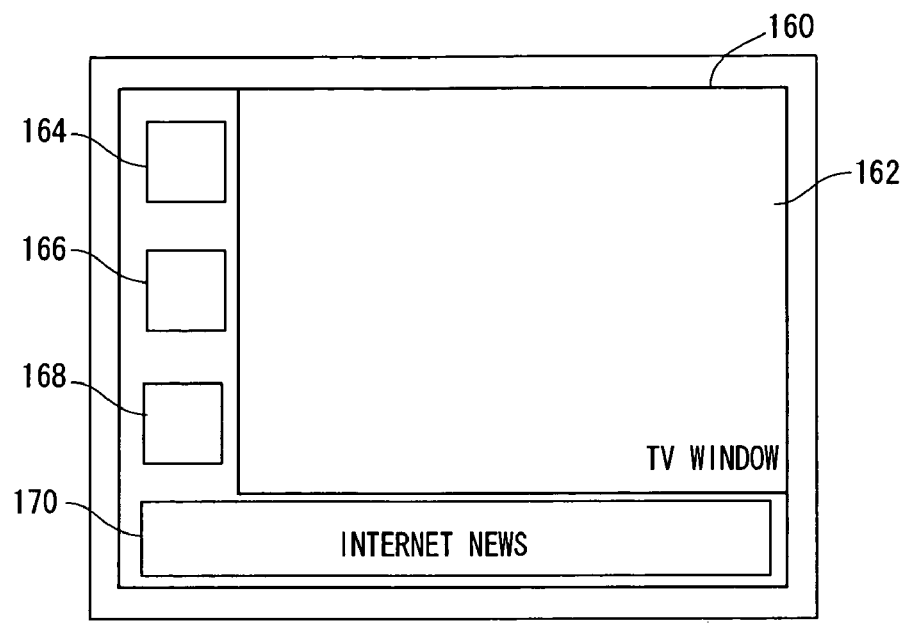
Figure 35:
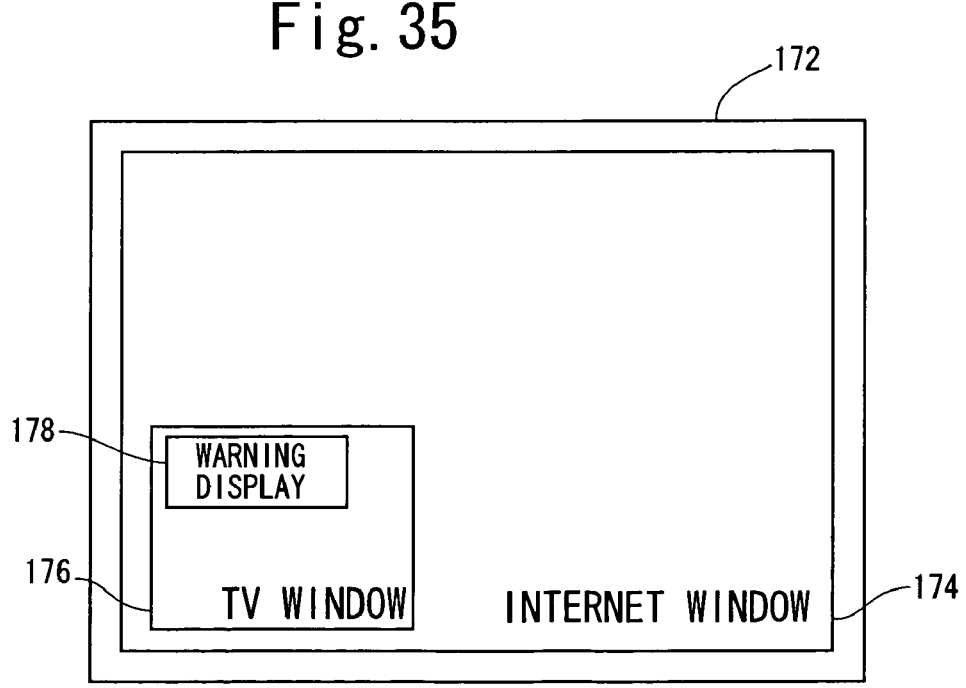

FIGS. 34, 35 and 36 show exemplary displays that appear when the Internet is accessed through the "linked display" button. These are the exemplary displays of the mode represented by "web" on the column "display" of FIG. 33.

In the example shown in FIG. 34, a display screen 160 is divided into a TV window 162 and remaining Internet window. The Internet window is further divided into areas 164, 166 and 169 on which Internet contents such as weather forecast are displayed, and an Internet news area 170.

In the example shown in FIG. 35, an Internet window 174 appears on the entire area of display screen 172. In this example, a TV window appears overlapping Internet window 174.

Further, the internet contents obtained by the "linked display" button are related to the broadcast contents. Therefore, it is desired that the broadcast program is continuously kept on-air on TV window 176. When the contents are to be obtained from the link information of the Internet contents and displayed on Internet window 174, TV window 176 that kept displaying may disappear. Thus, the user recognizes that the Internet window being viewed is unrelated to the broadcast contents. Here, before the TV window 176 is put out, a message such as a warning display 178 may be output. Alternatively, an alarm may be given. Similar effects can be expected by giving a warning, when other Internet window or windows and a TV window are displayed side by side. In the manner of display shown in FIG. 35, the relation between TV image display area 176 and Internet window 174 may be reversed.

In the example shown in FIG. 36, a display screen 180 is divided into a "time-linked contents" area 182, a news area 188 displaying latest news, a program table area 184 displaying a TV program table, CM areas 190 and 192, and a TV window 186. Time-linked contents area 182 displays contents that are linked to the channel selected at that time by the user.

In the examples shown in FIGS. 34, 35 and 36, the Internet contents are combined with the TV window. The present invention, however, is not limited to such a manner of display. By way of example, as shown in FIG. 37, the web page may be displayed by itself. In the example of FIG. 37, a display screen 200 is divided into a display area 202 for displaying contents related to the program that is being broadcast, a news area 198, a program table area 194, and CM areas 190, 192 and 194. There is no TV window.

Considering the business of a broadcast station, it is desirable to put CMs of the sponsor in the web contents. Not only the contents of the requested time point but also contents preceding and succeeding in time should desirably be made accessible.

FIG. 38 shows an exemplary display when an address stored previously using the "visit later" button is accessed. Referring to FIG. 38, in this example, time, channel and web page titles are displayed. The titles can be obtained by the method as will be described with reference to FIG. 42. Though it is possible to display addresses including the time information, such a display is difficult for the user to figure out the contents, and therefore, title display is preferred.

Figure 39:
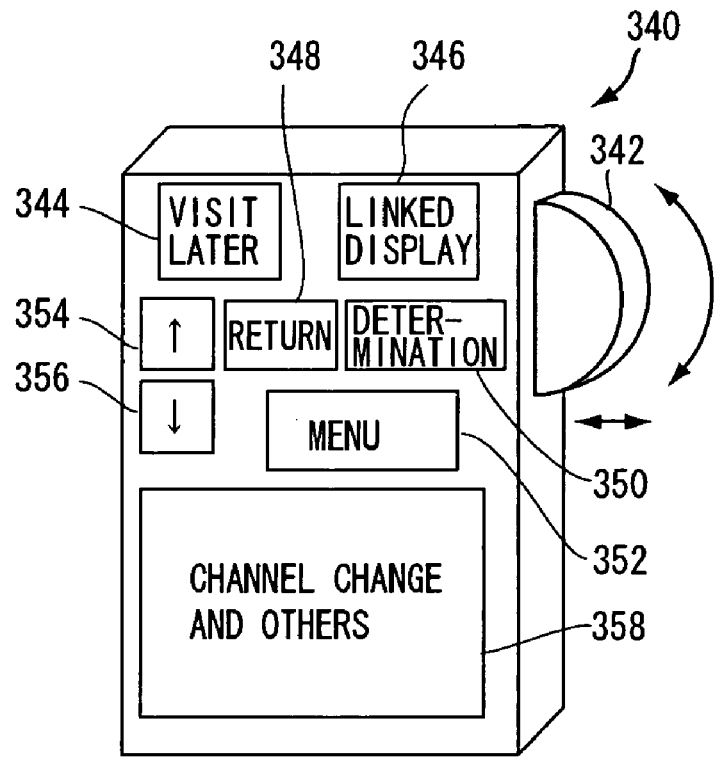
FIG. 39 shows an appearance of a remote controller of the client terminal apparatus of the system in accordance with the third embodiment of the present invention.

FIG. 39 shows an appearance of remote controller 340 as an example of the user interface. The operation performed by using remote controller 340 includes selection and determination of one item from a list of items, such as a list of stored addresses. Therefore, not only arrow buttons but also a jog dial 342 that can be operated by one hand (that allows upward/downward shift of the items to be selected by rotation and allows "determination" operation by pushing in the horizontal direction in the figure) should desirably be provided, as shown in FIG. 39. Remote controller 340 and the main unit preferably communicate to each other by means of infrared ray or radio wave. When the present invention is to be implemented by a portable telephone, such selection from a list and determination are realized by buttons on the portable telephone.

Referring to FIG. 39, remote controller 340 includes "visit later" button 344, "linked display" button 346, "return" button 348, "determination" button 350, "menu" button 352, arrow buttons 354 and 356, and a channel change (and other) button 358, as described earlier.

Figure 40:
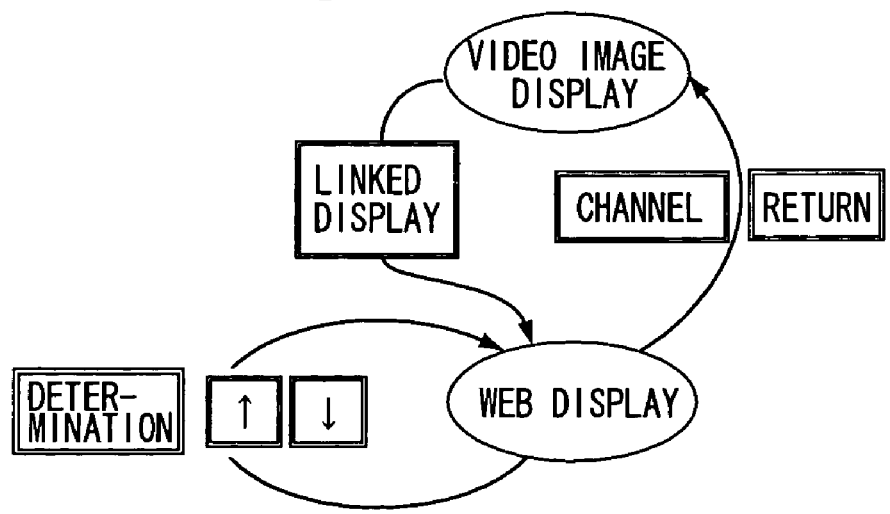
FIG. 40 represents an example of state transition for network access in the client terminal apparatus of the system in accordance with the third embodiment of the present invention.

FIG. 40 shows state transition of the simplest video image display and web display in the client terminal sub-system 1300 in accordance with the present embodiment. Referring to FIG. 40, ellipses represent states, and double-lined rectangles represent button inputs to cause state transitions, respectively. By a state transition caused by an input through "linked display" button 346, the state of "displaying video images" of broadcast is changed to web display such as shown in FIG. 38. By pressing "return" button 348 or channel selection button 358 (typically, any of buttons 1 to 12), the display is switched to the normal video display. Web page display is maintained by the operations of other buttons such as arrow buttons 354 and 356 and determination button 350.

Figures 41, 42:
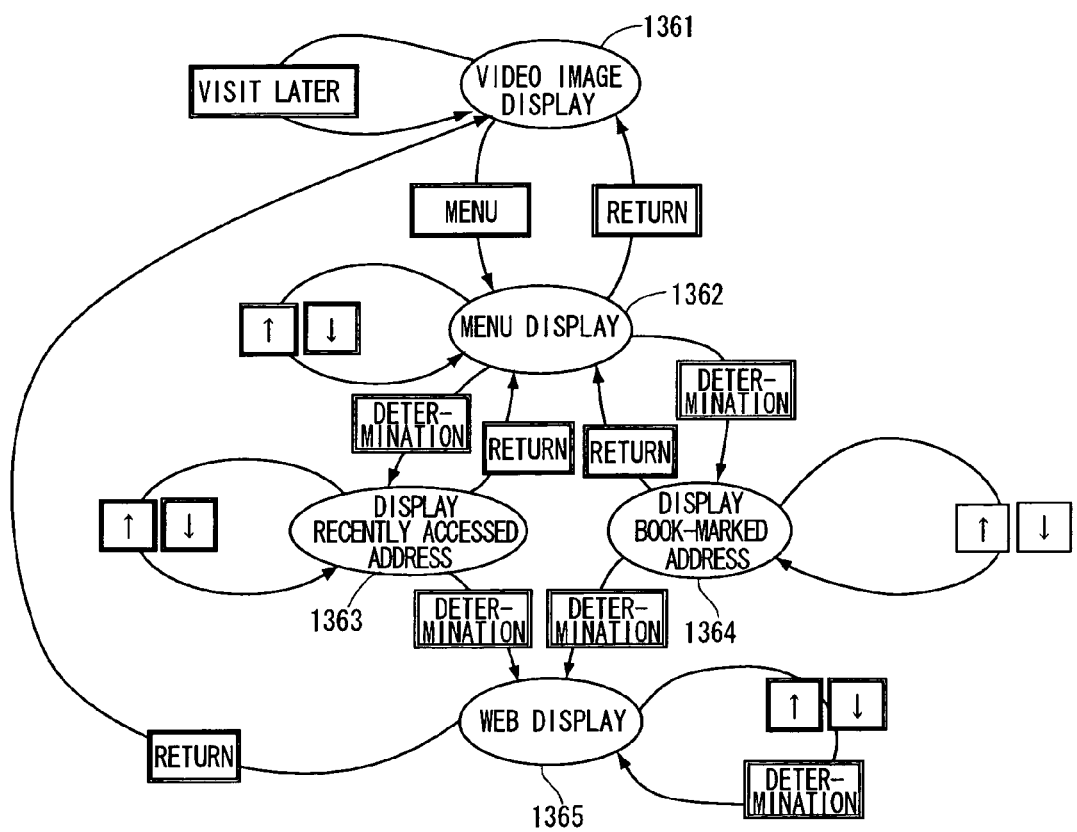
FIG. 41 shows another example of state transition for network access in the client terminal apparatus of the system in accordance with the third embodiment of the present invention.
FIG. 42 shows an example of menu display.

FIG. 41 shows state transition including "visit later" button 344. The state transition will be described with the state 1361 of video image display, in which a broadcast is received and displayed, being the central state. When "visit later" button 344 is pressed, only the address is stored and the mode of video image display is unchanged. When menu button 352 is pressed, the operation makes a transition to state 1362, in which the menu is displayed. FIG. 42 shows an exemplary menu display.

When a desired item of the menu is selected by arrow buttons 354 and 356 and determination button 348 is pressed, the operation makes a transition to the selected mode. A main status is "recently accessed address display" state, that is a mode for displaying recent accesses. The recent accesses are also displayed in the form of a list, and desired one is selected by arrow buttons 354 and 356 and determined by "determination" button 350. When any of the recently accessed destinations is selected, the state is changed to web display state 1365.

When "bookmark address display" is selected and determined in the menu display state 1362, the state is changed to bookmark address display state 1364, in which the book-marked addresses are displayed in the form of a list. When any of the book-marked addresses is selected by arrow buttons 354 and 356 and determined by determination button 350, the operation makes a transition to web display state 1365, and the web page of the corresponding address is displayed.

<First Modification of the Third Embodiment>

In the examples described above, when "visit later" button 344 is pressed, the address is simply stored. The present invention, however, is not limited to such an embodiment. When "visit later" button 344 is pressed, the contents may be obtained from the information server apparatus and stored (without displaying), and when the contents are to be viewed later, the stored data may be viewed without necessitating another access.

Figure 43:
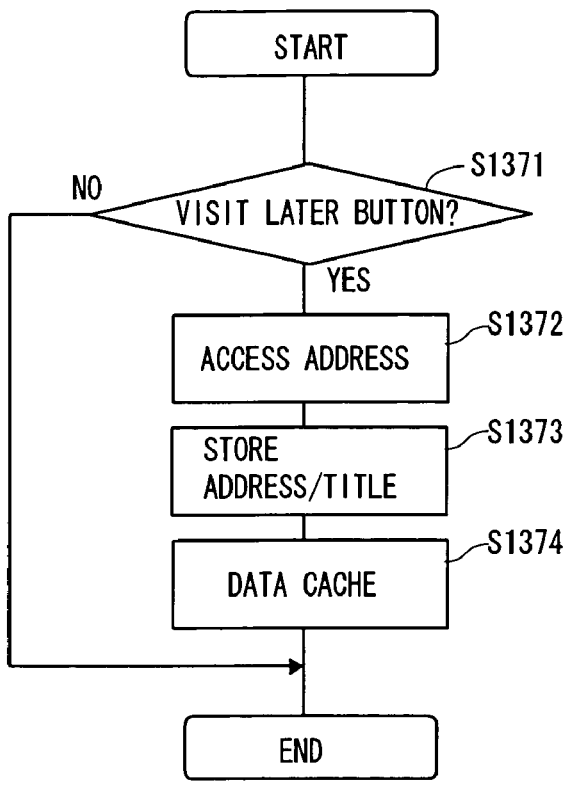
FIG. 43 is a flowchart showing a control structure of a program executed when a "visit later" key is pressed, in the system in accordance with a first modification of the third embodiment of the present invention.

FIG. 43 is a flowchart of the process performed in place of step S1353 of FIG. 32, in such a modification. Referring to FIG. 43, first, in step S1371, whether the pressed button is "visit later" button 344 or not is determined. If it is not the "visit later" button 344, this process ends. Otherwise, control proceeds to step S1372.

In step S1372, an address including information of time and the like is accessed to get the contents.

In step S1373, from the contents obtained in step S1372, the title of the contents is extracted, and stored together with the corresponding contents address. In accordance with the HTML language format generally used for describing a web page, the title is commonly written in a portion between a tag "<title>" and a tag </title>. The client extracts this portion, and stores the same as the title information. The title is used for display when the user wishes to make an access to the stored contents later.

Thereafter, in step S1374, the received data is temporarily cached in a temporary storage. When the user wishes to access to the contents later, the corresponding content data is read from the temporary storage, and thus, access time to the network can be reduced.

<Second Modification of the Third Embodiment>

Figure 44:
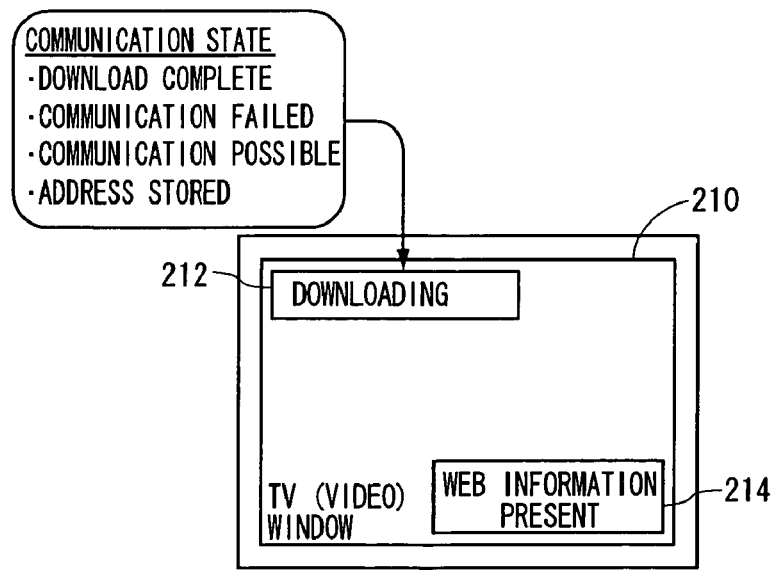
FIG. 44 shows an exemplary display of a state in the client terminal apparatus of the system in accordance with a second modification of the third embodiment of the present invention.

FIG. 44 shows an exemplary display of the video image display screen. It takes time to download content data. When the display is switched immediately after transmitting a request for the content data, sometimes nothing is displayed on the display screen. Therefore, it is desired that switching to the video image to a web page be done after the page contents are obtained fully or partially and the display data of the page are configured. Even in that case, there would be a time lag after pressing "linked display" button 346 until the image is switched.

Here, the user would be anxious to know if the button input has been accepted. Such a situation that stirs up the user's anxiety should be avoided.

To solve this problem, it is desirable to indicate current status on video image display screen 210. Referring to FIG. 44, in this example, on a communication state display area 212 at an upper left portion of video display image 210, information indicating the state of communication ("download complete", "communication failed", "communication possible", "address storage complete" and the like) is displayed. Particularly in the case of "visit later", the video display is not switched immediately to the web page, and therefore, whether the address is stored or not cannot be known. In that case, "address storage complete" display is given. It is preferred that the display disappears after a prescribed time period.

On a lower right area 214 of video display screen 210, a display indicating existence of special web information is given. The display is generally transmitted from the broadcasting system. For instance, sometimes special information is made available by an access to the web of quiz application or online shopping at that time point. Notification to that effect must be given to the user. Such information may be transmitted in analogue or digital manner. For instance, in analogue broadcast, the information may be sent superposed on the video image. In digital broadcast, the broadcast may be provided as digital data. Alternatively, the digital data information may be obtained from a server different from the broadcast contents server. An approach is also possible in which the client terminal accesses to the server and caches the data automatically. Such display need not be provided by texts, and it may be some mark or icon. It is preferable, however, that the meaning of the display is readily understood by the user.

When a display "web information available" appears on the lower right corner as shown in FIG. 44, it is possible that users watching the broadcast on real time access to the server at one time. In such a case, the response of the server may become very slow if the network or the server does not have sufficient processing power, and satisfactory service would not be provided. Therefore, both for automatic access and an access by the user through "linked display" button, it is effective to provide the client terminal with a scheme to prevent flood of accesses. This can be realized by a process for performing actual transmission after a random time period since the button input of "linked display" or since the request of automatic access described above. The maximum value of wait time should preferably be set between 0 to about 60 seconds.

<Third Modification of the Third Embodiment>

Figure 45:
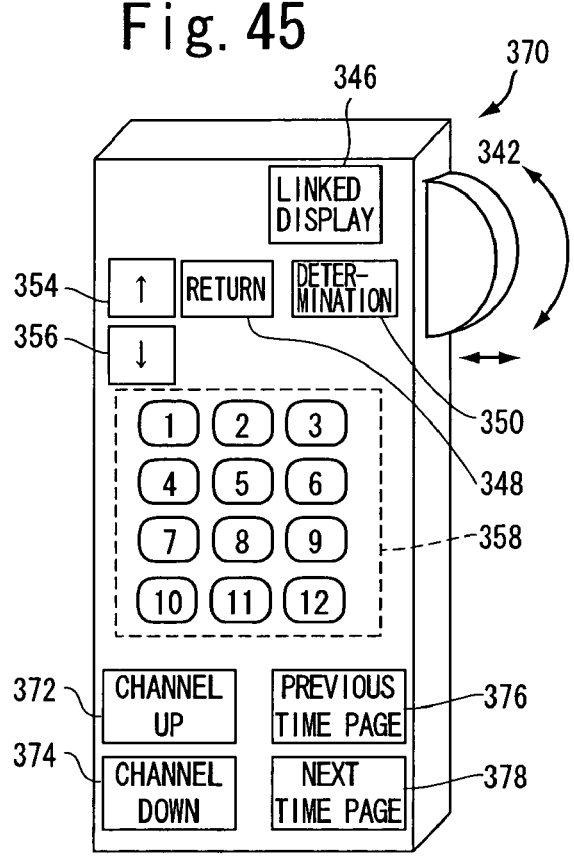
FIG. 45 shows an appearance of another remote controller of the client terminal apparatus of the system in accordance with a third modification of the third embodiment of the present invention.

FIG. 45 shows an appearance of another remote controller 370 as an exemplary user interface. Referring to FIG. 45, remote controller 370 includes, similar to remote controller 340 shown in FIG. 39, not only the arrows but also a jog dial that can be handled by one hand. Remote controller 370 and the body communicate with each other by infrared ray, radio wave or the like. When the present embodiment is realized by a portable telephone, selection from a list and determination are realized by buttons on the body of the portable telephone.

Further, remote controller 370 shown in FIG. 45 includes a channel selection button 358 including numeral buttons for changing channels, a "channel up" button 372 and a "channel down" button 374 for switching Internet contents related to respective channel buttons 358 for reception and display, and a "previous time page" button 376 and a "next time page" button 378 for switching the Internet contents related to the broadcast program that is on-air based on time-relation.

Figure 46:
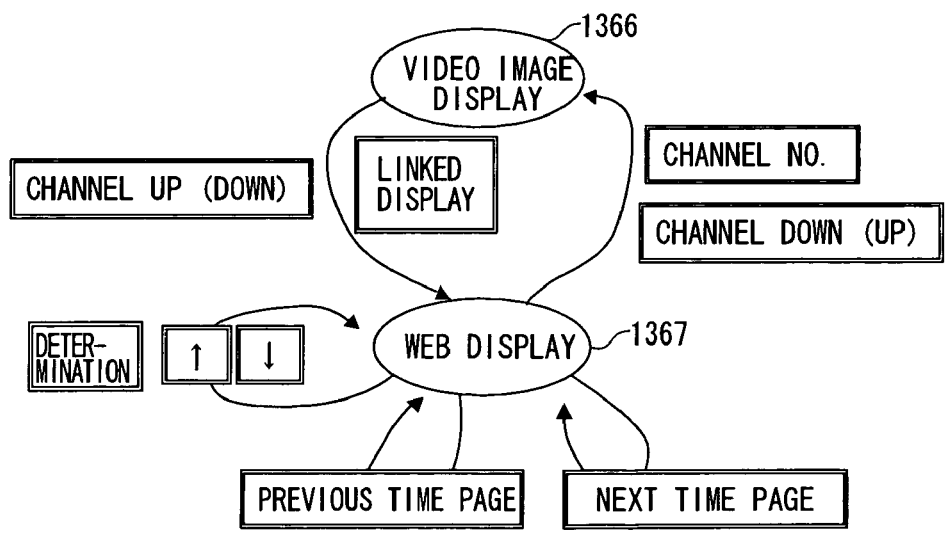
FIG. 46 shows a further example of state transition for network access in the client terminal apparatus of the system in accordance with the third modification of the third embodiment of the present invention.

FIG. 46 shows state transition including state transitions made by "channel up", "channel down", "previous time page" and "next time page" buttons 372, 374, 376 and 378. Referring to FIG. 46, when "linked display" button 346 is pressed in state 1366 in which the video image is displayed, the operation makes a transition to a web display state 1367 in which the Internet contents related to the broadcast video image viewed at present are displayed. In the following, state transition to/from the web display state 1367 will be described.

When "channel up" button 372 is pressed in web display state 1367, the operation returns to state 1366 in which the broadcast video image that is on-air at present. When "channel down" button 374 is pressed, the operation also returns to video image display state 1366. In this case, however, the broadcast image of a channel lower by one from the channel that has been broadcast before the last pressing of "linked display" button 346 is displayed.

When "previous time page" button 376 is pressed, the web display state 1367 is maintained while the contents of display are switched to the information provided in the previous time in the broadcast program of the web information source that is being displayed at present. When "next time page" button 378 is pressed, the web display state 1367 is maintained while the contents of display are switched to the information provided in the next time in the broadcast program of the web information source that is being displayed at present.

FIG. 47 shows a specific change of display caused by the operation of "channel up" button 376 and "channel down" button 378. Referring to FIG. 47, assume that the user is watching a TV program "Rule of *" allocated to button "3" of remote controller 370. When "linked display" button 346 is pressed in this state, home page of the program "Rule of *" that is being watched is displayed. When the user presses "channel up" button 372 in this state, the TV program "Rule of *" is displayed again. When the user presses "channel down" button 374, a TV program "*Special" allocated to channel selection button 358 of "2" of remote controller 370 is displayed.

When any of channel selection button 358, "channel up" button 372 and "channel down" button 374 is pressed while the web information is being displayed, the display is switched to the broadcast video image. At this time, the web information that has been displayed is saved. When "channel down" button 374 is pressed while the broadcast image allocated to channel selection button 358 of "3" of the remote controller is pressed, the saved web page is displayed again. Similarly, when "channel up" button 372 is pressed while the broadcast image allocated to channel selection button 358 of "2" of the remote controller is pressed, the saved web page is displayed again.

FIG. 48 shows specific transitions caused by operations of "previous time page" button 376 and "next time page" button 378. Referring to FIG. 48, assume that on Jun. 5, 2003, at 20:45, the user is watching a TV program "Rule of *" allocated to button "3" of channel selection button 358 of remote controller 370. When "linked display" button 346 is pressed in this state, home page of the program "Rule of *" that is being watched is displayed. After viewing the home page, assume that the user presses the "previous time page" button at 20:50. Based on the time zone including the time point (8:45) at which the home page information is obtained, a home page of "OΔ# Beer CM" is displayed, that corresponds to the program broadcast in the previous time zone. After the display of the home page of "Rule of *", assume that the "next time page" button 378 is pressed on 20:50. Then, based on the time zone including the time point (8:45) at which the home page information is obtained, a page of "Present from the Program" of the broadcast program "Rule of *" to be provided at 8:55, that is, in the next time zone, is displayed.

It is desirable to provide a function that, when a web page that is not related to the broadcast program that is on-air at present is to be obtained and displayed through an operation of "previous (next) time page" button 376 or 378 or by a link selecting operation, a timer is operated at the start of display, and after a prescribed time period, the page related to the broadcast program provided at the current time is obtained.

Figure 49:
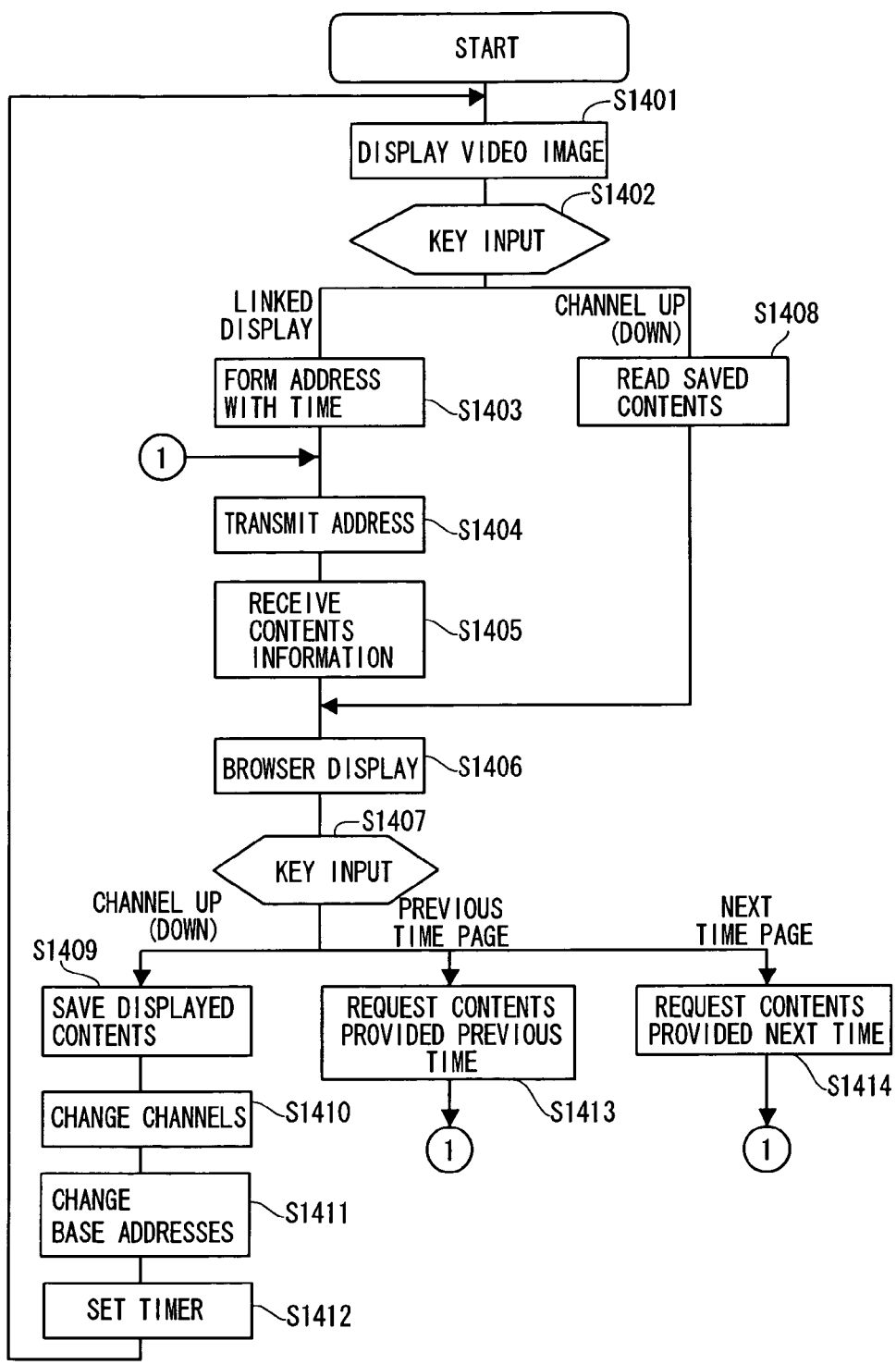
FIG. 49 is a flowchart of a program executed by the client terminal apparatus of the system in accordance with the third modification of the third embodiment of the present invention.

FIG. 49 is a flowchart of a program that performs a process when "linked display", "channel up" or "channel down" button 346, 372 or 374 is pressed while a video image is being displayed, and a process when the "channel up", "channel down", "previous time page" and "next time page" buttons 372, 374, 376 and 378 are operated while the web page related to the program is being displayed as a result of the process above. Referring to FIG. 49, first, in step S1401, as in step S1341 of FIG. 32, broadcast video image or the like is displayed. Thereafter, in step S1402, whether there is a button input or not is determined as in step S1342 of FIG. 32. Here, determination is made as to which button of remote controller 370 is pressed.

In accordance with the result of determination made in step S1402, the control flow branches in the following manner. When the pressed button is "linked display" button 346, control proceeds to step S1403, and when the button is "channel up" button 372 or "channel down" button 374, control proceeds to step S1408.

The process from step S1403 to step S1406 is the same as that from step S1346 to step S1349 shown in FIG. 32. Specifically, in step S1403, an address with time is formed. Thereafter, in step S1404, the address information thus formed is transmitted to the server. Contents corresponding to the address formed in step S1403 are transmitted from the server, and received in step S1405. In step S1406, the received contents are analyzed and the contents are displayed. Then, control proceeds to step S1407.

When "channel up" button 372 or "channel down" button 374 is pressed, in step S1408, the web information stored in information storage portion 1323 in correspondence to the broadcast channel that is being displayed is read. At this time, when the pressed button is "channel down" button 374, the client terminal reads the web information stored in correspondence to the broadcast channel that is being displayed. When the pressed button is "channel up" button 372, the client terminal reads the web information stored in correspondence to the broadcast channel upper by one than the broadcast channel that is being displayed. Then, control proceeds to step S1406, in which the read information is displayed through the browser. Then, control proceeds to step S1407.

By the control up to step S1407, the state is attained in which a web page is displayed. In step S1407, whether there is a button input or not is determined and if there is, which button is determined. In accordance with the result of determination, the control flow branches in the following manner. Specifically, when the pressed button is "channel up" button 372 or "channel down" button 374, control proceeds to step S1409. When the pressed button is "previous time page" button 376, control proceeds to step S1413. When the pressed button is "next time page" button 378, control proceeds to step S1414.

When "channel up" button 372 or "channel down" button 374 is pressed while the user is viewing a web page, control proceeds to step S1409. In step S1409, the web information that is being displayed is stored in a storage location prepared for each broadcast channel as the source of display, in the client terminal.

Next, in step S1410, dependent on whether the pressed button is "channel up" button 372 or "channel down" button 374, the corresponding image of the broadcast program is displayed, that is, the channel is changed. Specifically, when "channel up" button 372 is pressed, the broadcast program on-air on the broadcast channel as the display source is displayed on the screen. When "channel down" button 374 is pressed, the broadcast program on-air on the broadcast channel having the channel number lower by one than the channel number of the broadcast channel as the display source is displayed on the screen.

Thereafter, in step S1411, similar process as in step S1344 of the program shown in FIG. 32 is performed, and the base address stored in base address storage portion 1314 shown in FIG. 30 is changed.

Then, in step S1412, similar process as in step S1345 of the program shown in FIG. 32 is performed, and the timer, which indicates the actual time when the broadcast wave channel is selected, is selected. Specifically, if the user selects reception of real time broadcast wave, the timer is set to the real time timer. If the user selects reproduction of a recorded medium, the timer is set to the initial value of the timer held in the medium. If the selection is limited only to the real time broadcast, such setting is unnecessary. Thereafter, control returns to step S1401.

When "previous time page" button 376 is pressed, control proceeds from step S1407 to step S1413. In step S1413, the address when the web information being displayed on the client terminal is obtained is read, an address that have the time information reduced by a prescribed period from the read address is newly formed, and the request for information is issued to the server using the newly formed address. Then, control returns to step S1404.

When "next time page" button 378 is pressed, control proceeds from step S1407 to step S1414. In step S1414, an address having the time information increased by a prescribed period from the read address is newly formed, and using the new address, the request for information is issued to the server apparatus. Then, control returns to step S1404.

As a method of forming an address when "previous time page" button 376 is pressed, a method other than described above may be employed. For example, information time position information that indicates how many pieces of information exist preceding the presently displayed information may be added to the information that is being displayed at present. Alternatively, the time of provision of the information provided in the previous time zone may be obtained based on a timing of notification of notification information, and the address may be formed accordingly.

<Fourth Modification of the Third Embodiment>

Figure 50:
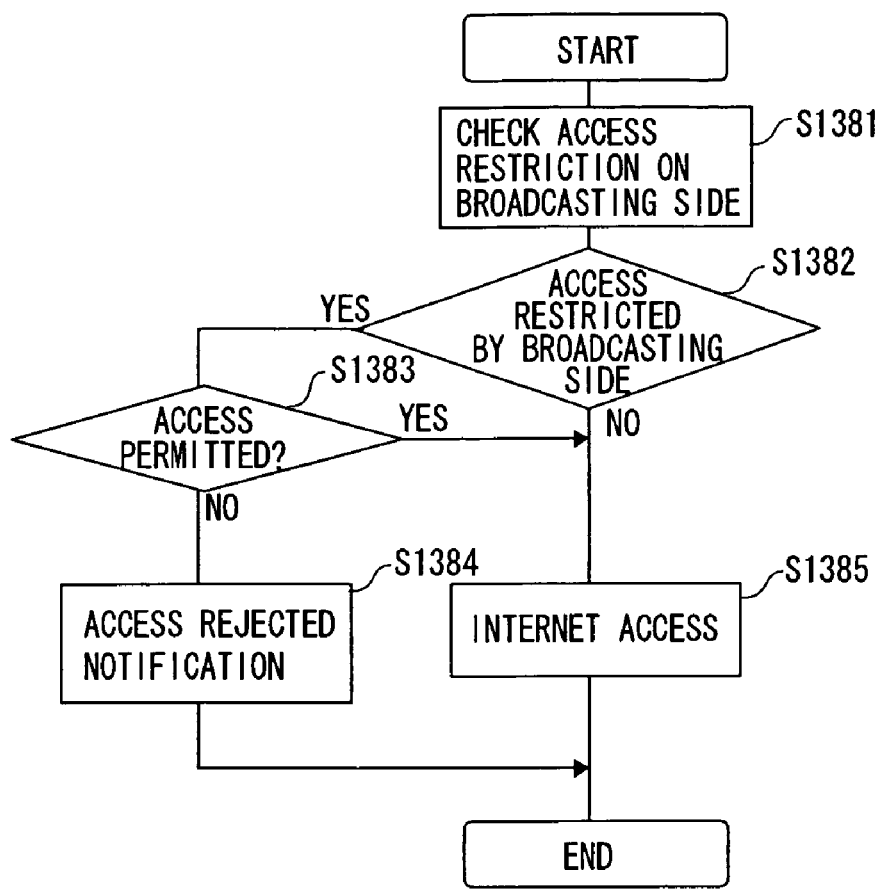
FIG. 50 is a flowchart showing a control structure of a program for realizing access restriction in accordance with a fourth modification of the third embodiment of the present invention.

FIG. 50 shows an exemplary flowchart of a program for a web access by a client terminal, when access is limited in the broadcast system. In the embodiments described above, an access to the web is made every time it becomes necessary. Such an approach might be problematic in some cases. For instance, CS broadcast service offer different services to different users in accordance with condition of subscription. Some programs have age restriction. It is desirable that access (web access) to the related information of these broadcast with restrictions should also be restricted. Specifically, a function should be realized that when reception of a broadcast channel is limited to specific subscribers, other users cannot fully or partially enjoy the contents of the corresponding web. Therefore, in each of the embodiments described above, the process in response to a web access may be replaced by the process shown in FIG. 50.

Referring to FIG. 50, in step S1381, whether an access to the channel that is on-air at present (or a package medium such as a DVD) is limited or not is determined. By way of example, when a CS tuner is used, it is possible to make this determination from the subscription information stored in each tuner and the information of the channel that is being viewed at present.

Then, in step S1382, whether there is an access restriction on the side of broadcast or not is determined. If there is an access restriction, control proceeds to step S1383, and otherwise, control proceeds to step S1385.

In step S1383, the information on the side of the client terminal is compared with the condition of access restriction on the broadcasting side, to determine whether access by the client terminal to the corresponding broadcast is permitted or not. If an access is permitted, control proceeds to step S1385, and otherwise control proceeds to step S1384.

In step S1384, as the client terminal is not authorized to make an access to the corresponding contents, a notification to that effect is given to the user. This may be directly displayed on the client terminal, or information from the server may be displayed by accessing to a special address used when the user is not authorized to make an access. After displaying such a message, the process ends.

In step S1385, an access by the client terminal to the corresponding contents is permitted, and therefore, the contents on the web are accessed and displayed. After display, the process ends.

The server apparatus may not provide contents related to the broadcast program in some cases, other than when there is an access restriction. By way of example, provision of contents may be limited only to a limited period, such as the time zone in which the corresponding program is being broadcast, or provision of contents is impossible at some time point as the related contents are being prepared. Further, it may be possible that the related contents have already been discarded. In such a case, even when the client terminal accesses to the contents, the server apparatus does not provide the client terminal with the contents.

When the server apparatus does not provide the client terminal with any contents, as in the case described above, it is preferred that a notification is given to the effect that the contents are not accessible, similar to the case where access is restricted.

For example, when provision of contents is limited to a certain period, a notice may be prepared in advance on the side of the server to indicate that it is not the period in which the contents are available. When there is an access to the contents out of the effective period, the server apparatus transmits the effective period notice, in place of the contents. Here, upon receiving the notice of effective period, the client terminal displays on the screen that the contents are currently not available. Alternatively, the server apparatus may transmit information indicating the period in which the contents are provided and a determination flag indicating whether an access is made possible in the future, together with the notice. Upon receiving such a notice, the client terminal may display on the screen a message "available from ---date--- to ---date---", based on the information of the period. Further, the client terminal may automatically access to the server apparatus to obtain and store the contents in the period when access is possible, based on the determination flag and the information of the period.

In the present example, determination of access restriction and associated processes are performed by the client terminal. The present invention, however, is not limited to such an embodiment. By way of example, access restriction may be made by the server side, by transmitting a user ID of a broadcasting service of limited access through secure protocols such as SSL (Secure Sockets Layer).

Figure 51:
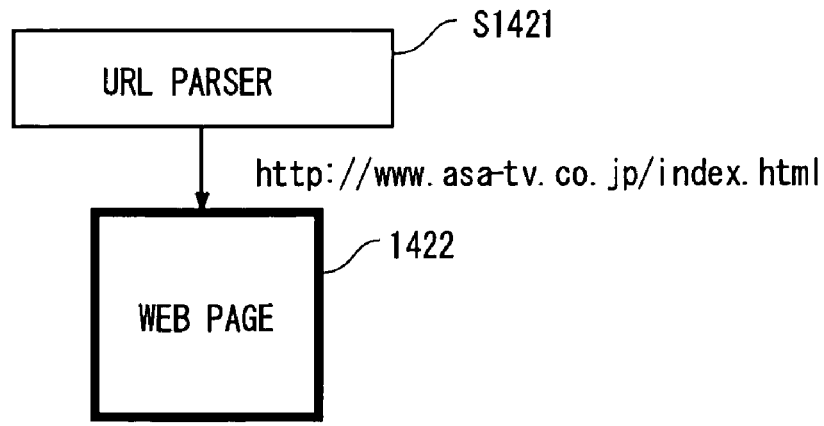
FIG. 51 is a flowchart showing a control structure of a program executed on the side of the information server apparatus of the system in accordance with the fourth modification of the third embodiment of the present invention.

FIG. 51 is a flowchart representing implementation of a simple information server apparatus. It is assumed that address information similar to that shown in FIG. 31 is transmitted from the client terminal to the information server apparatus.

In step S1421, the transmitted address information is analyzed. Here, time and other information is neglected, and one same web page (a page such as http://www.asa-tv.co.jp/index.html) 1422 is always output, regardless of the address from which a request is made.

By such implementation, a server can be configured that can transmit information in response to a request from the client terminal, with minimum modification to the server that currently holds the web page. Specifically, various servers can be realized, from one that always transmits the same contents completely neglecting information of time and the like to one that provides contents changed every second in synchronization with CMs and the like. Thus, it is possible to change the server stepwise to realize gradually higher services, without changing the client terminal.

<Fifth Modification of the Third Embodiment>

Figure 52:
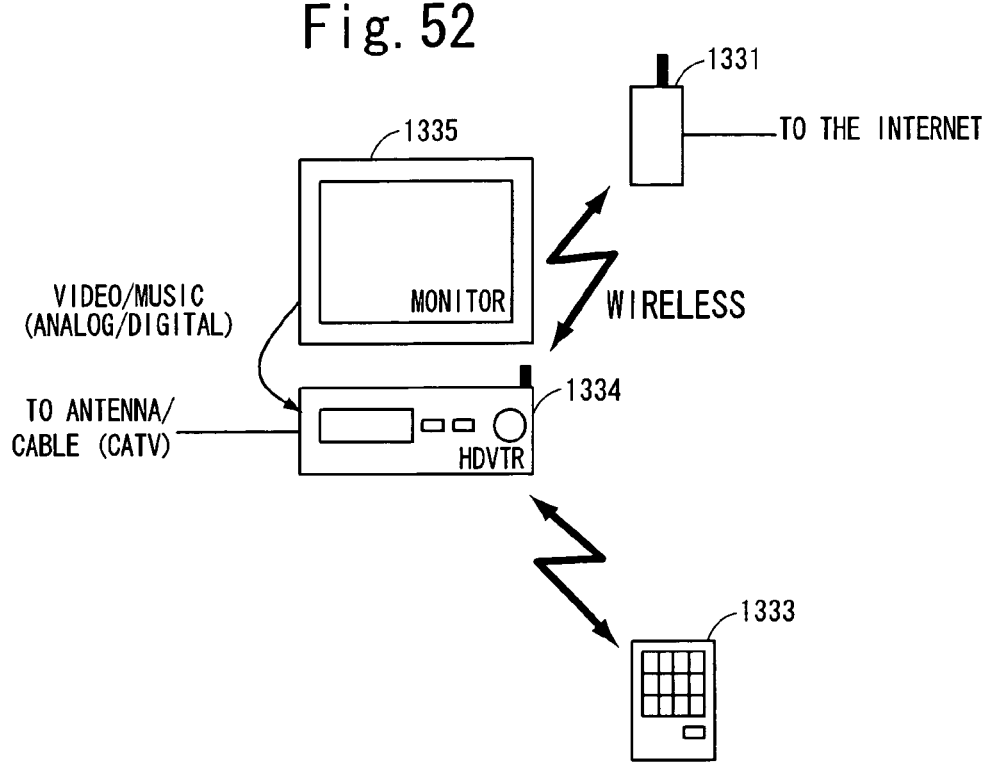
FIG. 52 shows a configuration of the client terminal apparatus in accordance with a fifth modification of the third embodiment of the present invention.

FIG. 52 shows another example of the client terminal. It is desired that the client terminal can execute both reception of information from the network in synchronization with the broadcast that is currently on-air, and reception from the network of information that corresponds to the time of broadcast of a recorded broadcast. The client terminal shown in FIG. 52 has such functions.

Referring to FIG. 52, the client terminal includes a hard disk VTR 1334, a monitor 1335 with a speaker for displaying/reproducing programs or contents (video, music and the like) transmitted from the Internet, an Internet modem 1331, and a remote controller 1333. Hard disk VTR 1334 has a configuration similar to that shown in FIG. 30.

In a device of a type that records broadcast program such as the hard disk VTR, the base address associated with the video image and the start time of the video image are stored together with the video image. At the time of reproduction, the base address is set in the base address storage portion 1314, and the video image start time is set in timer 1317. Accordingly, when the user views video images recorded the day before and accesses to the network, an address is formed designating the time of the day before, and the contents synchronized with the recorded time can be obtained from the server. For a DVD or the like, contents corresponding to the progress of the DVD can be obtained by setting the timer 1317 synchronized with the video image of the DVD (for example, the start of video image is set to time 0).

For a broadcast system in which entire page data that can be viewed at certain time are periodically and repeatedly transmitted on predetermined schedule, such as in the case of data broadcast, the base address of the information related to the broadcast page and the display time from the start of display of the data broadcast page are stored together. When the information related to the broadcast program is to be obtained, the base address and the display time are both transmitted to the server.

The information related to the broadcast program is not limited to the web information related to the displayed contents, and it may include data that merges, or partially replaces, the broadcast constituting the data broadcast page.

When the video image broadcast and the data broadcast are linked through separate channels, channel switching may be done using a button such as "data link". A function may be provided that, when a notice to the web related information is appearing on the display portion of FIG. 30 during broadcast of video images, the related web information is obtained and the switching to the web information display are realized by pressing the "data link" button, and when the notice of the related information is not displayed, the channel is switched to the data broadcast channel by pressing the "data link" button.

<Sixth Modification of the Third Embodiment>

Though a portable telephone terminal has a networking function and an information displaying function, it does not have the function of receiving or displaying broadcast signals. Even such a terminal, however, can obtain information related to a broadcast program, if it is provided with a function of linkage to a client terminal apparatus that displays the broadcast program. In the following, an example will be described in which the user obtains and has a display of information related to a program displayed on a TV, using a portable telephone or the like. In the following description, the portable telephone terminal that obtains the information related to the broadcast program by the function of linkage to the client terminal apparatus will be referred to as a "sub-client terminal apparatus."

Figure 53:
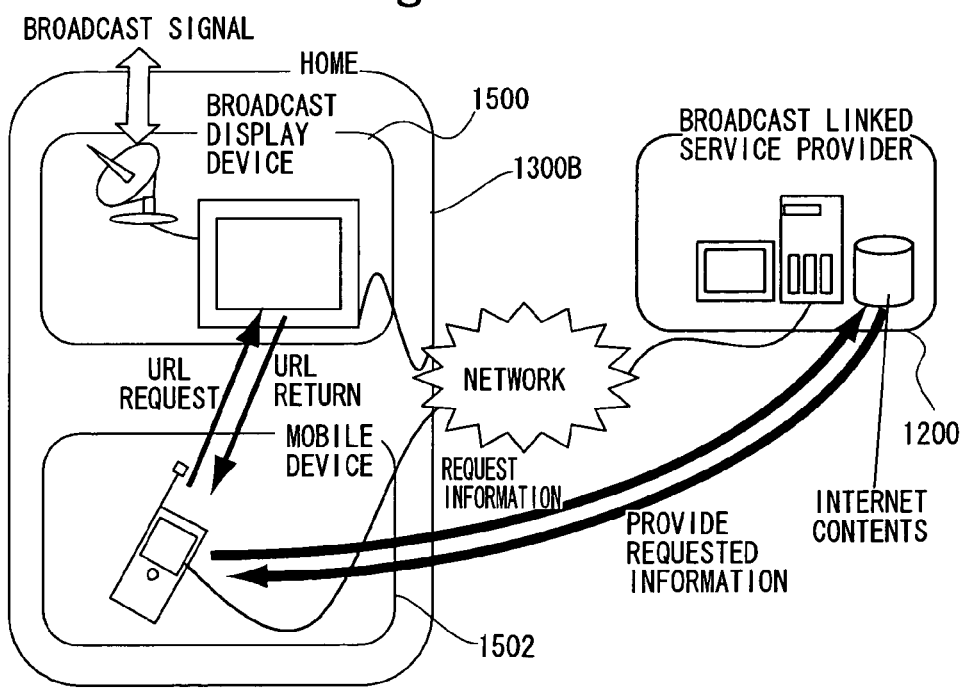
FIG. 53 shows an overall configuration of the system having a function of coordinating between the client terminal apparatus and a sub-client terminal apparatus, in the system in accordance with a sixth modification of the third embodiment of the present invention.

FIG. 53 shows an example of the linkage function between the client terminal apparatus and a sub-client terminal apparatus that does not have the video image receiving apparatus. Referring to FIG. 53, the system includes a networking sub-system 1200 for providing contents synchronized with broadcast signals, and a client terminal sub-system 1300B used by a user at home or office.

Client terminal sub-system 1300B includes a client terminal 1500 such as a TV. Client terminal sub-system 1300B further includes: a function of obtaining, from the client terminal, an address of information corresponding to the video image that is being displayed on the client terminal and an address recorded on the client terminal; and a sub-client terminal 1502 having a function of communicating with networking sub-system 1200. As sub-client terminal 1502, a portable telephone, a personal computer, a PDA (Personal Digital Assistant) or the like may be used.

Figure 54:
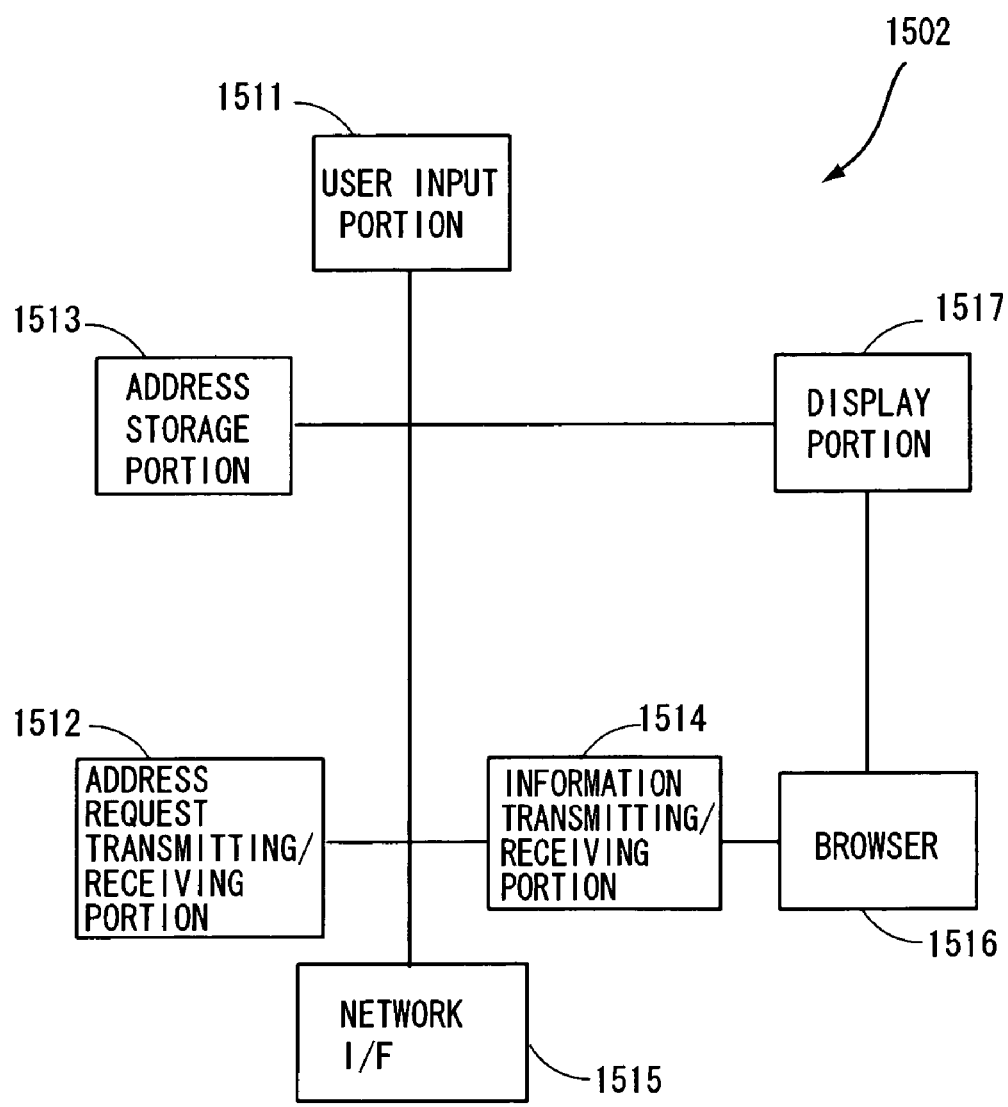
FIG. 54 is a block diagram showing a configuration of the sub-client terminal apparatus in accordance with the sixth modification of the third embodiment of the present invention.

FIG. 54 is a block diagram of a representative configuration of sub-client terminal 1502. Referring to FIG. 54, sub-client terminal 1502 includes a user input portion 1511 with a user interface allowing a user operation; an address request transmitting/receiving portion 1512 issuing a request for obtaining an address of the desired information and receiving the returned address; an address storage portion 1513 for storing the address obtained by address request transmitting/receiving portion 1512; an information transmitting/receiving portion 1514 transmitting a request for getting information and receiving information corresponding to the transmitted address, based on the address obtained by address request transmitting/receiving portion 1512 or on an address stored in address storage portion 1513; and a network interface 1515 for transmitting signals to/from the actual network.

Sub-client terminal 1502 further includes a browser 1516 for configuring the information received by information transmitting/receiving portion 1514 to a form that can be displayed (to the user), and a display portion 1517 for displaying the information configured by the browser.

By the user interface provided on user input portion 1511, an operation can be made to request the client terminal 1500 for an address of the information related to the video image displayed on client terminal 1500 or an address stored in client terminal 1500. Further, the user interface provided on user input portion 1511 enables an operation of displaying the address stored in client terminal apparatus 1500 and an operation of requesting networking sub-system 1200 for the information of the selected address.

When a request for getting an address is made by user input portion 1511, address request transmitting/receiving portion 1512 forms an address request in accordance with the input, and transmits the same to client terminal 1500. Further, address request transmitting/receiving portion 1512 receives an address notice from client terminal 1500, analyzes the same, and stores the notified address to address storage portion 1513.

It may be the case that the format of address request and address notification may be an electronic mail format, notification message format or the like and may be different dependent on network path to client terminal 1500. Therefore, it is desired that sub-client terminal 1502 has a function of selecting the format of address request and address notice in accordance with the network path selected by the user. Further, it is desired that information related to the program information stored in other client terminals be added to the address notice from client terminal 1500. The additional information may include time of broadcast, name of broadcasting station, summary of broadcast and the like.

Desirably, network interface 1515 includes a plurality of communication apparatuses. When a portable telephone, a personal computer or the like is used as sub-client terminal 1502, wiring of cables and the like becomes unnecessary if communication between client terminal 1500 such as the TV receiver and sub-client terminal 1502 is established by infrared ray or radio wave.

Figure 55:
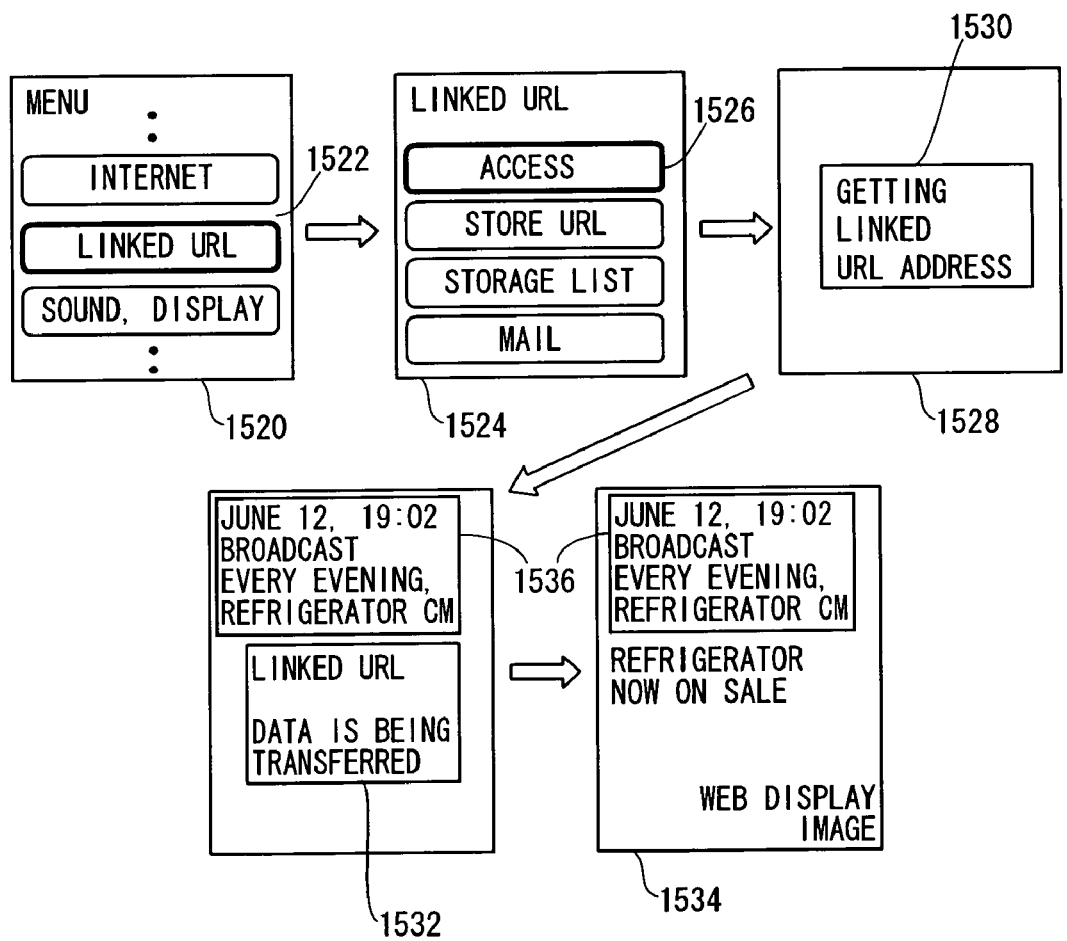
FIG. 55 shows state transition of display images when information is obtained and displayed using a portable telephone in accordance with the sixth modification of the third embodiment of the present invention.

FIG. 55 shows an example of the user interface. In this example, it is assumed that the user uses a portable telephone as sub-client terminal 1502. FIG. 55 shows an example of transition among images, when the user, watching a broadcast program on client terminal 1500 such as a TV, obtains and displays information related to the broadcast program using sub-client terminal 1502.

Referring to FIG. 55, when the user presses the menu button, a menu image 1520 is displayed on the display screen of the portable telephone. by selecting the "linked URL" item 1522 of menu image 1520 using an up/down button and pressing a determination button, not shown, a linked URL image 1524 is displayed. By selecting an "access" item of linked URL image 1524 and pressing the determination button, not shown, an image 1528 indicating that the linked URL is being transferred is displayed.

On the image 1528 indicating that the linked URL is being transferred, while the address notice is being transmitted/received to and from client terminal 1500, a communication state display 1530 indicating that an address is being inquired to client terminal 1500 is displayed. Further, after the address is obtained and the information is transmitted/received to and from networking sub-system 1200 designated by the address, a communication state display 1532 indicating that the data are being transferred from networking sub-system 1200 is displayed.

It is noted that these are examples of operations notifying the user about the switching of network path, and such notification may be made by voice output. After the information is obtained, the information is analyzed, and displayed on a browser display image 1534. When the summary information of the program information added to the address notice is to be received, a summary information display 1536 is given after reception and analysis of the address notice.

Figure 56:
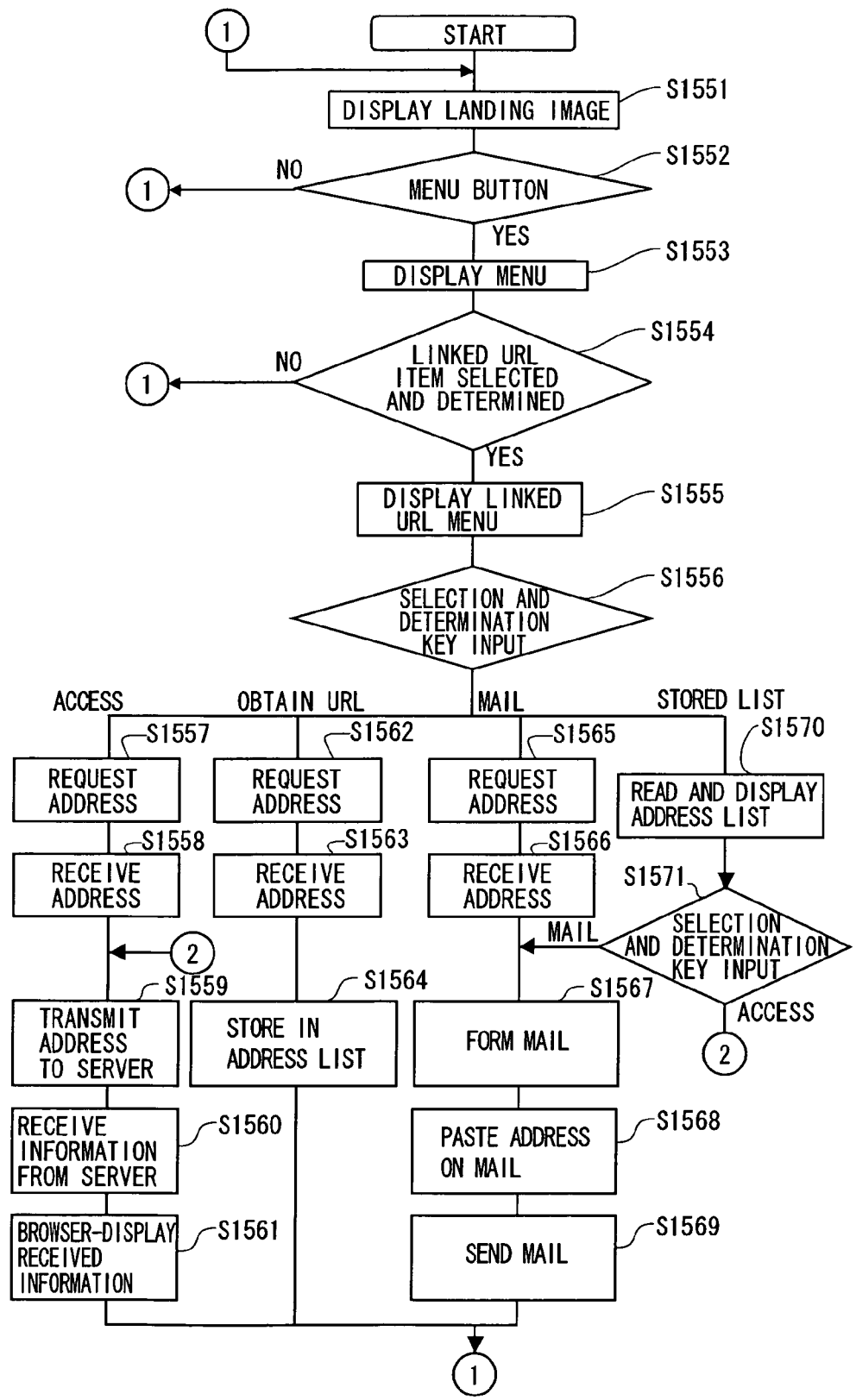
FIG. 56 is a flowchart showing a control structure of a program executed by the sub-client terminal in accordance with the sixth modification of the third embodiment of the present invention.

FIG. 56 is a flowchart representing a control structure of a program executed by sub-client terminal 1502 in accordance with the present modification. Referring to FIG. 56, first, in step 1551, a so-called landing (waiting) image is displayed. Thereafter, in steps S1552, whether the menu button is pressed or not is determined. If the result of determination is "YES", control proceeds to step S1553, and if it is "NO", control proceeds to step S1551, to wait for an input.

In step S1553, the menu image is displayed. Next, in step S1554, whether the "linked URL" menu is selected or not is determined. If the result of determination is "YES", control proceeds to step S1555, and if it is "NO", control returns to step S1551.

In step S1555, the "linked URL" menu is displayed. Thereafter, in step S1556, determination is made as to what button input has been made. In this example, on a screen of the portable telephone, a menu such as shown in FIG. 55 is displayed, and selection is made by software. The method, however, is not limited thereto, and a hardware button or a key may be used.

Dependent on the result of determination of step S1556, the control flow branches in the following manner. Specifically, when the selected button is "access button, "get URL" button, "mail" button or "stored list" button, control proceeds to step S1557, S1562, S1565 or S1570, respectively.

The process starting from step S1557 is executed when the "access" button is selected. This process is to obtain the URL of the information related to the broadcast program that is being displayed on client terminal 1500 from client terminal 1500 and to obtain information from networking sub-system 1200 using the obtained URL.

In step S1557, sub-client terminal 1502 forms an address request, and transmits the formed address request to client terminal 1500. In the next step S1558, address information of the program related information is obtained from client terminal 1500.

In step S1559, sub-client terminal 1502 transmits a request for getting information to networking sub-system 1200, using the obtained address. In step S1560, information corresponding to the address obtained in step S1558 is transmitted, and received. In step S1561, the information received in step S1560 is displayed to the user. Then, control returns to step S1551.

When the "get URL" button is selected, control proceeds from step S1556 to S1562. In step S1562, sub-client terminal 1502 forms an address request, and transmits the formed address request to client terminal 1500. Thereafter, in step S1563, the address information of the program related information is received by client terminal 1500. In step S1564, the obtained address information is stored. Then, control returns to S1551.

When the "mail" button is selected, control proceeds to step S1565. In the following steps, sub-client terminal 1502 performs a process of obtaining an address and notifying other device about the address. In step S1565, an address request is formed, and the formed address request is transmitted to client terminal 1500. Next, in step S1566, address information of the program related information is received from client terminal 1500.

In step S1567, by the mail function of the portable telephone, a mail is prepared. In step S1568, the address information obtained in step S1566 is attached to the mail. Next, in step S1569, the mail is transmitted. Then, control returns to step S1551. Though the mail function of the portable telephone is described as an example here, any function of the sub-client terminal allowing notification of information to other device may be utilized.

When the "stored list" button is selected, control proceeds from step S1556 to step S1570. The process starting from step S1570 is for reading a stored address to obtain information of the address.

In step S1570, the address information already stored by the process of step S1564 or the like is read and displayed on the screen. In step S1571, the linked URL menu is displayed again, waiting for the input by the user for selection and determination. In step S1571, further, a determination is made as to which button is input as the selection and determination input by the user. When the "access" button is selected, control proceeds to step S1559. When the "mail" button is selected, control proceeds to step S1567.

By the processes described above, the sub-client terminal in accordance with the sixth modification can be realized.

<Seventh Modification of the Third Embodiment>

Figure 57:
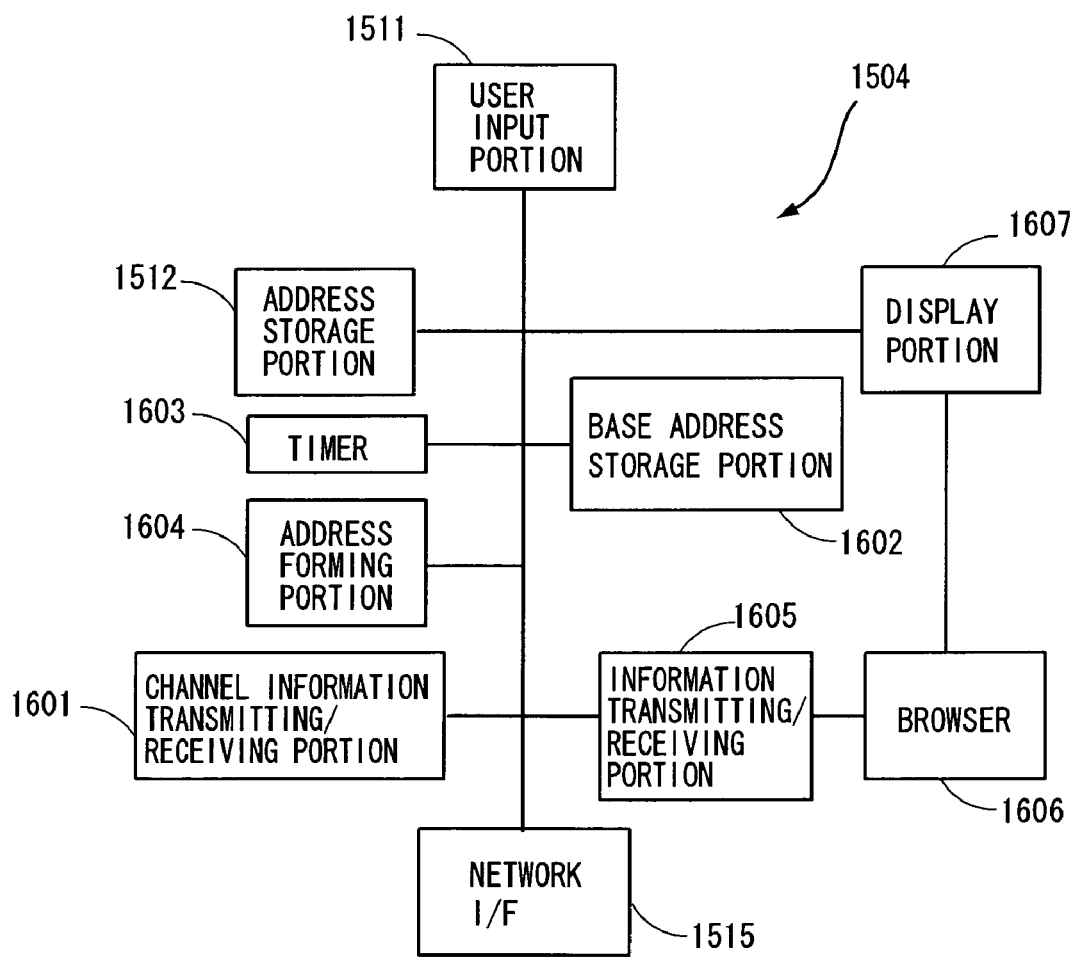
FIG. 57 is a block diagram showing a configuration of a sub-client terminal further having a function of obtaining channel information from a client terminal and forming an address, in accordance with a seventh modification of the third embodiment of the present invention.

The sub-client terminal may further have a function of obtaining channel information from the client terminal and forming an address. FIG. 57 is a block diagram showing a possible configuration of the sub-client terminal having such a function. Referring to FIG. 57, sub-client terminal 1504 includes, similar to sub-client terminal 1502, a user input portion 1511, an address storage portion 1513, and a network interface 1515.

Sub-client terminal 1504 further includes: a channel information transmitting/receiving portion 1601 issuing to client terminal 1500 a request for getting channel information of a broadcast channel that is being displayed on client terminal 1500 and receiving the returned channel information that has been requested; a base address storage portion 1602 storing base address for each of the channels of broadcast; a timer 1603 counting time; an address forming portion 1604 for forming an address from the base address held in base address storage portion 1602 and from the current time of timer 1603; an information transmitting/receiving portion 1605 generating a request for getting information from the formed address or from a stored address, issuing the request to client terminal 1500, and receiving the returned requested information; a browser 1606 for configuring the information received by information transmitting/receiving portion 1605 to a form that can be displayed (to the user); and a display portion 1607 for displaying to the user the information configured by the browser.

When the sub-client terminal 1504 in accordance with the present modification is activated and a user input is received through user input portion 1511, channel information transmitting/receiving portion 1601 forms a request for channel information in response to the input. Channel information transmitting/receiving portion 1601 transmits the formed request to client terminal 1500. Client terminal 1500 returns the channel information of the requested channel to the sub-client terminal.

Sub-client terminal 1504 that has received the channel information through network interface 1515 updates, using the obtained channel information, the base address of each broadcast channel stored in base address storage portion 1602, and sets the timer 1603.

Address forming portion 1604 refers to base address storage portion 1602 using the channel information obtained from the client terminal, determines the base address of the desired information, and adds the time information obtained from timer 1603, thereby to form an address. Here, it is desired that the time information be obtained when the button input is made at user input portion 1511 and temporarily stored. Using the time information, the information corresponding to the time point when the user actually made an input can be obtained.

<Eighth Modification of the Third Embodiment>

Figure 58:
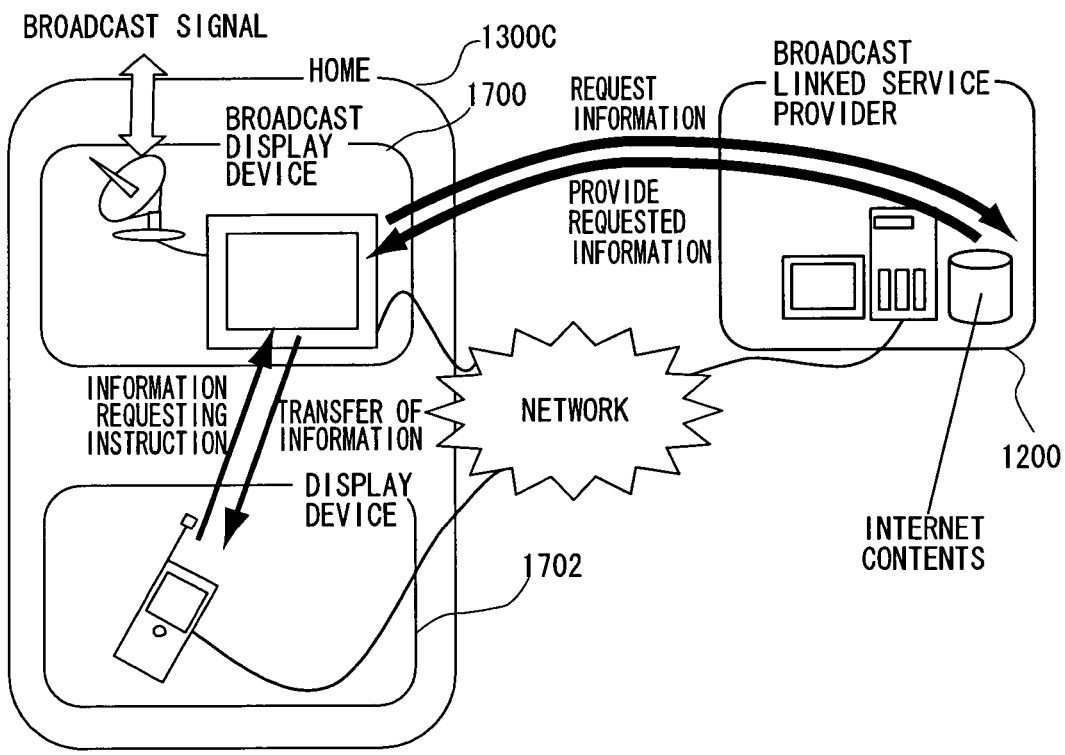
FIG. 58 shows an overall configuration of another system having the function of coordinating between the client terminal apparatus and the sub-client terminal apparatus, in the system in accordance with an eighth modification of the third embodiment of the present invention.

Further, it is possible that the client terminal requests and receives information, while the received information is displayed by another sub-client system that has the displaying function. FIG. 58 shows an example of such a system. Referring to FIG. 58, the system includes, similar to the system shown in FIG. 53, a networking sub-system 1200, and a client terminal sub-system 1300C used by a user at home or at office. Client terminal sub-system 1300C includes a client terminal 1700 such as a TV and a sub-client terminal 1702.

In this system, client terminal 1700 requests and receives information to and from networking sub-system 1200. After reception, the received information is transferred from client terminal 1700 to portable telephone terminal 1702. Portable telephone terminal 1702 receives and displays the information transferred from client terminal 1700.

Figure 59:
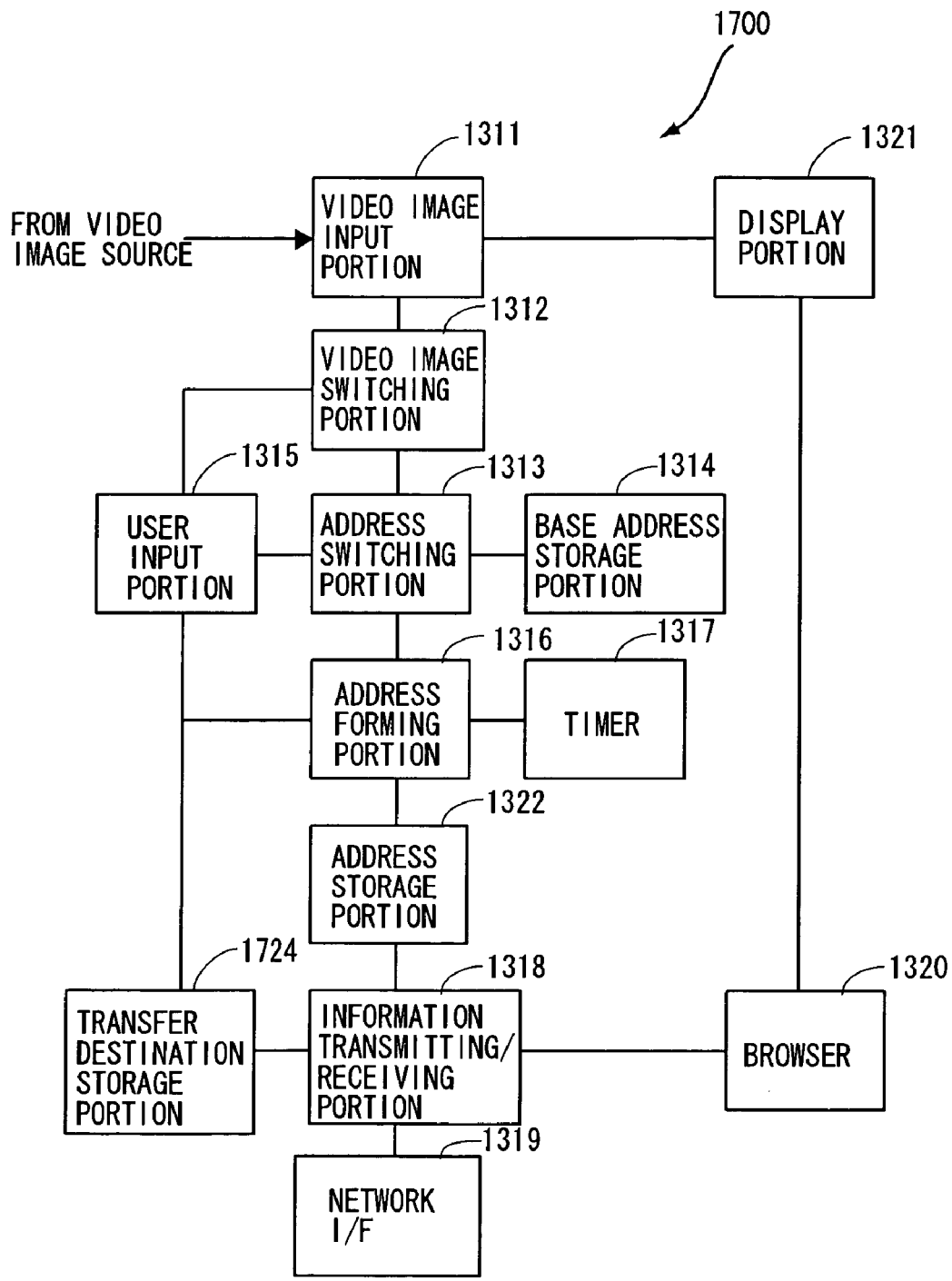
FIG. 59 is a block diagram representing a configuration of a client terminal having a function of selecting a sub-client terminal on which obtained information is displayed, in the client terminal of the system in accordance with the eighth modification of the third embodiment of the present invention.

Considering that there are a plurality of sub-client terminals 1702 having the displaying function, it is desirable to allow client terminal 1700 to select any of the sub-client terminal apparatuses 1702 on which the obtained information is displayed. FIG. 59 shows a configuration of client terminal 1700 having such a selecting function.

Referring to FIG. 59, client terminal 1700 has approximately the same configuration as client terminal 1332 in accordance with the first embodiment shown in FIG. 30. Different from client terminal 1332 shown in FIG. 30, however, the client terminal 1700 includes, in place of information storage portion 1323, a transfer destination storage portion 1324 for storing a network ID and a communication path of a sub-client as a destination for transferring the obtained information related to the program.

The client terminal 1700 operates in the following manner. Client terminal 1700 obtains an external input through a user input portion 1315 or a network interface 1319. By the external input, client terminal 1700 receives and stores in transfer destination storage portion 1324 the network ID and the communication path of the terminal to which the obtained program related information could be transferred.

While the user is watching a broadcast program, he/she issues a request for getting information related to the program using sub-client terminal 1702, to client terminal 1700. In response to the request instruction from the user, client terminal 1700 forms an address, requests information and receives provided information. This operation is the same as that of client terminal 1332 described with reference to FIG. 30.

After receiving information, client terminal 1700 displays the terminal information in the transfer destination storage portion 1724. The user selects desired one from the displayed terminal information, using user input portion 1315. Referring to the terminal information of transfer destination storage portion 1724, client terminal 1700 transmits the information through information transmitting/receiving portion 1318 to the selected transfer destination.

<Other Modifications>

As a client terminal, a portable telephone may be used. In that case, the portable telephone may receive video images in the form of the Internet stream, or receive the broadcast wave of terrestrial digital broadcast, whereby it can receive and display video images and in addition, it can download synchronized contents from the Internet.

Of the systems described above, most of the functional portions not dependent on a specific hardware can be realized by computer hardware and computer programs executed thereon. The same applies to the remote controller and the portable telephone. As the computer hardware, a general purpose computer may be used provided that it supports video signals. Further, each of the functions of the apparatuses described above can be realized in the form of programs, by a person skilled in the art based on the descriptions of the present specification. Such programs are also of one type of data, which can be stored in a storage medium such as a DVD or a CD-ROM (Compact Disc Read-Only Memory) to be distributed.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

As described above, the present invention is applicable to a system providing information from an information server apparatus to a client terminal apparatus through a network, and particularly to a system that can transmit not only uniform information but also various information desired by viewing audience, by providing information to the client terminal apparatus through the network utilizing a link to a broadcast program or a storage medium.

The invention claimed is:

1. A client terminal apparatus connected to an information server apparatus, comprising
 a display apparatus;
 receiving means for receiving a broadcast signal;
 broadcast switching means for switching programs of broadcast signals received by said receiving means;
 a storage device that stores a broadcast signal of a program switched-in by said broadcast switching means together with time information related to a time of storing the broadcast signal of the switched-in program;
 a source selector that selects an output of said broadcast switching means or an output of said storage device in response to a user's selection;
 video image processing means for processing a video image derived from an output of said source selector;
 selecting means for selecting information source specifying information related to a program selected by said source selector, including forming a modified information source specifying information by calculating a time of the information source based on a start time that the broadcast signal began being stored and an elapsed time from the start time and appending the time of the information source to said information source specifying information, when the program selected by said source selector is an output of said storage device;

means for accessing the information server apparatus for getting information based on the modified information source specifying information; and means for switching, from a display of video image based on said broadcast signal, to display of information obtained by said getting means, in response to satisfaction of a predetermined condition.

2. The client terminal apparatus according to claim 1, wherein said selecting means includes means for selecting, in conjunction with selection of a program by said source selector, the information source specifying information related to the corresponding program.

3. The client terminal apparatus according to claim 1, wherein said means for switching includes means for detecting completion of getting information by said getting means from the information server apparatus, and means for switching, from a display of video image based on said broadcast signal to display of information obtained by said getting means in response to a result of detection by said detecting means.

4. The client terminal apparatus according to claim 1, further comprising means for continuously outputting broadcast sound, when the display of video image based on said broadcast signal is switched to the display of information obtained by said getting means.

5. The client terminal apparatus according to claim 1, further comprising means for receiving a predetermined first instruction from a user, while said display apparatus is displaying information obtained by said getting means;

means for storing information being displayed on said display apparatus, in response to said first instruction;

means for controlling said broadcast switching means for selecting a program of said broadcast signal determined by said first instruction, in response to said first instruction;

means for receiving a predetermined second instruction from the user; and means for reading information stored in said storage means and applying to said display apparatus, in response to said second instruction.

6. The client terminal apparatus according to claim 5, wherein said first instruction instructs switching of programs of said broadcast signal.

7. The client terminal apparatus according to claim 1, further comprising information holding means for holding information obtained by said getting means; and means for controlling said information holding means such that the information displayed on said display apparatus is held, when said broadcast switching means switches the programs of the broadcast signal.

8. The client terminal apparatus according to claim 1, further comprising:

information holding means for holding information obtained by said getting means; held information display means for reading and displaying information held in said holding means; and means for switching from display of a video image based on said broadcast signal to display of the information held in said information holding means, in response to switching of said broadcast signal program by said broadcast switching means.

9. The client terminal apparatus according to claim 1, wherein said selecting means includes means for changing, in conjunction with changing a program by said broadcast switching means, the information source specifying information related to the corresponding program.

10. A client terminal apparatus connected to an information server apparatus, comprising:

a display apparatus;

receiving means for receiving a broadcast signal;

broadcast switching means for switching programs of broadcast signals received by said receiving means;

a storage device that stores a broadcast signal of a program switched-in by said broadcast switching means together with time information related to a time of storing the broadcast signal of the switched-in program;

a source selector that selects an output of said broadcast switching means or an output of said storage device in response to a user's selection;

video image processing means for processing a video image derived from an output of said source selector;

selecting means for selecting information source specifying information related to a program selected by said source selector, including forming a modified information source specifying information by calculating a time of the information source based on a start time that the broadcast signal began being stored and an elapsed time from the start time and appending the time of the information source to said information source specifying information, when the program selected by said source selector is an output of said storage device;

means for accessing the information server apparatus for getting information based on the modified information source specifying information:

means for determining, after receiving the information returned from said information server apparatus, whether the received information is related to said broadcast signal or not;

means for forming display based both on the broadcast signal and the received information; and means for selectively performing switching from the display of the video image based on the broadcast signal to the display formed by said forming means, and switching from the display of the video image based on the broadcast signal to the display of the received information, in response to the result of determination by said determining means.

11. The client terminal apparatus according to claim 10, further comprising means for outputting a predetermined message when said selectively performing means performs switching from the display of the video image based on the broadcast signal to the display of said received information.

12. A client terminal apparatus connected to an information server apparatus, comprising a display apparatus;

receiving means for receiving a broadcast signal;

broadcast switching means for switching programs of broadcast signals received by said receiving means;

a storage device that stores a broadcast signal of a program switched-in by said broadcast switching means together with time information related to a time of storing the broadcast signal of the switched-in program;

a source selector that selects an output of said broadcast switching means or an output of said storage device in response to a user's selection;

video image processing means for processing a video image derived from an output of said source selector;

selecting means for selecting information source specifying information related to a program selected by said source selector, including forming a modified information source specifying information by calculating a time of the information source based on a start time that the broadcast signal began being stored and an elapsed time from the start time and appending the time of the information source to said information source specifying information, when the program selected by said source selector is an output of said storage device;

means for accessing the information server apparatus for getting information based on the modified information source specifying information; and means for receiving an instruction to get information from a user; wherein said selecting means includes means for selecting the information source specifying information related to the program selected by said broadcast switching means at the time, in response to said instruction to get information.

13. The client terminal apparatus according to claim 12, wherein said receiving means includes means for receiving data broadcast signal transmitting one or a plurality of display page data repeatedly on a predetermined schedule; and said selecting means includes means for measuring relative time from the start of display of the display page of data broadcast selected by said broadcast switching means; and means for selecting the information source specifying information, in response to said instruction to get information, based on the information specifying the display page of the data broadcast selected by said broadcast switching means at the time said instruction to get information is made, and on the relative time measured by the time measuring means.

14. The client terminal apparatus according to claim 13, further comprising means for replacing part of the data broadcast information received by said receiving means with other information.

15. The client terminal apparatus according to claim 12, wherein said receiving means includes means for receiving a broadcast signal and data broadcast information, a prescribed program of said broadcast signal and a prescribed program of the data broadcast signal may be related to each other, and said prescribed program of said broadcast signal includes information indicating whether there is any related data broadcast signal or not;

said client terminal further comprising:

means for determining whether the broadcast signal program selected by said broadcast switching means includes information indicating presence of a program of data broadcast signal related to the program; and means for controlling processing of video image by said video image processing means, in accordance with the result of determination by said determining means; wherein said selecting means includes means for selectively performing a process of selecting the information source specifying information related to the program selected by said broadcast switching means at the time and a process of selecting a program of data broadcast signal related to the program, in response to said instruction to get information and in accordance with the result of determination by said determining means;

said client terminal further comprising means, responsive to selection of the program of data broadcast signal by said selectively performing means, for displaying video image based on the program of data broadcast signal.

16. A non-transitory computer readable recording medium, recording a program that can be executed by a computer, causing, when executed by a computer, said computer to perform steps comprising:

the step of causing the computer to receive a broadcast signal;

a broadcast switching step of causing said computer to switch programs on the broadcast signal;

a storage step of storing a broadcast signal of a program switched-in at said broadcast switching step together with time information related to a time of storing the broadcast signal of the switched-in program;

a source selection step of selecting an output of said broadcast switching step or an output of said storage step in response to a user's selection;

a video image processing step of causing said computer to process a video image based on an output of said source selection step; and a selecting step of causing said computer to select, in response to the source selection step, information source specifying information related to the program, including forming a modified information source specifying information by calculating a time of the information source based on a start time that the broadcast signal began being stored and an elapsed time from the start time and appending the time of the information source to said information source specifying information, when the program selected by said source selection step is an output of said storage device; whereby an information server apparatus is accessed linked to said program.

17. A client terminal apparatus connected to an information server apparatus, comprising receiving means for receiving a broadcast signal;

input getting means for getting an operation input by a user designating information related to a program of said broadcast signal;

broadcast switching means for switching the programs of broadcast signal received by said receiving means;

a storage device that stores a broadcast signal of a program switched-in by said broadcast switching means together with time information related to a time of storing the broadcast signal of the switched-in program;

a source selector that selects an output of said broadcast switching means or an output of said storage device in response to a user's selection;

video image processing means for processing a video image based on an output of said source selector;

selecting means for selecting, in response to switching of programs by said broadcast switching means, information source specifying information related to a program selected by said source selector corresponding to the information designated by said operation input, including forming a modified information source specifying information by calculating a time of the information source based on a start time that the broadcast signal began being stored and an elapsed time from the start time and appending the time of the information source to said information source specifying information, when the program selected by said source selector is an output of said storage device; and means for accessing said information server apparatus for getting information based on the modified information source specifying information.

18. A client terminal apparatus connected to an information server apparatus, comprising:

receiving means form receiving a broadcast signal;

video image processing means for processing a video image based on the received broadcast signal;

program switching means for switching programs of the broadcast signal received by said receiving means;

a storage device that stores a broadcast signal of a program switched-in by said program switching means together with time information related to a time of storing the broadcast signal of the switched-in program;

a source selector that selects an output of said program switching means or an output of said storage device in response to a user's selection;

selecting means for selecting, in conjunction with selection of a program by said source selector, including forming a modified information source specifying information by calculating a time of the information source based on a start time that the broadcast signal began being stored and an elapsed time from the start time and appending the time of the information source to said information source specifying information related to the program, when the program selected by said source selector is an output of said storage device;

means for obtaining current time; and means for transmitting, to the information server apparatus, a request for getting information, requested by the client terminal apparatus for the information from the information server apparatus, including the modified information source specifying information linked to the program and time when the information request is issued to the information server apparatus.

19. The client terminal apparatus according to claim 18, further comprising information source access setting means for setting whether said time information is to be added for each broadcast channel; wherein said means for accessing to the information server apparatus adds the time when the information request is issued to the information server apparatus only for the broadcast channel to which addition of said time information is set by said information source access setting means.

* * * * *